(12) United States Patent
Morii

(10) Patent No.: US 6,537,169 B1
(45) Date of Patent: Mar. 25, 2003

(54) AUTOMATIC TRANSMISSION FOR VEHICLES

(76) Inventor: Masaru Morii, 255 Mirokujihigashi 2-chome, Nishiharu-cho, Nishikasugai-gun, Aichi 48-0031 (JP)

( * ) Notice: Subject to any disclaimer, the term of this patent is extended or adjusted under 35 U.S.C. 154(b) by 0 days.

(21) Appl. No.: 09/856,828
(22) PCT Filed: Sep. 20, 2000
(86) PCT No.: PCT/JP00/06459
§ 371 (c)(1), (2), (4) Date: May 25, 2001
(87) PCT Pub. No.: WO01/25653
PCT Pub. Date: Apr. 12, 2001

(30) Foreign Application Priority Data

Oct. 4, 1999 (JP) .......... 11/282722

(51) Int. Cl.⁷ .............. F16H 3/72
(52) U.S. Cl. .......... 475/8; 475/10; 475/269; 475/324; 475/325
(58) Field of Search .......... 475/1, 2, 5, 8, 475/10, 269, 323, 324, 325

(56) References Cited

U.S. PATENT DOCUMENTS

| | | | | |
|---|---|---|---|---|
| 3,262,336 A | * | 7/1966 | Jackson | 475/324 |
| 4,644,820 A | | 2/1987 | Macey et al. | |
| 5,067,932 A | * | 11/1991 | Edwards | 475/5 |
| 5,514,043 A | | 5/1996 | Antonov | 475/108 |
| 5,607,370 A | | 3/1997 | Maslow et al. | 475/196 |
| 5,733,222 A | | 3/1998 | Kawahara et al. | 477/154 |
| 6,409,623 B1 | * | 6/2002 | Hoshiya et al. | 475/5 |

FOREIGN PATENT DOCUMENTS

| | | |
|---|---|---|
| FR | 1 015 226 A | 9/1952 |
| FR | 1 341 321 A | 1/1964 |
| GB | 2 322 420 A | 8/1998 |
| JP | A 60 095238 | 5/1985 |
| JP | 62-188841 | 8/1987 |
| JP | U 1-176247 | 12/1989 |
| JP | 1-176247 | 12/1989 |
| JP | 3-277854 | 9/1991 |
| JP | A 3-277854 | 12/1991 |
| JP | 10-325453 | 8/1998 |
| JP | A 10-325453 | 12/1999 |
| JP | A 2000-65169 | 3/2000 |
| JP | 2000-65169 A | 3/2000 |
| WO | WO 99/24736 | 5/1999 |

* cited by examiner

Primary Examiner—Sherry Estremsky
(74) Attorney, Agent, or Firm—Oliff & Berridge, PLC

(57) ABSTRACT

An automatic transmission includes an input first rotating member, an output second rotating member coaxial with the first rotating member, a third rotating member coaxial with the first rotating member, and a rotation transmitting element mounted on the third rotating member to transmit rotation of the first rotating member to the second rotating member so that the second rotating member is rotated at a predetermined reduction ratio exceeding 1 in a direction of rotation of the first rotating member in a stopped state of the third rotating member. The reduction ratio is increased as a difference between numbers of revolution of the first and third rotating members is rendered larger. The third rotating member is bidirectionally rotatable. The second rotating member is automatically adjusted to a number of revolution at which an equilibrium is maintained between torque developed by the second rotating member and a load applied to the second rotating member when the third rotating member is in rotation at a number of revolution ranging between zero at which the third rotating member is stationary and a number of revolution at which the third rotating member is in rotation together with the first rotating member in one and the same direction.

29 Claims, 22 Drawing Sheets

AUTOMATIC TRANSMISSION FOR VEHICLES

TECHNICAL FIELD

This invention relates to an automatic transmission for vehicles which accomplishes non-stage transmission using a double pinion planetary gear.

BACKGROUND ART

An automatic transmission for vehicles has been provided which comprises a torque converter and a planetary gear combined with the torque converter. The torque converter increases the torque developed by an engine. However, a range of increase in the torque is so small that the automatic transmission is insufficient to be used singly in automobiles. Accordingly, in the practical use, the automatic transmission is combined with a plurality of planetary gears so that one of a plurality of reduction gear ratios for the planetary gears is automatically selected according to a driving condition.

However, since the reduction gear ratio is stepwise shifted according to the driving condition in the above-described automatic transmission, gear shift during acceleration results in a large shock and momentarily reduces the number of revolution of the engine. As a result, the vehicle cannot smoothly be accelerated. Further, the reduction gear ratio is suddenly increased when the automatic transmission is downshifted according to the operation of an accelerator so that the vehicle is accelerated. As a result, the vehicle body is shaken such that a driver and passengers may feel uncomfortable. Even when the accelerator is returned for deceleration, the automatic transmission is not downshifted but would sometimes be upshifted by contraries. As a result, the engine brake cannot effectively be applied.

Further, the torque converter disadvantageously has a large transmission loss, and in addition, the transmission loss is further increased since a plurality of planetary gears are used. Further, the overall automatic transmission has a complicated structure and is large in size and heavy in weight. Thus, the automatic transmission increases the weight of the vehicle and the size of a driving system thereof. Further, since the planetary gears are controlled by means of oil hydraulics, the loss resulting from production of oil pressure is large. Additionally, the oil pressure control is complicated and accordingly increases the cost and results in failure.

In addition, when a driving force of drive wheels is smaller than the current running resistance of the vehicle, the current number of revolution cannot be maintained or the engine causes knocking which results in uncomfortableness. Further, since the vehicle cannot be accelerated, the automatic transmission is controlled so that such a reduction gear ratio is selected that the vehicle runs under a condition where the driving force of the drive wheels is sufficiently large according to the speed of the vehicle relative to the running resistance. In other words, while the vehicle is running at a constant speed, the reduction gear ratio is larger than an optimum one at which the driving force of the drive wheels equilibrates the current running resistance, whereupon fuel is consumed uselessly.

On the other hand, a belt continuously variable transmission (CVT) utilizing pulleys and a belt has recently been put to practical use. In the belt CVT, the belt couples two pulleys and diameters of both pulleys are changed so that the reduction gear ratio is continuously variable. Accordingly, since non-stage transmission can be accomplished, gear shift results in no shock such that the vehicle can smoothly be accelerated. However, the belt has a low durability in the currently used belt CVT, whereupon it is difficult to apply the current belt CVT to high-powered engines. Further, since the diameters of the pulleys are varied by the oil hydraulics so that the reduction gear ratio is adjusted, an increase rate of the engine speed does not agree with an acceleration rate of the vehicle even though the engine speed is increased according to the operation of the accelerator. This results in a sense of physical disorder and a large loss in the engine revolution for production of oil pressure. Further, the belt which is originally annular is elastically deformed into an elliptic shape when attached to the pulleys. The slippage between the pulleys and the belt or the loss due to the aforesaid deformation is large. Further, the belt CVT results in a delay time between a sudden change of load or engine power and gear shift. As a result, the belt CVT is unsuitable for the sports driving. Further, even though the CVT can accomplish the non-stage transmission, it is controlled so that such a reduction gear ratio is selected that the vehicle runs under a condition where the driving force of the drive wheels is sufficiently large according to the speed of the vehicle relative to the running resistance, as in the same manner in the aforesaid automatic transmission. As a result, fuel is wasted.

On the other hand, no transmission is provided in electric railcars with an electric motor serving as a driving source and electric motorcars. In these vehicles, a motor voltage and a motor current are controlled by an inverter so that the motor torque and speed are controlled according to a running speed of the vehicle. However, the cost for such a control device is extremely high. Further, the control device carries out a control manner in which the driving force of the drive wheels becomes larger than the running resistance of the vehicle so that the vehicle can run smoothly. This results in waste of the electric power. Additionally, since the motor torque and speed are controlled according to the speed of the vehicle, the driving force of the drive wheels would become unsuitable depending upon load applied to the drive wheels or the motor would be overloaded.

Bicycles are provided with a transmission manually shifting a reduction gear ratio. The manual operation is troublesome and the transmission cannot generally be shifted while the bicycle is stopped. Thus, the transmission is not effectively used in the bicycle. Further, wind power generating systems are provided with no transmission. Accordingly, a generator is not rotated when torque due to wind power is smaller than a stationary force of the generator, so that no electric power is produced. Further, when the torque due to wind power is larger than a torque required to maintain the generation in the generator, the torque due to wind power cannot efficiently be transmitted to the generator, whereupon the generating efficiency is low.

DISCLOSURE OF THE INVENTION

Therefore, an object of the present invention is to provide an automatic transmission which has a small size and a simple construction, causes no shock due to gear shift, and can convert input rotation to output rotation at a maximum efficiency with no control.

The present invention provides an automatic transmission comprising an input first rotating member, an output second rotating member provided to be coaxial with the first rotating member, a third rotating member provided to be coaxial with the first rotating member, and a rotation transmitting element provided on the third rotating member to transmit rotation of the first rotating member to the second rotating member so that the second rotating member is rotated at a predetermined reduction ratio exceeding 1 in a direction of rotation of the first rotating member in a stopped state of the third rotating member. The reduction ratio is increased as a difference between rotational speeds of the first and third rotating members is rendered larger. In this construction, the third rotating member is bidirectionally rotatable. The second rotating member is automatically adjusted to a number of revolution at which an equilibrium is maintained between torque developed by the second rotating member and a load applied to the second rotating member when the third rotating member is in rotation at a number of revolution ranging between zero at which the third rotating member is stationary and a number of revolution at which the third rotating member is in rotation together with the first rotating member in one and the same direction.

According to the above-described construction, a force acting upon the third rotating member during rotation of the first rotating member is a resultant force of a first torque acting in the same direction as the first rotating member is rotated due to the fact that the rotation transmitting element provided on the third rotating member tends to rotate with the first rotating member and a second torque acting in the direction opposite to rotation of the first rotating member due to a repulsive force the rotation transmitting element receives from the second rotating member. Accordingly, the third rotating member is rotated in the same direction as the first rotating member is rotated when the first torque is larger than the second torque.

Assume now that the third rotating member is being rotated in the same direction as the first rotating member is being rotated. Under this condition, the second rotating member is rotated in the same direction as the first rotating member as the result of operation of the rotation transmitting element and is pressed by the rotation transmitting element with rotation of the third rotating member. More specifically, two rotation transmission paths are provided between the first and second rotating members, that is, a first transmission path provided by the operation of the rotation transmitting element and having a predetermined reduction ratio larger than 1 and a second transmission path provided by the rotation of the third rotating member and having the reduction ratio of 1. The true speed of the second rotating member is the sum of speeds of the second rotating member rotated via the respective transmission paths. In this case, when the third rotating member is stopped, all the rotation of the first rotating member is consumed for rotation of the second rotating member by the operation of the rotation transmitting element in the same direction as the first rotating member is rotated. Further, when the third rotating member is rotated at the same speed as the first rotating member is rotated, all the rotation of the first rotating member is consumed for the rotation transmitting element pressing the second rotating member in the same direction as the first rotating member is rotated. When the third rotating member is being rotated at a speed lower than that of the first rotating member, one part of rotation of the first rotating member is consumed for rotation of the second rotating member by the operation of the rotation transmitting element in the same direction as the first rotating member is rotated. The other part of the rotation of the first rotating member is consumed for the rotation transmitting element pressing the second rotating member in the same direction as the first rotating member is rotated.

In other words, the number of revolution of the second rotating member is obtained by adding the number of revolution of the third rotating member and a number of revolution obtained by dividing, by a reduction ratio of the automatic transmission with the third rotating member being stopped, the value obtained by subtracting the number of revolution of the third rotating member from the number of revolution of the first rotating member. Furthermore, the reduction ratio of the automatic transmission mechanism at this time is obtained by dividing the number of revolution of the first rotating member by the speed of the second rotating member.

Thus, as the difference between the numbers of revolution of the first and third rotating members becomes large, the rotation at the predetermined reduction ratio larger than 1 is more predominant in the rotation transmitted from the first rotating member to the second rotating member. As a result, since the reduction ratio is increased, the torque developed by the second rotating member is increased although its number of revolution is reduced. Further, as the difference between the numbers of revolution of the first and third rotating members becomes small, the rotation at the reduction ratio of 1 is more predominant in the rotation transmitted from the first rotating member to the second rotating member. As a result, since the reduction ratio is decreased, the torque developed by the second rotating member is decreased although its number of revolution is increased. The aforesaid rotational characteristic of the second rotating member shows that the number of revolution of the second rotating member is automatically adjustable according to the magnitude of a load acting upon the second rotating member on condition that the number of revolution and torque of the first rotating member are constant. Accordingly, the number of revolution of the second rotating member is automatically adjusted so that the torque thereof equilibrates the magnitude of the load.

On the other hand, when the load is increased in the above-mentioned equilibrium state, the repulsive force the second rotating member exerts on the rotation transmitting element provided on the third rotating member is increased and accordingly, the torque rotating the third rotating member in the direction opposite to the direction of the first rotating member is increased, whereas the torque rotating the third rotating member in the same direction as the first rotating member rotates remains unchanged. Consequently, since the number of revolution of the third rotating member is reduced, the difference between the numbers of revolution of the first and third rotating members is rendered larger. In this case, the reduction ratio of the automatic transmission is increased as the difference between the numbers of revolution of the first and third rotating members is rendered larger. Accordingly, the reduction ratio of the automatic transmission is increased according to a reduction in the number of revolution of the third rotating member, whereupon the number of revolution of the second rotating member is reduced. As a result, the number of revolution of the second rotating member is reduced according to an increase in the load acting upon the second rotating member. However, since the torque of the second rotating member is increased with the reduction in the number of revolution thereof, the number of revolution of the second rotating member is reduced until the torque thereof equilibrates the magnitude of the load, being then stabilized.

Further, when the load is reduced in the above-mentioned equilibrium state, the repulsive force the second rotating member exerts on the rotation transmitting element provided on the third rotating member is reduced and accordingly, the torque rotating the third rotating member in the direction opposite to the direction of the first rotating member is increased, whereas the torque rotating the third rotating member in the same direction as the first rotating member rotates remains unchanged. Consequently, since the speed of the third rotating member is increased, the difference between the numbers of revolution of the first and third rotating members is rendered smaller. In this case, the reduction ratio of the automatic transmission is reduced as the difference between the numbers of revolution of the first and third rotating members is rendered smaller. Accordingly, the reduction ratio of the automatic transmission is reduced according to an increase in the number of revolution of the third rotating member, whereupon the number of revolution of the second rotating member is increased. As a result, the number of revolution of the second rotating member is increased according to a reduction in the load acting upon the second rotating member. However, since the torque of the second rotating member is reduced with the increase in the number of revolution thereof, the number of revolution of the second rotating member is increased until the torque thereof equilibrates the magnitude of the load, being then stabilized.

As the result of the above-described operation, the torque of the second rotating member is increased simultaneously with reduction in the number of revolution thereof when the load is increased in the equilibrium state of the torque of the second rotating member and the load. The torque of the second rotating member is reduced simultaneously with increase in the number of revolution thereof when the load is reduced. Thus, the number of revolution of the second rotating member is automatically adjusted so as to equilibrate the magnitude of the load even though the load varies.

On the other hand, when the number of revolution of the first rotating member is reduced in an equilibrium state of the torque of the second rotating member and the load, the torque rotating the rotation transmitting element provided on the third rotating member together with the first rotating member is reduced. Further, the torque acting upon the third rotating member to rotate it in the same direction as the first rotating member is rotated is reduced although the torque acting upon the third rotating member to rotate it in the direction opposite to the direction in which the first rotating member is rotated remains unchanged. Accordingly, the number of revolution of the third rotating member is reduced such that the difference between the numbers of revolution of the first and third rotating members becomes larger. In this case, the reduction ratio of the automatic transmission is increased as the difference between the numbers of revolution of the first and third rotating members becomes larger. Accordingly, the reduction ratio of the automatic transmission is increased according to a reduction in the number of revolution of the third rotating member such that the number of revolution of the second rotating member is reduced. Consequently, the number of revolution of the second rotating member is reduced according to a reduction in the number of revolution of the first rotating member. However, since the torque of the second rotating member is increased with the reduction in the number of revolution thereof, the number of revolution of the second rotating member is reduced until the torque thereof equilibrates the magnitude of the load, being then stabilized.

Further, when the number of revolution of the first rotating member is increased in an equilibrium state of the torque of the second rotating member and the load, the torque rotating the rotation transmitting element provided on the third rotating member together with the first rotating member is increased. Further, the torque acting upon the third rotating member to rotate it in the same direction as the first rotating member is rotated is increased although the torque acting upon the third rotating member to rotate it in the direction opposite to the direction in which the first rotating member is rotated remains unchanged. Accordingly, the number of revolution of the third rotating member is increased such that the difference between the numbers of revolution of the first and third rotating members becomes smaller. In this case, the reduction ratio of the automatic transmission is reduced as the difference between the numbers of revolution of the first and third rotating members becomes smaller. Accordingly, the reduction ratio of the automatic transmission is reduced as the difference in the numbers of revolution of the first and third rotating members becomes small. Accordingly, the reduction ratio of the automatic transmission is reduced according to an increase in the number of revolution of the third rotating member. As a result, the number of revolution of the second rotating member is increased according to an increase in the number of revolution of the first rotating member. However, since the torque of the second rotating member is reduced with the increase in the number of revolution of the second rotating member, the number of revolution of the second rotating member is increased until the torque thereof equilibrates the magnitude of the load, being then stabilized.

As the result of the above-described operation, the torque of the second rotating member is increased simultaneously with the reduction in the number of revolution thereof when the number of revolution of the first rotating member is reduced in the equilibrium state of the torque of the second rotating member and the load. Upon increase in the number of revolution of the first rotating member, the torque of the second rotating member is reduced simultaneously with increase in the number of revolution thereof. Accordingly, the number of revolution of the second rotating member is automatically adjusted so that the torque thereof equilibrates the magnitude of the load, although the number of revolution of the first rotating member varies.

In short, the first, second and third rotating members correspond to a pump impeller, a turbine liner and a stator of a torque converter employed in a conventional vehicle automatic transmission respectively.

The invention also provides an automatic transmission comprising an input first rotating member, an output second rotating member provided to be coaxial with the first rotating member, a third rotating member provided to be coaxial with the first rotating member, and rotation transmitting means provided on the third rotating member to transmit rotation of the first rotating member to the second rotating member so that the second rotating member is rotated at a number of revolution and a reduction ratio shown by following equations respectively in a direction of rotation of the first rotating member:

$$N2=N3+(N1-N3)/R0$$

$$R=N1 \cdot R0/((R0-1) \cdot 0 N3+N1)$$

where N1 is a number of revolution of the first rotating member, N2 is a number of revolution of the second rotating member, N3 is a number of revolution of the third rotating member, R is a reduction ratio of the automatic transmission, and R0 is a reduction ratio of the automatic transmission in a stopped state of the third rotating member and smaller than 1. In this construction, the third rotating member is bidirectionally rotatable. The second rotating member is automatically adjusted to a number of revolution at which an equilibrium is maintained between torque developed by the second rotating member and a load applied to the second rotating member when the third rotating member is in rotation at a number of revolution ranging between zero at which the third rotating member is stationary and a number of revolution at which the third rotating member is in rotation together with the first rotating member in one and the same direction.

According to the above-described construction, the number of revolution N2 of the second rotating member corresponding to the number of revolution N3 of the third rotating member is represented as the relationship shown in FIG. 3 on condition that the number of revolution N1 of the first rotating member is constant. In FIG. 3, a sun gear, a ring gear and a carrier correspond to the first, second and third rotating members respectively. Further, the reduction ratio R of the automatic transmission corresponding to the number of revolution N3 of the third rotating member is represented as the relationship shown in FIG. 4. When the number of revolution of the third rotating member is small on condition that the number of revolution of the first rotating member is constant, the number of revolution of the second rotating member is small. However, the torque of the second rotating member is large since the reduction ratio is large. Further, when the number of revolution of the third rotating member is large, the number of revolution of the second rotating member is large. However, the torque of the second rotating member is small since the reduction ratio is small. This characteristic means that the torque of the second rotating member is automatically adjusted so that the number of revolution thereof equilibrates the magnitude of the load.

Each aforesaid automatic transmission preferably further comprises a reverse rotation preventing element which prevents the third rotating member from rotation in a direction opposite one in which the first rotating member is rotated. In each aforesaid construction, a repulsive force the rotation transmitting element provided on the third rotating member receives from the second rotating member is large when the load is large. As a result, the third rotating member is rotated in the direction opposed to the first rotating member, whereupon rotation of the first rotating member cannot be transmitted to the second rotating member. In this case, however, the reverse rotation preventing element prevents the third rotating member from rotation in the direction opposed to the first rotating member, so that the rotation of the first rotating member is transmitted to the second rotating member.

The load acting upon the second rotating member is reduced upon increase in the number of revolution thereof. Accordingly, the repulsive force the rotation transmitting element receives from the second rotating member is rendered small. Consequently, since the third rotating member is rotated in the same direction as the first rotating member, the torque of the second rotating member is automatically adjusted so that the number of revolution thereof equilibrates the magnitude of the load. In short, the reverse rotation preventing element corresponds to a one-way clutch provided for limiting a rotational direction of the stator of the torque converter employed in the conventional vehicle automatic transmission.

Each aforesaid automatic transmission preferably further comprises a fourth rotating member, a reverse rotation transmitting element which transmits rotation of the third rotating member to the fourth rotating member under a condition where the third rotating member is being rotated in a direction opposite one in which the first rotating member is rotated, and a stopping element which applies a stopping force to the fourth rotating member. In each aforesaid construction, a repulsive force the rotation transmitting element provided on the third rotating member receives from the second rotating member is large when the load is large. As a result, the third rotating member is rotated in the direction opposed to the first rotating member, whereupon rotation of the first rotating member cannot be transmitted to the second rotating member. In this case, however, the reverse rotation preventing element transmits the rotation of the third rotating member to the fourth rotating member, so that the fourth rotating member is rotated. When the stopping element is then operated, a stopping force is applied to the fourth and accordingly third rotating members, so that the rotation of the first rotating member is transmitted to the second rotating member.

The load acting upon the second rotating member is reduced upon increase in the number of revolution thereof. Accordingly, the repulsive force the rotation transmitting element receives from the second rotating member is rendered small. Consequently, since the third rotating member is rotated in the same direction as the first rotating member, the torque of the second rotating member is automatically adjusted so that the number of revolution thereof equilibrates the magnitude of the load. In short, the stopping element functions as a clutch element for transmitting rotation of the first rotating member to the second rotating member. The above-described construction is suitable for a case where a rotating source which rotates the first rotating member is an internal combustion engine or a case where a starting torque is large as in large-sized electric motors such that a large torque acts in the starting.

The stopping element preferably increases the stopping force applied to the fourth rotating member with increase in a number of revolution of the fourth rotating member. The fourth rotating member is rotated when a large load rotates the third rotating member in the direction opposed to the first rotating member. Accordingly, the stopping element increases its stopping force against the fourth rotating member as the number of revolution of the fourth rotating member is increased. Upon stop of the third rotating member, the rotation transmitting element is operated so that the rotation of the first rotating member is transmitted to the second rotating member, whereupon the second rotating member is rotated in the same direction as the first rotating member. Since the rotation transmitting element provided on the third rotating member tends to rotate with the first rotating member, the third rotating member is subjected to a first torque which rotates it in the same direction as the first rotating member. Further, the rotation transmitting element receives a repulsive force from the second rotating member. The repulsive force applies to the third rotating member a second torque which rotates it in the direction opposed to the first rotating member. In this case, the repulsive force the rotation transmitting element receives from the second rotating member is large when the second rotating member starts to rotate in the same direction as the first rotating member. Accordingly, the second torque is larger than the first torque such that the third rotating member is rotated in the direction opposed to the first rotating member. When the number of revolution of the second rotating member is increased and the torque acting upon the second rotating member is reduced, the repulsive force the rotation transmitting element receives from the second rotating member is reduced. As a result, the first torque acting upon the third rotating member is increased such that the number of revolution at which the third rotating member is rotated in the direction opposed to the first rotating member is reduced. Consequently, since the number of revolution of the fourth rotating member is reduced, the stopping force the stopping element applies to the third rotating member is reduced. That is, the stopping element applies the stopping force to the third rotating member but does not completely stop it. In short, the stopping element functions as a clutch element for transmitting the rotation of the first rotating member to the second rotating member in an incompletely or half engaged state.

The stopping element preferably increases the stopping force applied to the fourth rotating member with increase in a number of revolution of the first rotating member. The fourth rotating member is rotated when a large load rotates the third rotating member in the direction opposed to the first rotating member. At this time, the stopping element increases its stopping force against the fourth rotating member as the number of revolution of the first rotating member is increased. Upon stop of the third rotating member, the rotation transmitting element is operated so that the rotation of the first rotating member is transmitted to the second rotating member, whereupon the second rotating member is rotated in the same direction as the first rotating member. In this case, the number of revolution of the third rotating member and accordingly the number of revolution of the fourth rotating member are large when the number of revolution of the first rotating member is large. Accordingly, although the stopping element increases its stopping force against the fourth rotating member as the number of revolution of the first rotating member is increased, the third rotating member is not completely stopped. In short, the stopping element functions as a clutch element for transmitting the rotation of the first rotating member to the second rotating member in an incompletely or half engaged state.

The stopping element preferably applies the stopping force to the fourth rotating member when externally operated. When externally operated, the stopping element stops the fourth rotating member and accordingly the third rotating member. Consequently, the rotation of the first rotating member can be transmitted to the second rotating element. In short, the stopping element functions as manual clutch means.

Further, the automatic transmission preferably further comprises a stop holding element which holds the third rotating member in a stopped state. When the stop holding element is operated so that the third rotating member is held in the stopped state, rotation of the first rotating member can be transmitted to the second rotating member at the predetermined reduction ratio exceeding 1. Accordingly, the rotation of the first rotating member can be transmitted to the second rotating member irrespective of the direction of rotation of the first rotating member. The above-described construction is suitable for electric vehicles and trains in which the rotational direction of the rotating source rotating the first rotating member is reversible.

The stop holding element preferably reduces a stop holding force with increase in the number of revolution of the second rotating member rotated in a same direction as the first rotating member is rotated. The stopping element reduces the stopping force against the third rotating member when the number of revolution of the second rotating member is increased. Accordingly, the third rotating member is rotated in the same direction as the first rotating member and the number of revolution of the second rotating member is automatically adjusted so that the torque thereof equilibrates the load. In this case, since the foregoing is applied to a case where the first rotating member is rotated in the reverse direction, the rotation of the first rotating member can be transmitted to the second rotating member irrespective of the rotational direction of the first rotating member.

The stop holding element preferably releases the third rotating member from a stop holding force applied thereto when the number of revolution of the second rotating member rotated with the first rotating member in a same direction as the first rotating member is rotated has exceeded a predetermined number of revolution. When the number of revolution of the second rotating member rotated in the same direction as the first rotating member is increased to or above a predetermined value, the torque rotating the third rotating member in the same direction as the first rotating member can be considered to be larger than the torque rotating the third rotating member in the direction opposed to the first rotating member. Accordingly, the third rotating member is rotated in the same direction as the first rotating member even though the stop holding element releases the third rotating member from the stop holding force. Consequently, the number of revolution of the second rotating member is automatically adjusted so that the torque thereof equilibrates the magnitude of the load. In this case, since the foregoing is applied to a case where the first rotating member is rotated in the reverse direction, the rotation of the first rotating member can be transmitted to the second rotating member irrespective of the rotational direction of the first rotating member.

The automatic transmission preferably further comprises a detecting element which detects torque rotating the third rotating member in a same direction as the first rotating member is rotated. In this construction, the stop holding element releases the third rotating member from a stop holding force applied thereto when the detecting element detects the torque rotating the third rotating member in the same direction as the first rotating member is rotated. When the third rotating member is subjected to torque tending to rotate it in the same direction as the first rotating member during rotation of the latter, the detecting element detects that. Since the stop holding element then releases the third rotating member from the stop holding force, the third rotating member is rotated in the same direction as the first rotating member and the number of revolution of the second rotating member is automatically adjusted so that the torque thereof equilibrates the magnitude of the load. In this case, since the foregoing is applied to a case where the first rotating member is rotated in the reverse direction, the rotation of the first rotating member can be transmitted to the second rotating member irrespective of the direction of rotation of the first rotating member.

Further, the automatic transmission preferably further comprises a number-of-revolution controlling element which controls a number of revolution of the third rotating member. The torque of the second rotating member is increased more as the difference between the numbers of revolution of the first and third rotating members becomes large. Accordingly, the torque of the second rotating member can be adjusted to any value when the number of revolution of the third rotating member is controlled by the number of revolution controlling element.

The number-of-revolution controlling element preferably combines a force stopping the third rotating member and a force integrating the third rotating member with the first rotating member, thereby controlling the number of revolution of the third rotating member. The force stopping the third rotating member is caused to work when the number of revolution of the third rotating member is to be reduced, whereas the force integrating the third rotating member with the first rotating member when the number of revolution of the third rotating member is to be increased. Consequently, the number of revolution of the third rotating member can be controlled by a simple construction.

The number-of-revolution controlling element preferably carries out the operation of the reverse rotation preventing element. The number of revolution of the third rotating member is reduced by the number-of-revolution controlling element when the load is so large that the third rotating member is rotated in the direction opposed to the first rotating member. As a result, in the construction including the number-of-revolution controlling element, the rotation of the first rotating member can be transmitted to the second rotating member without using a reverse rotation limiting element.

The number-of-revolution controlling element preferably carries out an operation of the stop holding element. In the construction including the number-of-revolution controlling element, the third rotating member is held in the stopped state by the number-of-revolution controlling element, whereupon the rotation of the first rotating member can be transmitted to the second rotating member without using a stop holding element irrespective of the direction of rotation of the first rotating member.

The automatic transmission preferably further comprises a load determining element which determines a magnitude of load based on a difference between numbers of revolution of the first and third rotating members both rotated in a same direction. In a case where the third rotating member is rotated in the same direction as the first rotating member, the difference between the numbers of revolution of the first and third rotating members is large when the load is large. The difference is small when the load is small. Accordingly, the load determining element can determine the magnitude of the load on the basis of the difference between the number of revolution of the first rotating member and the number of revolution of the third rotating member rotated in the same direction as the first rotating member.

The automatic transmission preferably includes a pair of the aforesaid automatic transmissions including the respective reverse rotation preventing elements and having effective input rotational directions opposed to each other. The automatic transmission further comprises an input rotation transmitting element transmitting input rotation only to the first rotating member of the automatic transmission effectively operating with respect to the direction of input rotation, and an output rotation transmitting element transmitting as an output rotation only rotation of the second rotating member of the automatic transmission effectively operating with respect to the input rotation.

According to the above-described construction, the input rotation transmitting element effectively transmits input rotation to the first rotating member of one of the paired automatic transmissions but does not effectively transmit the input rotation to the first rotating member of the other automatic transmission. In said one automatic transmission, the reverse rotation preventing element prevents the third rotating member from being rotated in the direction opposed to the first rotating member. Accordingly, the rotation of the first rotating member is transmitted to the second rotating element. Consequently, only said one automatic transmission effectively operates, and the third rotating member is rotated in the same direction as the first rotating member, so that the number of revolution of the second rotating member is automatically adjusted so that the torque thereof equilibrates the magnitude of the torque. In this case, since said one automatic transmission is effectively operated, the output rotation transmitting element effectively transmits the rotation of the second rotating member of said one automatic transmission is effectively transmitted as the output rotation.

Further, when rotated in the reverse direction, the input rotation is effectively transmitted by the input rotation transmitting element to the first rotating member of said one transmitting element but is not effectively transmitted to the first rotating member of said other automatic transmission. Consequently, only said other automatic transmission effectively operates and the rotation of the second rotating member of said other automatic transmission can effectively be transmitted. The above-described construction is suitable for the construction in which reverse rotation is possible in the input rotation.

The first rotating member preferably comprises a sun gear of a double pinion planetary gear, the second rotating member preferably comprises a ring gear of the planetary gear, the third rotating member preferably comprises a planetary pinion carrier of the planetary gear, and the rotation transmitting element preferably comprises a pinion gear of the planetary gear. Since the double pinion planetary gear is used, the size of the automatic transmission can be reduced and the construction thereof can be simplified.

The reverse rotation preventing element preferably comprises a one-way clutch. Consequently, the construction of the reverse rotation preventing element can be simplified.

The reverse rotation transmitting element preferably comprises a one-way clutch. Consequently, the construction of the reverse rotation transmitting element can be simplified.

A plurality of the automatic transmissions are preferably serially connected to each other or one another. The reduction ratio of the overall automatic transmission is obtained by multiplication of reduction ratios of the respective automatic transmissions. Consequently, a large reduction ratio can be obtained.

The automatic transmission is preferably connected to a step-up gear with a reduction ratio smaller than 1. Consequently, the minimum reduction ratio can be set at a value smaller than 1.

A plurality of the automatic transmissions are preferably provided and rotation of the second rotating members of the respective automatic transmissions are combined together to be delivered. In order that the numbers of revolution of a plurality of rotating members may efficiently be combined together, the numbers of revolution of all the rotating members should be equal to each other or one another. When the numbers of revolution of the rotating members differ from each other, a rotating member with a small number of revolution becomes a resistance against a rotating member with a large number of revolution, so that the overall transmission efficiency is reduced.

In the above-described construction, however, the reduction ratio of each automatic transmission is automatically adjusted individually according to the magnitude of the load. Consequently, the rotation of the second rotating members can be combined at a maximum efficiency to be delivered even when the numbers of revolution of the first rotating members of the respective automatic transmissions differ from one another.

A plurality of the automatic transmissions are preferably provided. The first rotating members are rotated by a rotating source and the drive wheels are rotated by the second rotating members respectively. In the acceleration, the reduction ratio is smoothly reduced as the vehicle number of revolution is increased. Accordingly, the vehicle can smoothly be accelerated without shock due to gear shift. Further, in the deceleration, the reduction ratio is smoothly increased as the speed of the vehicle is reduced. Accordingly, since the rotating source can serve as a brake, the vehicle can smoothly be decelerated without shock due to gear shift. Further, since the rotation of the rotating source is transmitted to the drive wheels at a maximum efficiency, fuel consumption can be improved when the rotating source is an engine. The consumption of a battery can be reduced when the rotating source is an electric motor used in hybrid cars or electric cars.

The number-of-revolution controlling element preferably reduces the number of revolution of the third rotating member when a braking operation is carried out. In this construction, the number-of-revolution controlling element reduces the number of revolution of the third rotating member when a braking operation is carried out so that the vehicle is decelerated. Consequently, since the reduction ratio is increased, a large braking force can be obtained.

In the aforesaid construction that the number-of-revolution controlling element reduces the number of revolution of the third rotating member when a braking operation is carried out, the reduction in the number of revolution of the third rotating member increases the reduction ratio. As a result, the number of revolution of the first rotating member and accordingly the number of revolution of the rotating source sometimes exceed respective allowed numbers of revolution. This would result in malfunction of the rotating source. In view of this problem, the number-of-revolution controlling element preferably controls the number of revolution of the third rotating member so that a number of revolution of the rotating source is reduced to or below an allowed number of revolution. Consequently, the number of revolution of the rotating member can be prevented from exceeding the allowed number of revolution.

The automatic transmission preferably further comprises an auxiliary rotating source for rotating the second rotating member in a same direction as the first rotating member is rotated, the auxiliary rotating source being operated on the basis of the magnitude of load determined by the load determining element. The auxiliary rotating source is operated on the basis of the magnitude of load determined by the load determining element, whereby the torque of the second rotating member and accordingly the torque of the drive wheels can be adjusted optionally.

A rotating force the auxiliary rotating source applies to the second rotating member is preferably increased with an increase in the load determined by the load determining element. The number of revolution of the second rotating member and accordingly the number of revolution of the drive wheels are reduced when the load is increased such that the number of revolution of the third rotating member is reduced. In the above-described construction, when the number of revolution of the third rotating member has been reduced, the load determining element determines that the load has been increased. Accordingly, the auxiliary rotating source increases the torque which rotates the second rotating member in the same direction as the first rotating member. Consequently, the number of revolution of the second rotating member and accordingly the number of revolution of the drive wheels can be prevented from being reduced. The aforesaid construction is suitable for hybrid cars and motor-assisted bicycles.

The automatic transmission is preferably provided for every drive wheel. Each automatic transmission automatically adjusts the number of revolution of the corresponding drive wheel individually so that the driving force equilibrates the running resistance. Accordingly, the number of revolution of each inner drive wheel becomes smaller than that of each outer drive wheel when the vehicle turns. Consequently, the vehicle can turn without an excessive force being applied to each drive wheel. That is, the automatic transmission can function as a differential gear.

Further, the rotation of the rotating source is transmitted to each drive wheel individually in the above-described construction. Accordingly, even when one of the drive wheels slips, the driving force of each of the other drive wheels is not lost. Thus, the automatic transmission can function as a non-slip differential gear. Further, the number of revolution of the slipped drive wheel is rapidly increased such that the driving force is rapidly reduced. Consequently, slippage can promptly be eliminated.

BRIEF DESCRIPTION OF THE DRAWINGS

Other objects, features and advantages of the present invention will become clear upon reviewing of the following description of the preferred embodiments, made with reference to the accompanying drawings, in which.

BEST MODE FOR CARRYING OUT THE INVENTION

Figure 1:
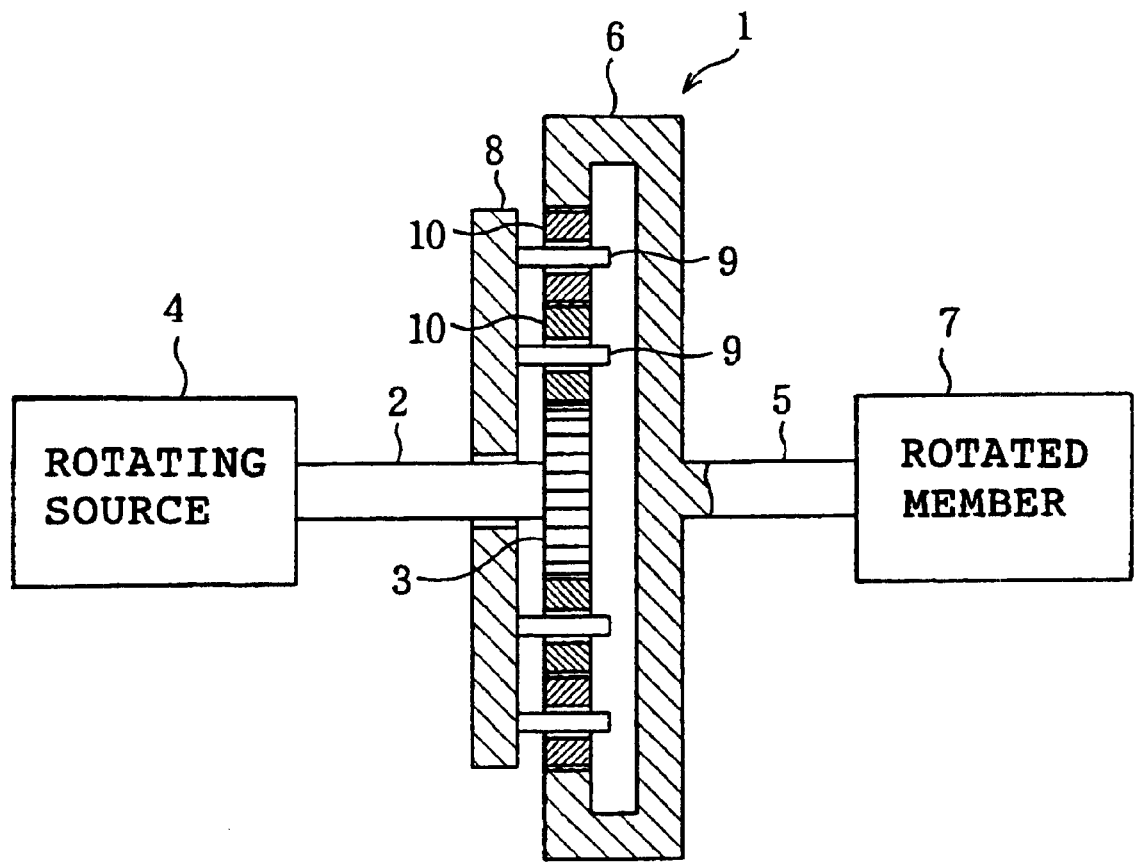
FIG. 1 is a side view of the automatic transmission in accordance with the present invention, showing the basic construction thereof.
Figure 2:
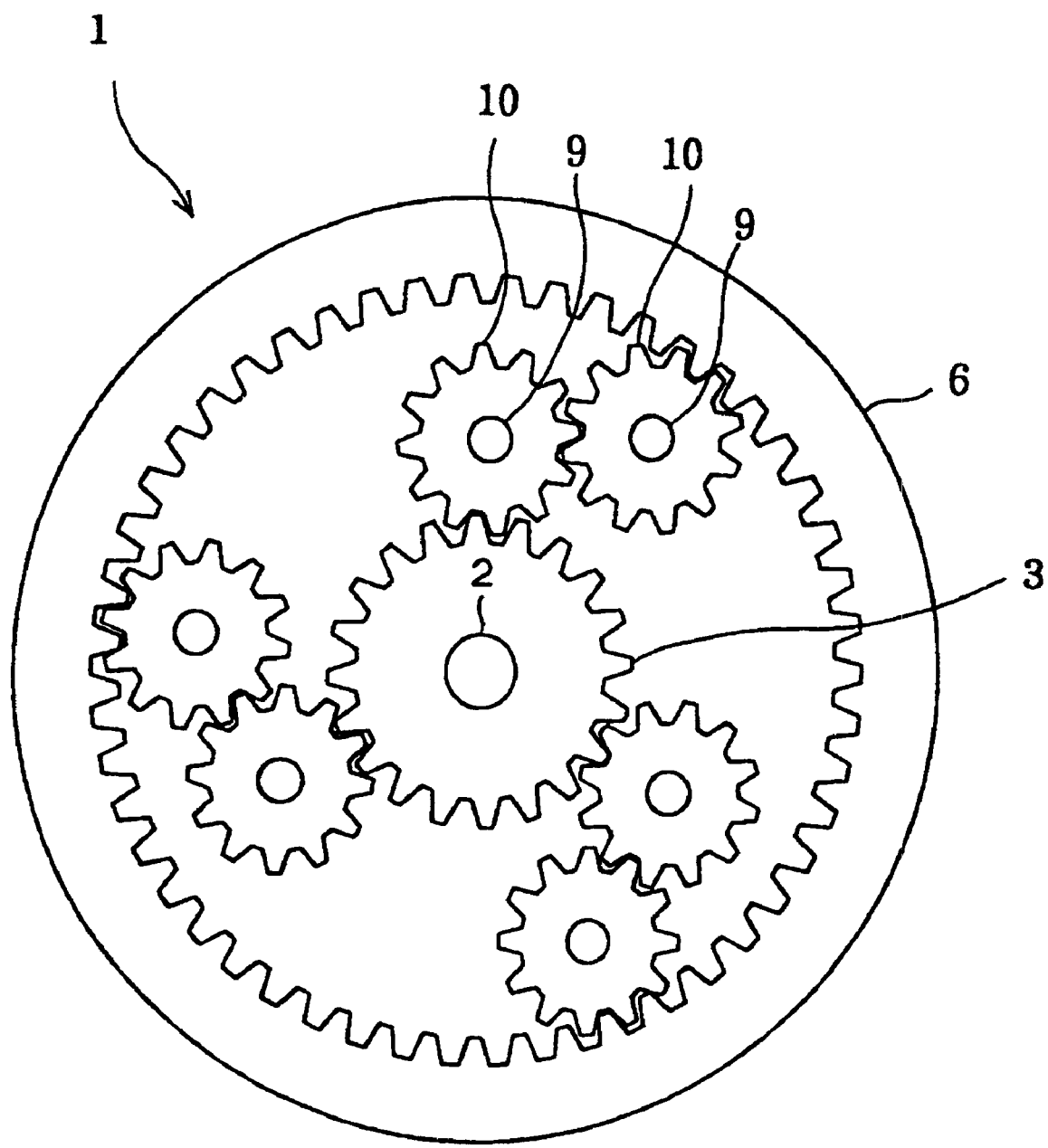
FIG. 2 is a front view of the automatic transmission.

Several embodiments of the present invention will be described with reference to the accompanying drawings. First, the basic construction of the automatic transmission in accordance with the invention will be described. Referring to FIGS. 1 and 2, the automatic transmission 1 basically comprises a double pinion planetary gear. More specifically, a sun gear 3 serving as a first rotating member is integrated with an input shaft 2. The number of teeth Z of the sun gear 3 is 1. The sun gear 3 is rotated by a rotating source 4. An output shaft 5 is coaxial with the input shaft 2. A ring gear 6 serving as a second rotating member is integrated with the output shaft 5. The number of teeth Z of the ring gear 6 is 2. A rotated member 7 is rotated with rotation of the ring gear 6.

A planetary pinion carrier 8 serving as a third rotating member is rotatably mounted on a stationary portion (not shown) or the input shaft 2. A plurality of shafts 9 are rotatably mounted on the carrier 8. A plurality of pinion gears 10 are mounted on the shafts 9 respectively so as to be in mesh engagement with each other. Each pinion gear 10 serves as a rotation transmitting element and the number of teeth Z thereof is 3. One of the pinion gears 10 is further in mesh engagement with the sun gear 3, whereas the other pinion gear 10 is further in mesh engagement with the ring gear 6.

When the sun gear 3 is rotated by the rotating source 4, the pinion gear 10 and accordingly the carrier 8 tend to rotate with the sun gear 3. At this time, the rotated member 7 is stationary. Since load applied to the ring gear 6 is large, a repulsive force the pinion gear 10 receives from the ring gear 6 rotates the carrier 8 in a direction opposed to the sun gear 3. Consequently, the rotation of the sun gear 3 is not transmitted to the ring gear 6.

Meanwhile, when a stopping force is applied to the carrier 8 by a suitable means, the carrier is stopped and accordingly, the rotation of the sun gear 3 is transmitted via the pinion gears 10 to the ring gear 6. Consequently, the ring gear 6 and accordingly the rotated member 7 are rotated in the same direction as the sun gear 3. Thus, when considering forces acting upon the carrier 8 under the condition that the sun gear 3 and the ring gear 6 are in rotation, the pinion gear 10 tends to rotate with the sun gear 3. This results in a rotating force acting upon the carrier 8 and tending to rotate it in the same direction as the sun gear 3. Further, the pinion gear 10 receives a repulsive force from the ring gear 6. This repulsive force 10 results in another rotating force acting upon the carrier 8 and tending to rotate it in the direction opposed to the sun gear 3.

The load applied to the ring gear 6 is large when the rotated member 7 starts to rotate. A repulsive force the pinion gear 10 receives from the ring gear 6 results in a rotating force acting upon the carrier 8 and tending to rotate it in the direction opposed to the sun gear 3. This rotating force is larger than a rotating force acting upon the carrier 8 with rotation of the sun gear 3 and tending to rotate the carrier in the same direction as the sun gear. Accordingly, the carrier 8 is rotated in the direction opposed to the sun gear 3.

When the number of revolution of the rotated member 7 is increased upon stop of the carrier 8, the load applied to the ring gear 6 is rendered small such that the repulsive force the pinion gear 10 receives from the ring gear 6 is reduced. As a result, the torque applied to the carrier 8 so that it is rotated in the direction opposed to the sun gear 3 is reduced, whereas the torque applied to the carrier 8 so that it is rotated in the same direction as the sun gear 3 remains unchanged. Accordingly, the torque applied to the carrier 8 so that it is rotated in the same direction as the sun gear 3 becomes larger than the torque applied to the carrier 8 so that it is rotated in the direction opposed to the sun gear 3. Consequently, the carrier 8 being rotated in the direction opposed to the sun gear 3 is stopped and then rotated in the same direction as the sun gear 3.

When the carrier 8 is rotated in the same direction as the sun gear 3, the ring gear 6 is rotated with rotation of the pinion gear 10 and is further pushed by the pinion gear 10 with rotation of the carrier 8 to be rotated. Thus, two rotation transmission paths are provided between the sun gear 3 and the ring gear 6, that is, a first transmission path with a predetermined reduction ratio (=Z2/Z1) which is larger than 1 and a second transmission path with a reduction ratio of 1. A sum of the numbers of revolution at which the ring gear 6 is rotated with the respective reduction ratios is a number of revolution of the ring gear 6. In this case, when the carrier 8 is stopped, all the rotation of the sun gear 3 is consumed for rotation of the ring gear 6 by the operation of the pinion gear 10 in the same direction as the first rotating member is rotated. In this state, a reduction ratio or gear ratio for the transmission path from the sun gear 3 via the pinion gear 10 to the ring gear 6 is obtained on the basis of the numbers of teeth of the respective gears by the equation, $(Z3/Z1) \times (Z3/Z3) \times (Z2/Z3) = Z2/Z1$. That is, the value obtained by dividing the number of teeth of the ring gear 6 by the number of teeth of the sun gear 3 becomes a reduction ratio of the automatic transmission 1. Further, the aforesaid equation denotes that the reduction ratio is not affected by the number of teeth of the pinion gear 10.

When the carrier 8 is being rotated at a lower number of revolution than the sun gear 3, one part of rotation of the sun gear 3 is consumed for rotation of the ring gear 6 in the same direction as the sun gear 3 by the operation of the pinion gear 10. The other part of the rotation of the sun gear 3 is consumed for the pinion gear 10 pushing the ring gear 6 in the same direction as the sun gear 3 is rotated. Further, when the carrier 8 is being rotated at the same number of revolution as the sun gear 3, all the rotation of the sun gear 3 is consumed for the pinion gear 10 pushing the ring gear 6 in the same direction as the sun gear 3 is rotated since the pinion gear 10 is rotated with the sun gear 3. In this state, the reduction ratio of the automatic transmission 1 becomes 1.

In other words, the number of revolution of the ring gear 6 is obtained by adding the number of revolution of the carrier 8 and a number of revolution obtained by dividing, by a reduction ratio of the automatic transmission with the carrier being stopped, the value obtained by subtracting the number of revolution of the carrier from the number of revolution of the sun gear 3. Furthermore, the reduction ratio of the automatic transmission 1 at this time is obtained by dividing the number of revolution of the sun gear 3 by the number of revolution of the ring gear 6. The number of revolution of the ring gear 6 is shown as:

$$N2=N3+(N1-N3)/R0$$

where N1 is a number of revolution of the sun gear 3, N2 is a number of revolution of the ring gear 6, N3 is a number of revolution of the carrier 8, R0 is a reduction ratio of the automatic transmission 1 when the carrier is stopped.

Figure 3:
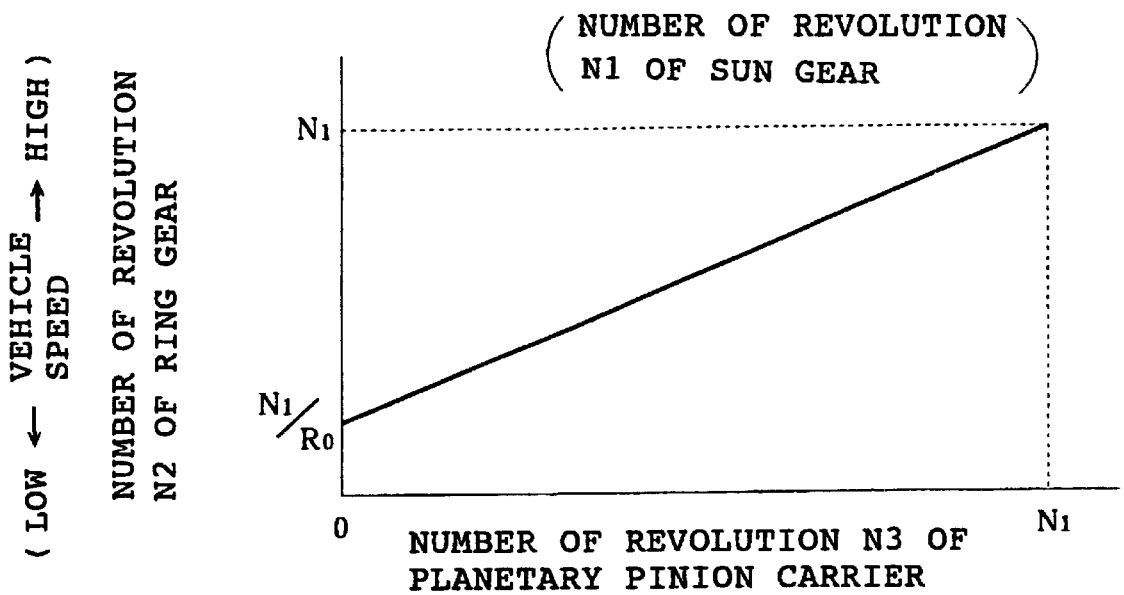
FIG. 3 is a graph showing the relationship between the numbers of revolution of the planetary carrier and the ring gear.

FIG. 3 shows the relationship between the numbers of revolution of the carrier 8 and the ring gear 6 when the number of revolution of the sun gear 3 is N1 or constant. Further, the reduction ratio R of the automatic transmission 1 is obtained by N1/N2 as follows:

$$\begin{aligned} R &= N1/N2 \\ &= N1/(N3+(N1-N3)/R0) \\ &= N1 \cdot R0/(N3 \cdot R0 + N1 - N3) \\ &= N1 \cdot R0/((R0-1) \cdot N3 + N1) \end{aligned}$$

Thus, in order that the reduction ratio R of the automatic transmission 1 may be obtained, the number of revolution N1 of the sun gear 3 is first multiplied by the reduction ratio R0 of the carrier 8 in its stopped state. The result of the above multiplication is then divided by a value obtained by adding the number of revolution N1 of the sun gear 3 to the value of (R0–1) multiplied by the number of revolution N3 of the carrier 8. This means that under the condition that the number of revolution N1 of the sun gear 3 is constant, the reduction ratio R of the automatic transmission 1 becomes smaller by the reciprocal of the number of revolution N3 of the carrier 8 as N3 becomes large.

Figure 4:
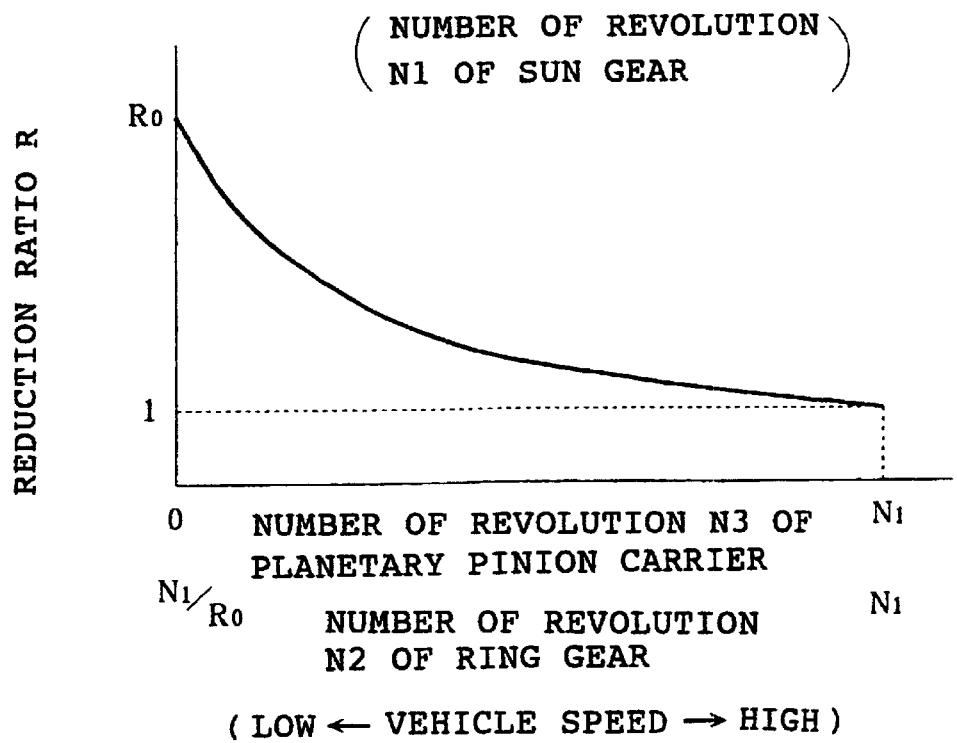
FIG. 4 is a graph showing the relationship between the number of revolution of the planetary carrier and the reduction ratio.

FIG. 4 shows the relationship between the number of revolution N3 of the carrier 8 and the reduction ratio R of the automatic transmission 1 when the number of revolution of the sun gear 3 is at N1 or constant. Further, the torque T2 of the ring gear 6 is obtained by T1.R where T1 is the torque of the sun gear 3 as follows:

$$T2=T1 \cdot N1 \cdot R0/((R0-1)N3+N1)$$

Figure 5:
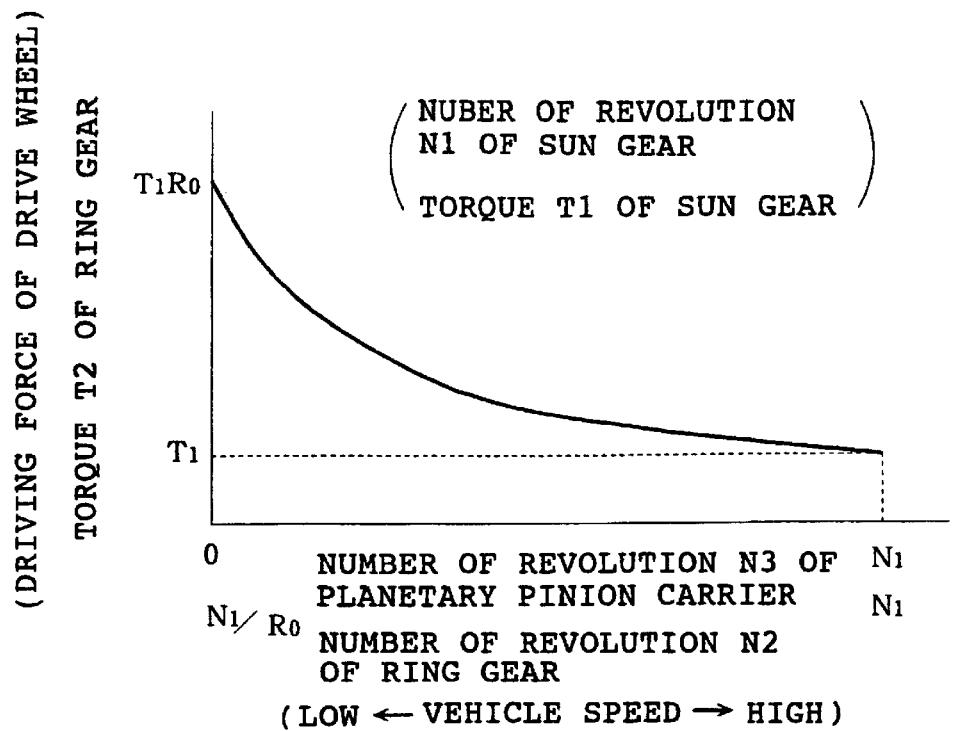
FIG. 5 is a graph showing the relationship between the number of revolution of the planetary carrier and the torque of the ring gear.

FIG. 5 shows the relationship between the number of revolution N3 of the carrier 8 and the torque T2 of the ring gear 6 under the condition where the number of revolution of the sun gear 3 is at N1 and constant. However, the torque T1 of the sun gear 3 is constant irrespective of the number of revolution thereof. In short, under the condition where the number of revolution and torque of the sun gear 3 are constant, the number of revolution of the ring gear 6 is increased with increase in the number of revolution of the carrier 8, whereas the torque of the ring gear 6 is reduced with increase in the number of revolution of the carrier.

Figure 6:
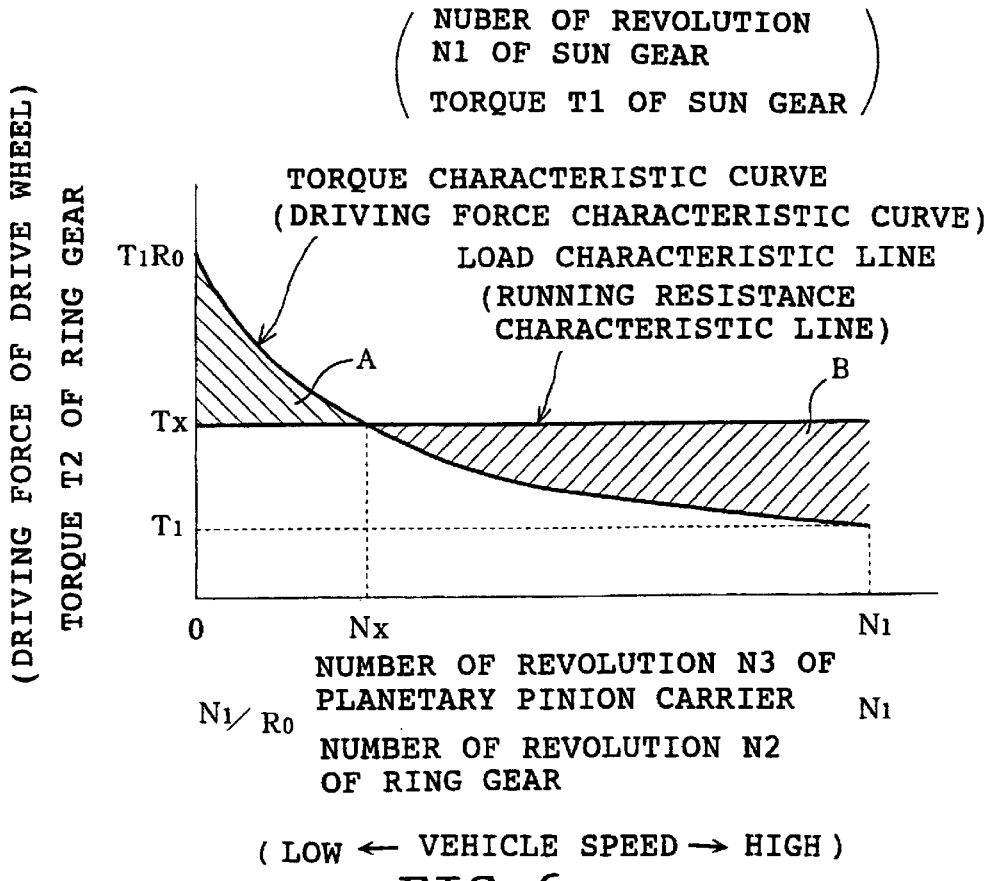
FIG. 6 is a graph showing the relationship between the torque curve and the load curve of the ring gear corresponding to the number of revolution of the planetary carrier.

Assume now that the torque (load) Tx required to maintain rotation of the rotated member 7 is constant over the rotatable number of revolution range of the ring gear 6, as shown in FIG. 6. The carrier 8 is subjected to a force increasing the torque rotating the it in the same direction as the sun gear 3 in a region A shown by oblique lines where the torque characteristic curve of the ring gear 6 is above the load characteristic line. As a result, the number of revolution of the carrier 8 is increased. Further, the carrier 8 is subjected to a force increasing the torque rotating it in the direction opposed to the sun gear 3 in a region B shown by oblique lines where torque characteristic curve of the ring gear 6 is below the load characteristic line. As a result, the number of revolution of the carrier 8 is reduced. Accordingly, the torque of the ring gear 6 and the torque required to maintain rotation of the rotated member 7 equilibrate at a point where the torque characteristic curve of the ring gear 6 crosses the load characteristic line. The number of revolution of the ring gear 6 at this time is shown by Nx.

Figure 7:
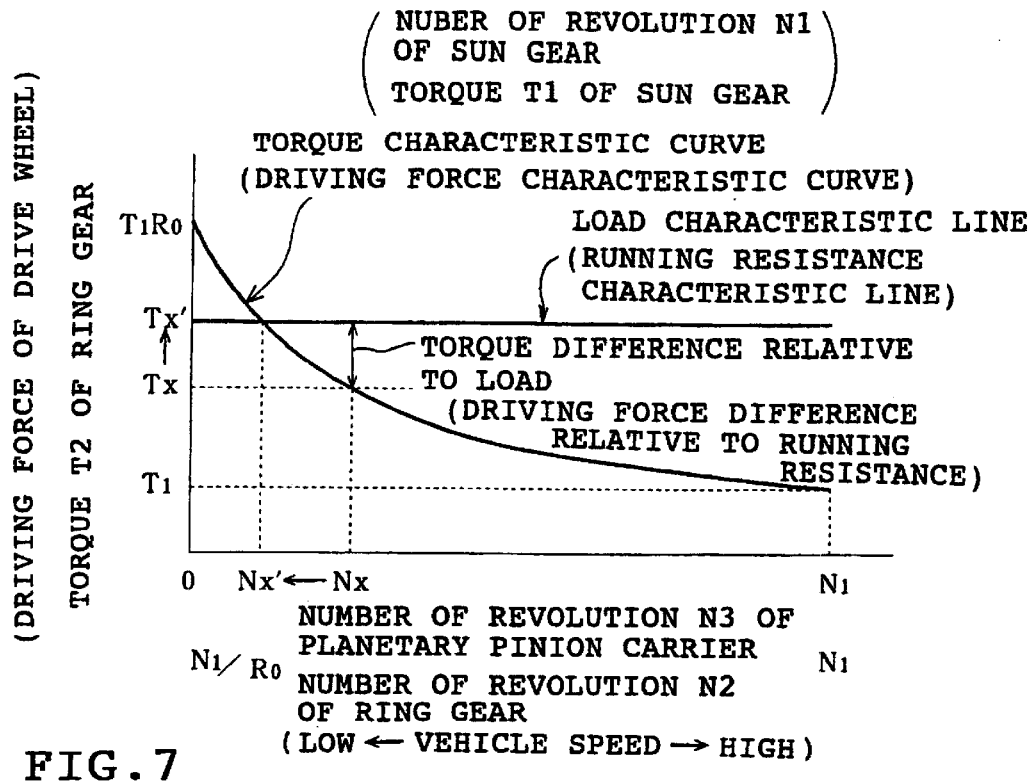
FIG. 7 is a graph similar to FIG. 6, showing the case where the load has been increased.

The aforesaid torque characteristic curve varies according to the magnitude of the load. More specifically, when the load is increased in the equilibrium state as shown in FIG. 6, the load characteristic line is moved upward in the overall rotatable number of revolution range of the ring gear 6 as shown in FIG. 7. The torque of the ring gear 6 equilibrating the load is increased to Tx'. As a result, under the condition that the number of revolution N3 of the sun gear 3 is constant, the torque (=Tx) of the ring gear 6 is rendered smaller than the torque (=Tx') required to maintain the current number of revolution of the rotated member 7. Thus, when the load is increased in the equilibrium state of the torque of the ring gear 6 and the load, the torque applied to the carrier 8 so that it is rotated in the direction opposed to the sun gear 3, whereas the torque applied to the carrier 8 so that it is rotated in the same direction as the sun gear 3 remains unchanged. As a result, the number of revolution of the carrier 8 is reduced such that the difference between the numbers of revolution of the sun gear 3 and the carrier 8 is increased. In this case, the reduction ratio of the automatic transmission 1 is increased with increase in the difference between the numbers of revolution of the sun gear 3 and the carrier 8. Accordingly, the reduction ratio of the automatic transmission 1 is increased by an amount equal to a reduction in the number of revolution of the carrier 8, whereupon the number of revolution of the ring gear 6 is reduced. Consequently, the number of revolution of the ring gear 6 is reduced according to an amount of increase in the load. However, since the torque of the ring gear 6 is increased with the reduction in the number of revolution of the ring gear 6, the number of revolution of the ring gear 6 is reduced until the torque characteristic curve and the load characteristic line cross. At this time, the number of revolution of the ring gear 6 is stabilized and the number of revolution of the planetary carrier 8 is reduced from Nx to Nx'.

Figure 8:
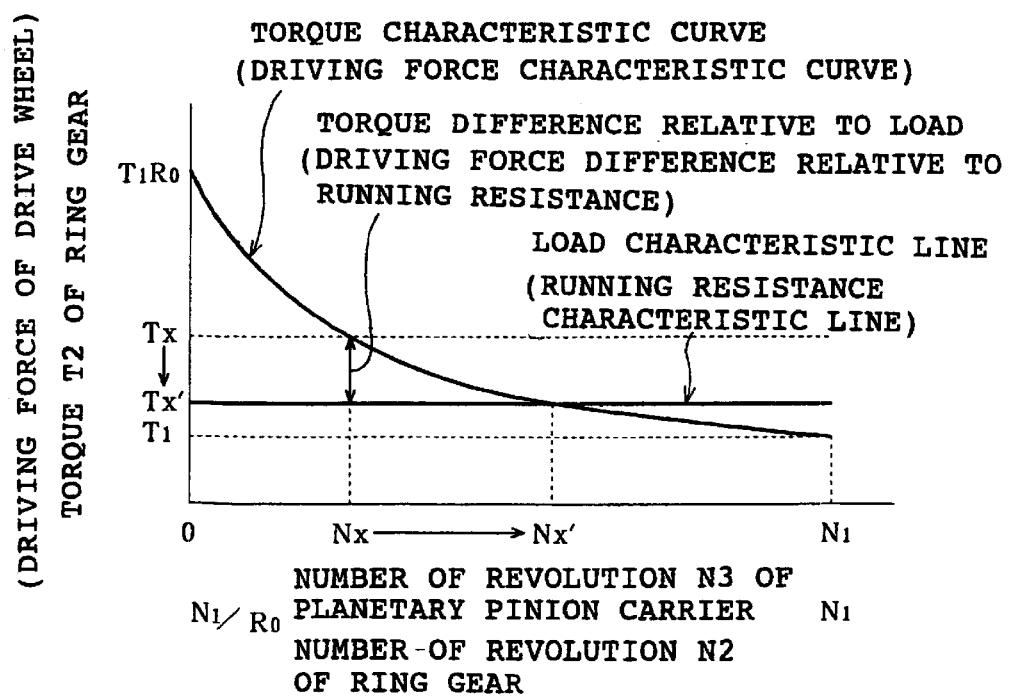
FIG. 8 is a graph similar to FIG. 6, showing the case where the load has been reduced.

Further, when the load is reduced in the equilibrium state as shown in FIG. 6, the load characteristic line is moved downward from the equilibrium state shown in FIG. 6 over the overall rotatable number of revolution range of the ring gear 6 as shown in FIG. 8. The torque of the ring gear 6 equilibrating the load is reduced to Tx'. Consequently, under the condition that the number of revolution N1 of the sun gear 3 is constant, the torque (=Tx) of the ring gear 6 becomes larger than the torque (=TX) required to maintain the current rotation of the rotated member 7. Thus, when the load is reduced in the equilibrium state of the torque of the ring gear 6 and the load, the torque rotating the carrier 8 in the direction opposed to the sun gear 3 is reduced although the torque rotating the carrier 8 in the same direction as the sun gear 3 remains unchanged. As a result, the number of revolution of the carrier 8 is increased such that the difference between numbers of revolution of the sun gear 3 and the planetary gear 8 is reduced. In this case, the reduction ratio of the automatic transmission is reduced as the difference between the numbers of revolution of the sun gear 3 and the carrier 8 is reduced. As a result, the reduction ratio of the automatic transmission 1 is reduced according to an increase in the number of revolution of the carrier 8, so that the number of revolution of the ring gear 8 is increased. Consequently, although the number of revolution of the ring gear 6 is increased with reduction in the load, the torque of the ring gear 6 is reduced with the increase in its number of revolution. Accordingly, the number of revolution of the ring gear 6 is stabilized when the number of revolution of the ring gear is increased until the torque characteristic curve and the load characteristic line cross. The number of revolution of the carrier 8 is increased from Nx to Nx'.

As the result of the above-described operation, when the load is increased in the equilibrium state of the torque of the ring gear 6 and the load, the number of revolution of the ring gear 6 is increased whereas its torque is reduced. When the load is reduced, the number of revolution of the ring gear 6 is increased, whereas its torque is reduced simultaneously. Accordingly, the torque of the ring gear 6 is automatically adjusted so that the number of revolution thereof equilibrates the magnitude of the load.

Figure 9:
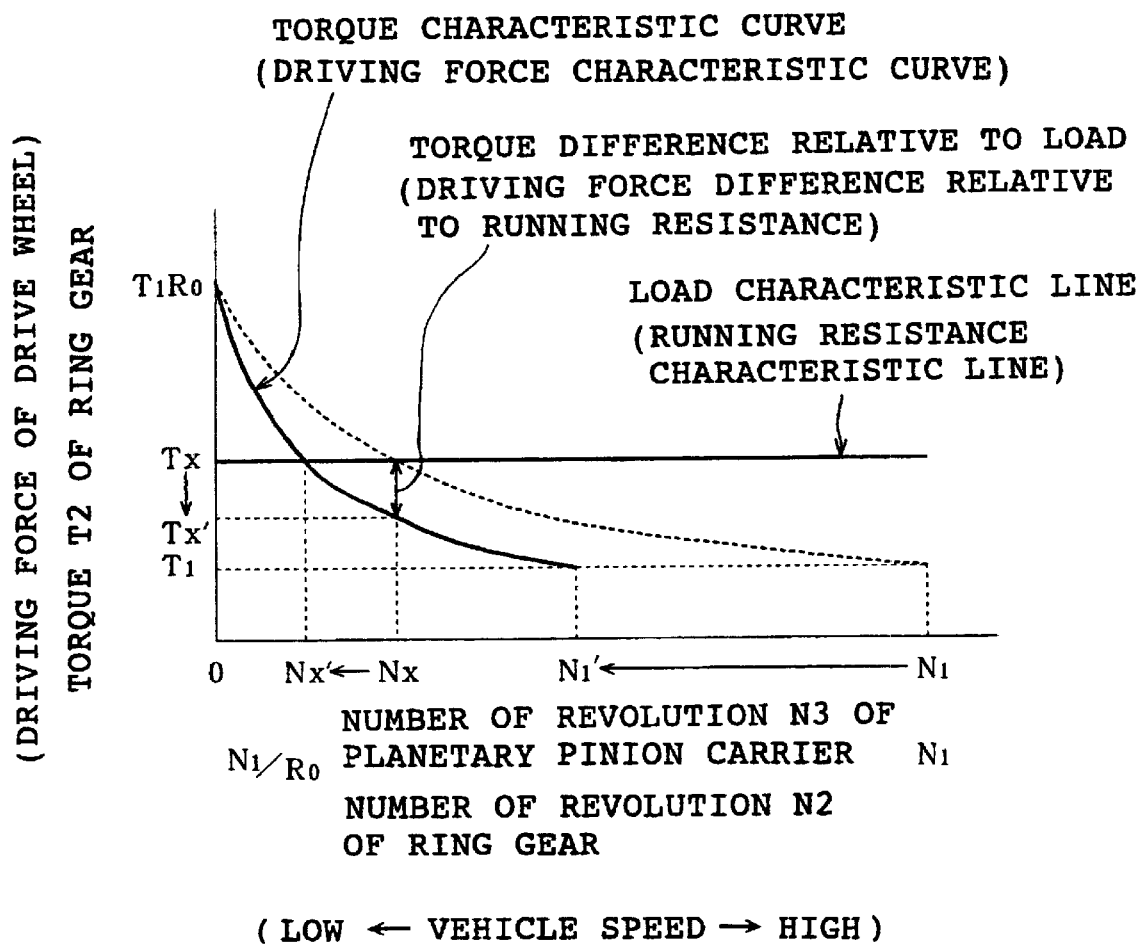
FIG. 9 is a graph similar to FIG. 6, showing the case where the number of revolution of the sun gear has been reduced.

On the other hand, the above-described torque characteristic curve varies according to the number of revolution of the sun gear 3. More specifically, when the number of revolution of the sun gear 3 is reduced from N1 to N1' in the equilibrium state as shown in FIG. 6, the torque characteristic curve is moved downward from the equilibrium state shown in FIG. 6 over the overall rotatable number of revolution range of the ring gear 6 as shown in FIG. 9. The torque of the ring gear 6 is reduced to Tx'. Consequently, under the condition that the load is constant, the torque (=Tx') of the ring gear 6 becomes smaller than the torque (=Tx) required to maintain the current number of revolution of the rotated member 7. Thus, when the number of revolution of the sun gear 3 is reduced in the equilibrium state of the torque of the ring gear 6 and the load, the torque rotating the carrier 8 in the same direction as the sun gear 3 is reduced although the torque rotating the carrier 8 in the direction opposed to the sun gear 3 remains unchanged. As a result, the number of revolution of the carrier 8 is reduced such that the difference between numbers of revolution of the sun gear 3 and the planetary gear 8 is increased. In this case, the reduction ratio of the automatic transmission 1 is increased as the difference between the numbers of revolution of the sun gear 3 and the carrier 8 is increased. As a result, the number of revolution of the ring gear 6 is reduced with reduction in the number of revolution of the sun gear 3. With this, however, the torque of the ring gear 6 is increased and accordingly, the number of revolution of the ring gear is stabilized when it is reduced until the torque characteristic curve and the load characteristic line cross. At this time, the number of revolution of the carrier 8 is reduced from Nx to Nx'.

Figure 10:
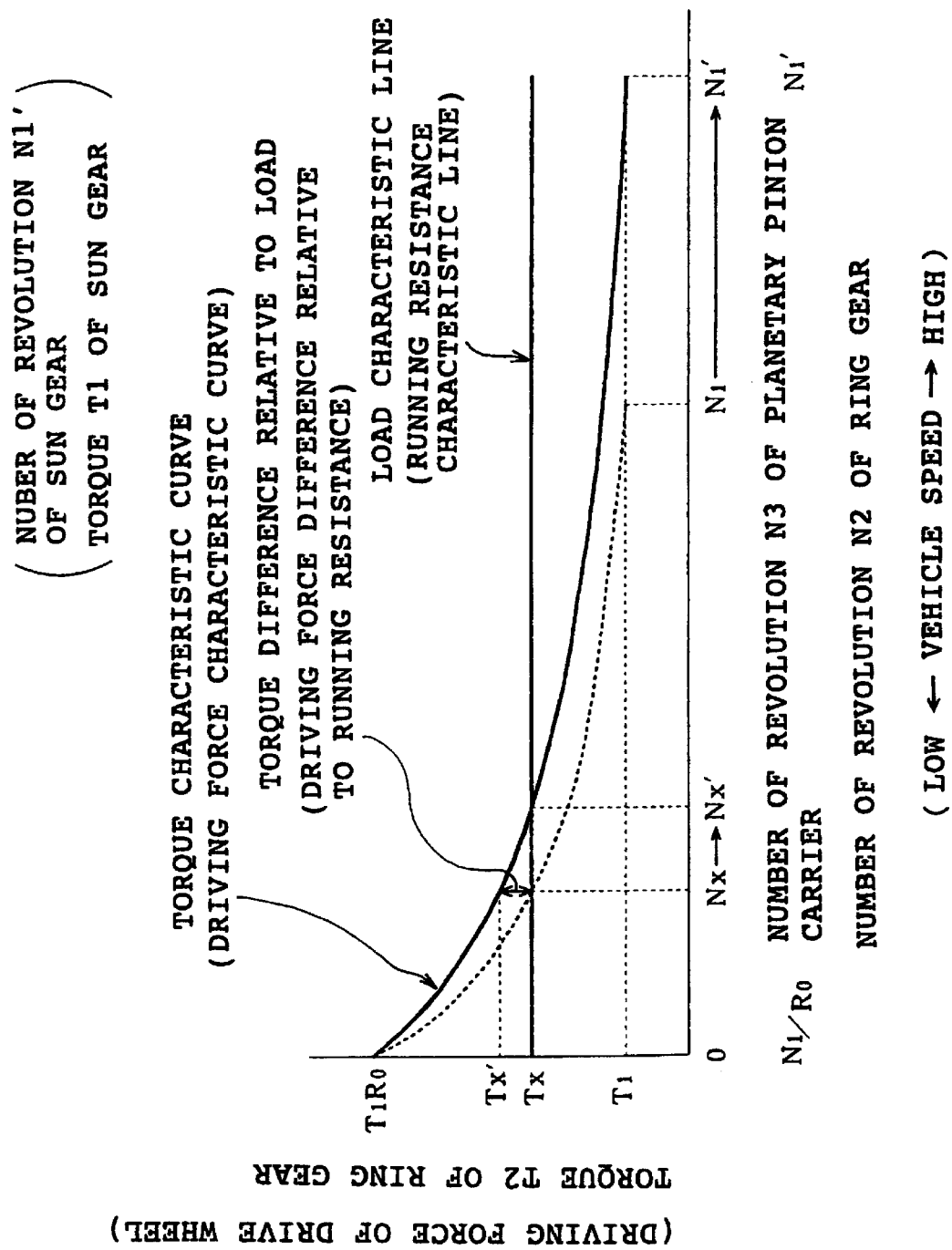
FIG. 10 is a graph similar to FIG. 6, showing the case where the number of revolution of the sun gear has been increased.

Further, when the number of revolution of the sun gear 3 is increased from N1 to N1' in the equilibrium state shown in FIG. 6, the torque characteristic curve is moved downward from the equilibrium state shown in FIG. 6 over the overall rotatable number of revolution range of the ring gear 6 as shown in FIG. 10. The torque of the ring gear 6 is increased to Tx'. Consequently, under the condition that the load is constant, the torque (=Tx') of the ring gear 6 becomes larger than the torque (=Tx) required to maintain the current number of revolution of the rotated member 7. Thus, when the number of revolution of the sun gear 3 is increased in the equilibrium state of the torque of the ring gear 6 and the load, the torque rotating the carrier 8 in the same direction as the sun gear 3 is increased although the torque rotating the carrier 8 in the direction opposed to the sun gear 3 remains unchanged. As a result, the number of revolution of the carrier 8 is increased such that the difference between numbers of revolution of the sun gear 3 and the planetary gear 8 is reduced. In this case, the reduction ratio of the automatic transmission 1 is reduced as the difference between the numbers of revolution of the sun gear 3 and the carrier 8 is reduced. As a result, the reduction ratio of the automatic transmission 1 is reduced by an amount corresponding to an increase in the number of revolution of the carrier 8, whereupon the number of revolution of the ring gear 6 is increased. Consequently, the number of revolution of the ring gear 6 is increased by an amount corresponding to an increase in the number of revolution of the sun gear 3. With this, however, the torque of the ring gear 6 is reduced and accordingly, the number of revolution of the ring gear is stabilized when it is reduced until the torque characteristic curve and the load characteristic line cross. At this time, the number of revolution of the carrier 8 is increased from Nx to Nx'.

When the number of revolution of the sun gear 3 is reduced in the equilibrium state of the torque of the ring gear 6 and the load as the result of the above-described operation, the number of revolution of the ring gear 6 is reduced and simultaneously, the torque thereof is increased. Upon an increase in the number of revolution of the sun gear 3, the number of revolution of the ring gear 6 is increase and simultaneously, the torque thereof is reduced. Consequently, the number of revolution of the ring gear 6 is automatically adjusted so that the torque thereof equilibrates the magnitude of the load, although the number of revolution of the sun gear 3 varies.

The torque characteristic curve is moved upward when the torque of the sun gear 3 is large. Accordingly, the number of revolution of the sun gear 3 required to maintain the ring gear 6 at the same number of revolution is reduced. Further, the torque characteristic curve is moved downward when the torque of the sun gear 3 is small. Accordingly, the number of revolution of the sun gear 3 required to maintain the ring gear 6 at the same number of revolution is increased.

According to the above-described automatic transmission 1 comprising the double pinion planetary gears, the number of revolution of the ring gear 6 is automatically adjusted according to the magnitude of the load and the number of revolution and the torque of the sun gear 3 so that the torque of the ring gear 6 equilibrates the magnitude of the load. In short, the sun gear 3, the ring gear 6 and the pinion gear 10 correspond to a pump impeller, a turbine liner and a stator of a torque converter employed in a conventional vehicle automatic transmission respectively. The transmission loss in the transmission of rotation of the sun gear 3 via the pinion gear 10 to the ring gear 6 includes only that by the gears but does not include loss due to slip as seen in the torque converter. Thus, the automatic transmission 1 can achieve the torque conversion efficiency of 100%. Further, since the reduction ratio of the automatic transmission 1 depends upon the number of teeth of the sun gear 3 and the number of teeth of the ring gear 6, the automatic transmission 1 attains a larger reduction ratio than the torque converter.

The characteristic of the above-described basic construction of the present invention resides in that the number of revolution of the ring gear 6 is automatically adjusted so that the torque of the ring gear 6 equilibrates the magnitude of the load, irrespective of the variations in the load or in the number of revolution of the sun gear 3. Accordingly, the means for applying the stopping force to the carrier 8 is not necessarily required in the basic construction and may be provided when required.

FIRST EMBODIMENT

A first embodiment of the present invention will be described with reference to FIG. 11. In the first embodiment, the invention is applied to an automatic transmission for vehicles. The automatic transmission 11 shown in FIG. 11 basically comprises a double pinion planetary gear. More specifically, the automatic transmission 11 comprises a housing 12 on which an input shaft 13 is supported. The input shaft 13 is connected to an engine 14 serving as a rotating source so as to be rotated by the engine. An output shaft is supported on the housing 12 so as to be coaxial with the input shaft 13. The output shaft 15 is connected via a propeller shaft (not shown) to drive wheels serving as rotated members so that rotation of the output shaft drives the vehicle.

A double pinion planetary gear 16 is provided on an end of the input shaft 13 located in the housing 12. More specifically, a sun gear 17 serving as a first rotating member is provided integrally on the end of the input shaft 13 located in the housing 12. A carrier 18 comprising a gear is rotatably mounted on the input shaft 13 so as to be adjacent to the sun gear 17. The carrier 18 serves as a third rotating member. A plurality of pairs of shafts 19 are rotatably mounted on the carrier 18. Pinion gears 20 serving as rotation transmitting elements are mounted on the respective shafts 19. In each pair of shafts 19, the pinion gears 20 are in engagement with each other and one of the pinion gears 20 is in engagement with the sun gear 17.

Further, a ring gear 21 serving as a third rotating member is supported by a supporting element (not shown) on the input shaft 13 so as to be coaxial with it. The other of the pinion gears 20 is in engagement with the ring gear 21. The ring gear 21 is adapted to be connected via a forward/reverse switching mechanism 22 to the output shaft 15. The switching mechanism 22 comprises a vehicle manual transmission using a well-known synchromesh mechanism. More specifically, the switching mechanism 22 includes a sleeve 23, and the ring gear 21 is connected to the output shaft 15 when the sleeve 23 assumes a predetermined position. The sleeve 23 is directly moved when a shift lever (not shown) is manually operated or is moved by an actuator such as an electric motor, a pneumatic cylinder or a hydraulic cylinder when the shift lever is operated.

Figure 11:
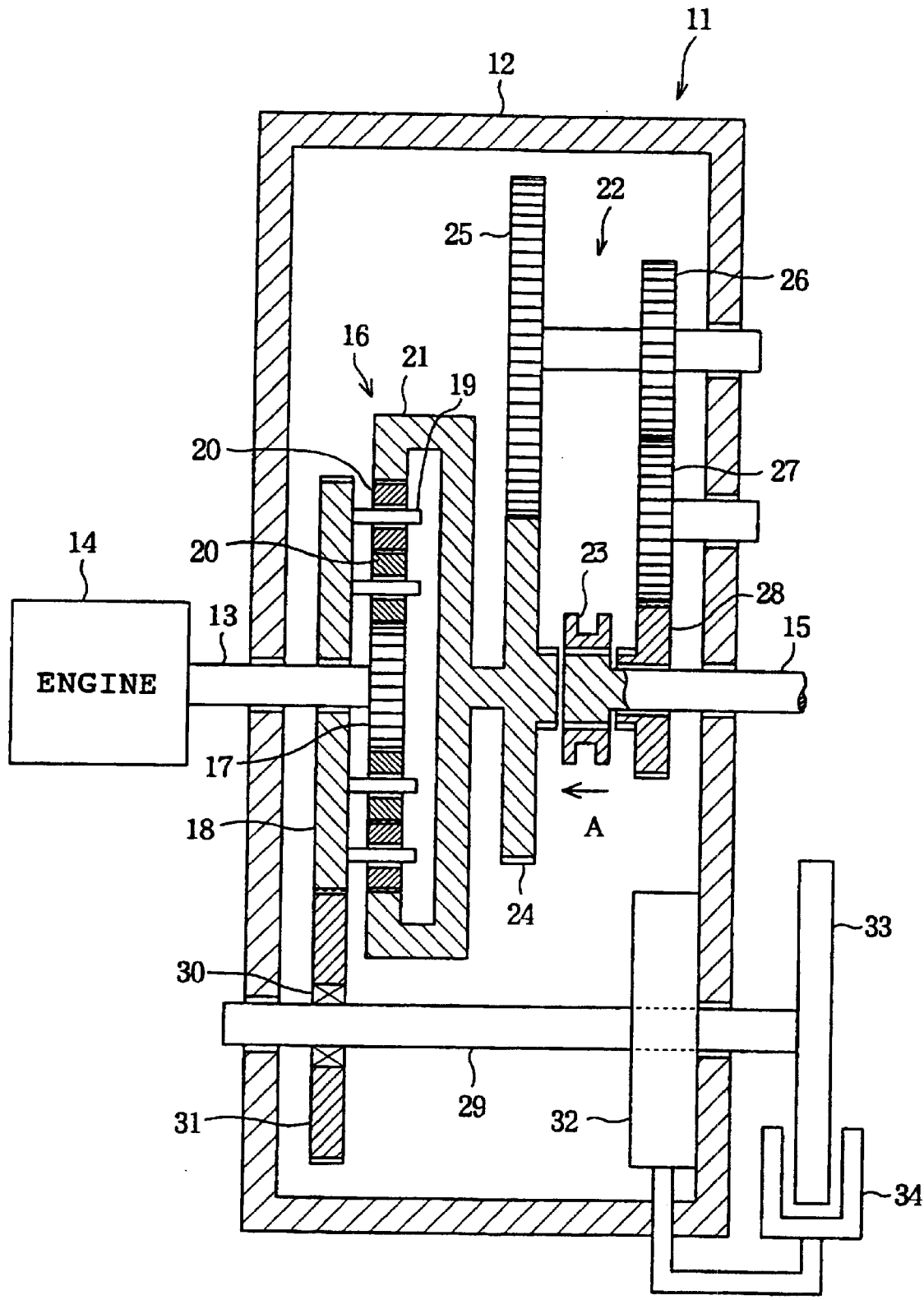
FIG. 11 is a sectional view of the automatic transmission of a first embodiment in accordance with the present invention.

FIG. 11 shows the position of the sleeve 23 in the case where the shift lever assumes a parking position or a neutral position. When the shift lever is operated so as to assume a drive position, the sleeve 23 is moved in the direction of arrow A in FIG. 11 so that the output shaft 15 is directly connected to the ring gear 21. The output shaft 15 is rotated in the same direction as the ring gear 21 in this connected state. Further, when the shift lever is operated so as to assume a reverse position, the sleeve 23 is moved in the direction opposed to arrow A in FIG. 11 so that the ring gear 21 is connected to the propeller shaft via gears 24 to 28 whose number is odd. In the aforesaid connected state, the output shaft 15 is rotated in the direction opposed to the ring gear 21.

On the other hand, a brake shaft 29 is also supported on the housing 12 so as to be parallel with the input shaft 13. A brake gear 31 is mounted via a one-way clutch 30 on the brake shaft 29. The brake gear 31 is in mesh engagement with the carrier 18 so that rotation of the carrier is transmitted from the brake gear 31 via the one-way clutch 31 to the brake shaft 29 when the carrier is rotated in the direction opposed to the sun gear 3.

A hydraulic pump 32 is provided in the housing 12 so as to be driven by the brake shaft 29. A brake plate 33 is mounted on the brake shaft 29 outside the housing 12. A hydraulic brake 34 driven by the hydraulic pump 32 applies a stopping force to the brake plate 33. The hydraulic brake 34 serves as a stopping element. In this case, the oil pump 32 increases oil hydraulics against the hydraulic brake 34 as the number of revolution of the brake shaft 29 is increased. With this, the stopping force the hydraulic brake 34 applies to the brake plate 34 is increased. When the shift lever assumes a parking position, the output shaft 15 is locked by a well-known parking lock mechanism (not shown).

The operation of the automatic transmission 11 will now be described. The engine 14 idles when started with the shift lever assuming the parking position or the neutral position. Since the ring gear 21 is not connected to the output shaft 15 in this state, no load is applied to the ring gear 21. As a result, the pinion gears 20 and the ring gear 21 are rotated with the sun gear 17. In this case, since rotation of the ring gear 21 is not transmitted to the output shaft 15, the vehicle is not driven forward even though the ring gear 21 is rotated. Further, when the shift lever is operated so as to assume the drive position, the sleeve 23 of the switching mechanism 22 is moved in the direction of arrow A in FIG. 11, whereupon the ring gear 21 is connected to the output shaft 15 and accordingly to the drive wheels. Since load applied to the drive wheels in this connected state is a static resistance of the vehicle and exceedingly large, the ring gear 21 being rotated with the sun gear 17 is stopped, so that the ring gear applies a large repulsive force to the pinion gears 20. As a result, since the carrier 18 is rotated in the direction opposed to the sun gear 17, the brake gear 31 in mesh engagement with the carrier is rotated, whereupon the brake shaft 29 and the brake plate 33 are rotated by the one-way clutch 30. At this time, the hydraulic pump 32 is operated with rotation of the brake shaft 29. However, the hydraulic pressure of the hydraulic pump 32 is low in the idling state of the engine 14. Consequently, the hydraulic brake 34 does not apply a stopping force to the brake plate 33.

When an accelerator is pressed on so that the vehicle is driven the number of revolution of the carrier 18 and accordingly the number of revolution of the brake shaft 29 are increased with increase in the number of revolution of the engine 14. Accordingly, the hydraulic pressure of the hydraulic pump 32 is increased so that the stopping force the hydraulic brake 34 applies to the brake plate 33 is increased. As a result, the stopping force is applied via the brake shaft 29, one-way clutch 30 and brake gear 31 to the carrier 18. When the carrier 18 is stopped, rotation of the sun gear 17 is transmitted via the pinion gears 20 to the ring gear 21, whereupon the driving force for the ring gear 21 and accordingly for the drive wheels is gradually increased. The vehicle starts driving when the driving force of the drive wheels exceeds the static resistance.

It is noted that when the stopping force the hydraulic brake 34 applies to the brake plate 33 is increased such that the number of revolution of the brake shaft 29 is reduced, the hydraulic force of the hydraulic pump 32 is reduced and accordingly, the stopping force the hydraulic brake 34 applies to the brake plate 33 is reduced. In other words, since the hydraulic brake 34 does not completely lock the brake plate 33, the hydraulic pump 32, brake plate 33 and hydraulic brake 34 function as a clutch. Consequently, the vehicle can smoothly be started.

A force applied to the carrier 18 during rotation of the sun gear 17 includes a torque resulting from a tendency of the pinion gears 20 to rotate with the sun gear 17 and rotating the carrier 18 in the same direction as the sun gear and another torque resulting from a repulsive force the pinion gears 20 receives from the ring gear 21 and rotating the carrier in the direction opposed to the sun gear.

When the vehicle starts driving, the load applied to the ring gear 21 changes from the static resistance to a running resistance if the number of revolution of the vehicle is constant. Accordingly, since the repulsive force the pinion gears 20 receive from the ring gear 21 is reduced, the torque rotating the carrier 18 in the same direction as the sun gear 17 becomes larger than the torque rotating the carrier in the direction opposed to the sun gear 17. Consequently, the carrier 18 is rotated in the same direction as the sun gear 17. When the carrier 18 is rotated in the same direction as the sun gear 17, the one-way clutch 30 causes the carrier 18 to rotate in the same direction as the sun gear 17 in a free state whether the hydraulic brake 34 is applying the stopping force to the brake plate 33 or not.

The number of revolution of the ring gear 21 is obtained by dividing the number of revolution of the sun gear 17 in the stopped state of the carrier 18 by the reduction ratio of the planetary gear 16 in the stopped state of the carrier. This is shown as N1/R0 when N1 (rpm) is the number of revolution of the sun gear 17 which is equal to the number of revolution of the engine 14, T1 (N·m) is the torque of the engine 14 irrespective of the number of revolution thereof, and R0 (rpm) is the reduction ratio of the planetary gear 16 in the stopped state. Further, when the carrier 18 is being rotated at a number of revolution lower than the sun gear 17, the number of revolution of the ring gear 21 is obtained by adding the number of revolution of the carrier 18 and a number of revolution obtained by dividing, by a reduction ratio R0 of the planetary gear 16 in the stopped state of the carrier, the value obtained by subtracting the number of revolution of the carrier from the number of revolution of the sun gear 17. Further, when the carrier 18 is being rotated with the sun gear 17, the number of revolution of the ring gear 16 is equal to the number of revolution N1 (rpm) of the sun gear 17. The aforesaid relation is expressed by the following equation:

$$N2 = N3 + (N1 - N3)/R0.$$

FIG. 3 shows the relationship between the numbers of revolution of the carrier 18 and the ring gear 21 (running speed of the vehicle) when the number of revolution of the sun gear 17 (the engine 14) is N1 and constant. Further, the reduction ratio R of the planetary gear 16 is obtained by N1/N2 as follows:

$$\begin{aligned}R &= N1/N2\\ &= N1/(N3 + (N1 - N3)/R0)\\ &= N1 \cdot R0/(N3 \cdot R0 + N1 - N3)\\ &= N1 \cdot R0/((R0-1) \cdot N3 + N1).\end{aligned}$$

Thus, in order that the reduction ratio R of the planetary gear 16 may be obtained, the number of revolution N1 of the sun gear 17 is first multiplied by the reduction ratio R0 in the stopped state of the carrier 18. The result of the above multiplication is then divided by a value obtained by adding the number of revolution N1 of the sun gear 17 to the value of (R0−1) multiplied by the number of revolution N3 of the carrier 18. This means that under the condition that the number of revolution N1 of the sun gear 3 is constant, the reduction ratio R of the planetary gear 16 becomes smaller in its reciprocal number as the number of revolution N3 of the carrier 18 is increased.

FIG. 4 shows the relationship between the number of revolution of the carrier 18 and the reduction ratio R of the planetary gear 16 when the number of revolution of the sun gear 17 is constant at N1. Further, the torque T2 of the ring gear 21 is obtained by T1.R where T1 is the torque of the sun gear 17 (the engine 14) as follows:

$$T2 = T1 \cdot N1 \cdot R0/((R0-1) \cdot N3 + N1).$$

FIG. 5 shows the relationship between the number of revolution N3 of the carrier 18 and the torque T2 (the driving force of drive wheel) of the ring gear 21 under the condition where the number of revolution of the sun gear 17 (the engine 14) is constant at N1. However, the torque T1 of the sun gear 17 is constant irrespective of the number of revolution thereof. That is, the torque of the engine 14 is constant irrespective of the number of revolution thereof. In short, under the condition where the number of revolution and torque of the engine 14 are constant, the travelling speed of the vehicle is increased with an increase in the number of revolution of the carrier 18 and simultaneously, the driving force of the drive wheels is reduced.

The running resistance of a vehicle is the sum total of rolling resistance, air resistance and grade resistance. The rolling resistance is proportional to the weight of the vehicle irrespective of the travelling speed thereof. The air resistance is proportional to the square of the travelling speed thereof. The grade resistance is proportional to the grade and the weight of the vehicle. Accordingly, if the air resistance is ignored, the running resistance can be considered to be constant irrespective of the travelling speed of the vehicle when the vehicle runs along a flat road. In this case, when the driving force of the drive wheel is larger than the running resistance (shaded region A in FIG. 6), the number of revolution of the carrier 18 is increased since a force is applied to the carrier 18 which tends to increase the torque rotating it in the same direction as the sun gear 17. The travelling speed is increased with the increase in the number of revolution of the carrier 18 and simultaneously, the driving force of the drive wheels is reduced. Further, when the driving force of the drive wheels is smaller than the running resistance (shaded region B in FIG. 6), the number of revolution of the carrier 18 is reduced since a force is applied to the carrier 18 which tends to increase the torque rotating it in the direction opposed to the sun gear 17. The travelling speed is reduced with the reduction in the number of revolution of the carrier 18 and simultaneously, the driving force of the drive wheel is increased. The aforesaid control is automatically carried out. Consequently, the travelling speed of the vehicle is automatically adjusted so that an equilibrium state in which the driving force characteristic curve and the running resistance characteristic line cross. Reference symbol Tx in FIG. 6 designates the torque of the ring gear 21 equilibrating the running resistance.

The aforesaid running resistance characteristic curve varies according to the running condition. More specifically, when the vehicle running along the flat road comes to an upward slope such that the running resistance of the vehicle is increased, the running resistance characteristic line is moved upward from the equilibrium state in FIG. 6 in the overall running speed range as shown in FIG. 7. The torque of the ring gear 21 equilibrating the running resistance is increased to Tx'. As a result, under the condition that the number of revolution of the engine 14 is constant, the driving force of the drive wheels corresponding to the torque Tx of the ring gear 21 is rendered smaller than the driving force required to maintain the current running speed and corresponding to the torque Tx' of the ring gear. Thus, when the running resistance is increased in the equilibrium state of the driving force of the drive wheel and the running resistance, the torque applied to the carrier 18 so that it is rotated in the direction opposed to the sun gear 17 is increased, whereas the torque applied to the carrier 18 so that it is rotated in the same direction as the sun gear 17 remains unchanged. As a result, the number of revolution of the carrier 18 is reduced such that the difference between the numbers of revolution of the sun gear 17 and the carrier 18 is increased. In this case, the reduction ratio of the planetary gear 16 is increased with increase in the difference between the numbers of revolution of the sun gear and the carrier. Accordingly, the reduction ratio of the planetary gear 16 is increased by an amount equal to a reduction in the number of revolution of the carrier 18, whereupon the number of revolution of the drive wheels is reduced. Consequently, the running speed of the vehicle is reduced according to an amount of increase in the running resistance. However, since the driving force of the drive wheels is increased with the reduction in the running speed of the vehicle, the running speed of the vehicle is reduced until the driving force characteristic curve and the running resistance characteristic line cross. At this time, the running speed is stabilized and the number of revolution of the planetary carrier 8 is reduced from Nx to Nx'. In other words, the vehicle is automatically downshifted when the number of revolution of the engine 14 is constant and the running resistance is increased to such a large extent that the running speed of the vehicle is reduced.

Furthermore, when the vehicle running along an upward slope comes to a flat road such that the running resistance of the vehicle is reduced, the running resistance characteristic line is moved downward from the equilibrium state in FIG. 6 in the overall running speed range as shown in FIG. 8. The torque of the ring gear 21 equilibrating the running resistance is reduced to Tx'. As a result, under the condition that the number of revolution of the engine 14 is constant, the driving force of the drive wheel corresponding to the torque Tx of the ring gear 21 is rendered larger than the driving force required to maintain the current running speed and corresponding to the torque Tx' of the ring gear. Thus, when the running resistance is reduced in the equilibrium state of the driving force of the drive wheels and the running resistance, the torque applied to the carrier 18 so that it is rotated in the same direction as the sun gear 17 is increased, whereas the torque applied to the carrier 18 so that it is rotated in the direction opposed to the sun gear 17 remains unchanged. As a result, the number of revolution of the carrier 18 is increased such that the difference between the numbers of revolution of the sun gear 17 and the carrier 18 is reduced. In this case, the reduction ratio of the planetary gear 16 is reduced with reduction in the difference between the numbers of revolution of the sun gear and the carrier. Accordingly, the reduction ratio of the planetary gear 16 is reduced by an amount equal to an increase in the number of revolution of the carrier 18, whereupon the running speed of the vehicle is increased. Consequently, the running speed of the vehicle is increased according to an amount of reduction in the running resistance. However, since the driving force of the drive wheel is reduced with the reduction in the running speed of the vehicle, the running speed of the vehicle is increased until the driving force characteristic curve and the running resistance characteristic line cross. At this time, the running speed is stabilized and the number of revolution of the planetary carrier 8 is increased from Nx to Nx'. In other words, the vehicle is automatically shifted up when the number of revolution of the engine 14 is constant and the running resistance is reduced such that the running speed of the vehicle is increased.

As the result of the above-described operation, when the running resistance is increased in the equilibrium state of the driving force of the drive wheel and the running resistance, the number of revolution of the drive wheels is reduced and simultaneously, the driving force thereof is increased. When the running resistance is reduced, the number of revolution of the drive wheels is increased and simultaneously, the driving force thereof is reduced. Accordingly, although the running resistance varies, the number of revolution of the drive wheels is automatically adjusted so that the driving force thereof equilibrates the magnitude of the running resistance.

On the other hand, the above-described driving force characteristic curve varies according to the number of revolution of the engine 14. More specifically, when the number of revolution of the engine 14 is reduced such that the number of revolution of the sun gear 17 is reduced from N1 to N1' in the equilibrium state as shown in FIG. 6, the driving force characteristic curve is moved downward from the equilibrium state shown in FIG. 6 over the overall running speed range as shown in FIG. 9. The torque of the ring gear 21 corresponding to the driving force is reduced to Tx'. Consequently, under the condition that the running resistance is constant, the driving force corresponding to torque Tx' of the ring gear 21 becomes smaller than the driving (corresponding to torque Tx) required to maintain the current running speed of the vehicle. Thus, when the number of revolution of the engine 14 is reduced in the equilibrium state of the driving force of the drive wheel and the running resistance, the torque rotating the carrier 18 in the same direction as the sun gear 17 is reduced although the torque rotating the carrier 18 in the direction opposed to the sun gear 17 remains unchanged. As a result, the number of revolution of the carrier 18 is reduced such that the difference between the numbers of revolution of the sun gear 17 and the carrier 18 is increased. In this case, the reduction ratio of the planetary gear 16 is increased as the difference between the numbers of revolution of the sun gear 17 and the carrier 18 is increased. As a result, the running speed of the vehicle is reduced according to a reduction in the number of revolution of the engine 14. With this, however, the driving force of the drive wheel is increased and accordingly, the running speed of the vehicle is stabilized when reduced until the driving force characteristic curve and the running resistance characteristic line cross. At this time, the number of revolution of the carrier 18 is reduced from Nx to Nx'. In other words, the vehicle is automatically downshifted when the running resistance is constant and the number of revolution of the engine 14 is reduced such that the running speed of the vehicle is reduced.

Further, when the number of revolution of the engine 14 is increased from N1 to N1', the driving force characteristic curve is moved upward from the equilibrium state shown in FIG. 6 over the overall running speed range as shown in FIG. 10. The torque of the ring gear 21 corresponding to the driving force is increased to Tx'. Consequently, under the condition that the running resistance is constant, the driving force of the drive wheel corresponding to torque Tx' of the ring gear 21 becomes larger than the driving force (corresponding to torque Tx of the ring gear 21) required to maintain the current running speed of the vehicle. Thus, when the number of revolution of the engine 14 is increased in the equilibrium state of the driving force of the drive wheel and the running resistance, the torque rotating the carrier 18 in the same direction as the sun gear 17 is increased although the torque rotating the carrier 18 in the direction opposed to the sun gear 17 remains unchanged. As a result, the number of revolution of the carrier 18 is increased such that the difference between the numbers of revolution of the sun gear 17 and the planetary gear 18 is reduced. In this case, the reduction ratio of the planetary gear 16 is reduced as the difference between the numbers of revolution of the sun gear 17 and the carrier 18 is reduced. As a result, the reduction ratio of the planetary gear 16 is reduced by an amount corresponding to an increase in the number of revolution of the carrier 18, whereupon the number of revolution of the drive wheels is increased. Consequently, the running speed of the vehicle is increased according to an increase in the number of revolution of the engine 14. With this, however, the driving force of the drive wheel is reduced and accordingly, the running speed of the vehicle is stabilized when reduced until the driving force characteristic curve and the running resistance characteristic line cross. At this time, the number of revolution of the carrier 18 is increased from Nx to Nx'. In other words, the vehicle is automatically shifted up when the running resistance is constant and the number of revolution of the engine 14 is increased such that the running speed of the vehicle is increased.

When the number of revolution of the engine 14 is reduced in the equilibrium state of the driving force of the drive wheels and the running resistance as the result of the above-described operation, the number of revolution of the drive wheels is reduced and simultaneously, the driving force thereof is increased. Upon an increase in the number of revolution of the engine 14, the number of revolution of the drive wheels is increased and simultaneously, the driving force is reduced. Consequently, the number of revolution of the ring gear 6 is automatically adjusted so that the torque thereof equilibrates the magnitude of the load, although the number of revolution of the sun gear 3 varies.

The driving force characteristic curve is moved upward when the engine 14 has a large torque. Accordingly, the number of revolution of the engine 14 required to maintain the vehicle at the same number of revolution is reduced. Further, the driving force characteristic curve is moved downward when the engine 14 has a small torque. Accordingly, the number of revolution of the engine 14 required to maintain the vehicle at the same number of revolution is increased.

According to the above-described automatic transmission of the embodiment comprising the double pinion planetary gear 16, the running speed of the vehicle is automatically adjusted so that the driving force of the drive wheel equilibrates the running resistance under the condition where the torque of the engine 14 is constant irrespective of the number of revolution thereof. In short, the sun gear 17, the ring gear 21 and the pinion gear 20 correspond to a pump impeller, a turbine liner and a stator of a torque converter employed in a conventional vehicle automatic transmission respectively. The transmission loss in the transmission of rotation of the sun gear 17 via the pinion gear 20 to the ring gear 21 includes only that by the gears but does not include loss due to slip as seen in the torque converter. Thus, the planetary gear 16 can achieve the torque conversion efficiency of 100%. Further, since the reduction ratio of the planetary gear 16 depends upon a ratio between the number of teeth of the sun gear 17 and the number of teeth of the ring gear 21, the automatic transmission attains a larger reduction ratio than the torque converter.

When an accelerator is pressed on so that the vehicle is driven, a large load acts upon the drive wheel and accordingly, a repulsive force the pinion gear 20 receives from the ring gear 21 is excessively large. The carrier 18 is subjected to a large torque rotating it in the direction opposed to the sun gear 17. Accordingly, the number of revolution of the carrier 18 is rapidly reduced such that the number of revolution of the ring gear 21 and accordingly the number of revolution of the drive wheels are reduced, whereupon the running speed of the vehicle is reduced. However, the number of revolution of the engine 14 and the number of revolution of the sun gear 17 are increased simultaneously with the operation of the accelerator. Since the number of revolution of the ring gear 21 is increased with the increase in the number of revolution of the sun gear 17, the vehicle can be accelerated by the operation of the accelerator.

The number of revolution of the ring gear 21 becomes higher than the number of revolution of the sun gear 17 when the accelerator is returned so that the engine 14 runs idle. Consequently, the sun gear 17 and accordingly the engine 14 are rotated as the result of rotation of the ring gear 21 at the reciprocal of the current reduction ratio which is approximate to 1 when the vehicle is running along a flat road at a constant speed. More specifically, the engine 14 running idle is rotated by an inertia of the vehicle. Since the engine 14 acts as load upon the ring gear 21, the vehicle can be braked by engine brake. The reduction ratio in the transmission path from the ring gear 21 via the pinion gears 20 to the sun gear 17 is approximate to 1 immediately after the engine 14 starts to run idle. Accordingly, although the braking force of the engine brake is small, the pinion gears 20 receive from a large repulsive force from the sun gear 17 when the engine 14 acts as load upon the ring gear 21. As a result, the number of revolution of the carrier 18 is rapidly reduced such that the reduction ratio of the planetary gear 16 is rapidly increased, whereupon a large braking force can be obtained from the engine brake. Since a case where the engine brake is effected corresponds to continuously performed downshift, the running speed of the vehicle can smoothly be reduced.

On the other hand, when the shift lever is shifted to the reverse position while the vehicle is stopped, the sleeve 23 of the switching mechanism 22 is moved in the direction opposed to arrow A in FIG. 11, whereupon the ring gear 21 is connected to the output shaft 15 and accordingly to the drive wheels. When the accelerator is then operated so that the number of revolution of the engine 14 is increased, the number of revolution of the carrier 18 rotated in the direction opposed to the sun gear 17 is increased. This increases the stopping force the hydraulic brake 34 applies to the brake plate 33, whereupon the brake shaft 29 and accordingly the carrier 18 are stopped. As a result, the vehicle can be run rearward since the rotation of the sun gear 17 can be transmitted to the ring gear 21 and accordingly to the drive wheels. Further, in the same manner as in the case where the vehicle is run forward, the number of revolution of the drive wheels is automatically adjusted so that the driving force equilibrates the running resistance.

According to the above-described embodiment, the input sun gear 17 and the output ring gear 21 are provided in the double pinion planetary gear 16. Further, the carrier 18 is rotatably provided. The reduction ratio of the planetary gear 16 is increased with increase in the difference between the numbers of revolution of the sun gear 17 and the carrier 18. Accordingly, the number of revolution of the ring gear 21 is increased and the torque thereof is simultaneously reduced.

That is, the driving force of the drive wheels is reduced simultaneously with increase in the running speed of the vehicle. As a result, since the running speed of the vehicle is adjusted so that the driving force of the drive wheels equilibrates the running resistance of the vehicle, rotation of the engine 14 can be transmitted at the maximum efficiency as compared with the conventional automatic transmission, whereupon the fuel consumption of the engine 14 can be improved to a large degree.

Further, since the reduction ratio of the planetary gear 16 is smoothly varied, the automatic transmission 11 results in almost no shock due to the operation thereof. Consequently, the vehicle can smoothly be accelerated and decelerated. Further, the double pinion planetary gear 16 includes a smaller number of gears required to reduce and output rotation of the engine 14 than the conventional automatic transmission. Consequently, the automatic transmission 11 has a smaller transmission loss and a better durability. Additionally, the automatic transmission 11 differs from the conventional CVT in that the automatic transmission 11 can be applied to high power engines.

A large torque can be obtained even in a small engine when the reduction ratio of the planetary gear 16 is set at a large value. As a result, even a large vehicle can employ a small engine. Further, since the carrier 18 is rotatable, rotational variations in the sun gear 17 or the ring gear 21 can be absorbed by rotation of the carrier 18. This can prevent an offensive vibration of the vehicle due to variations in the torque of the engine or in the running resistance of the vehicle.

Moreover, the above-described construction can easily be achieved by the double pinion planetary gear 16 used in the conventional automatic transmission. As a result, the cost of the automatic transmission can be reduced to a larger extent. Furthermore, since the automatic transmission 11 has a reduced size and a reduced weight, the reduction in the disposition space for the automatic transmission can increase the volume of a passengers' compartment, and the reduction in the weight of the vehicle can improve the fuel consumption. Further, the pinion gears 20 are disposed so as not to be aligned radially with respect to the ring gear 21. In this case, the size of the automatic transmission can be reduced as compared with a case where the pinion gears are disposed so as to be aligned radially with respect to the ring gear. Additionally, the switching mechanism 22 is switched manually or by an actuator when the shift lever is operated. This eliminates a conventionally provided hydraulic pump for controlling the automatic transmission. Consequently, power of the engine 14 can be prevented from being reduced, and the vehicle can be towed when out of order or broken.

The downshift is automatically performed when the accelerator is stepped on so that the vehicle is accelerated. As a result, the load applied to the ring gear 21 is not directly applied to the engine 14. Further, after the number of revolution of the engine is increased according to an amount of operation of the accelerator, the running speed of the vehicle is increased so that the driving force of the drive wheels equilibrates the running resistance. Thus, the automatic transmission 11 has a high response to the operation of the accelerator. This means that the vehicle can be accelerated with the engine 14 maintaining a large number of revolution. Thus, the automatic transmission 11 can be applied to engines effective in large numbers of revolution. Further, a large load is not directly applied to the engine 14 when the accelerator is stepped on. Consequently, the fuel burning condition of the engine 14 can be prevented from being worsened such that the exhaust gas is excessively soiled. Further, the durability of the engine 14 can be prevented from being reduced. Consequently, when the automatic transmission 11 is applied to recently practiced lean-burn engines or cylinder direct injection engines, a lean-burn region can frequently be used when the load is small. This improves the fuel consumption to a large extent. Additionally, when the automatic transmission 11 is applied to a vehicle powered by a fuel battery, too, the fuel consumption can be improved.

The clutch means is accomplished by applying the stopping force to the carrier 18 rotated in the direction opposed to the sun gear 17. Accordingly, since the clutch means can be constructed by making use of components of the planetary gear 16, the overall construction of the automatic transmission can be simplified and rendered smaller as compared with the conventional automatic transmission using a torque converter as the clutch means. Moreover, the rotation of the carrier 18 is utilized to drive the hydraulic pump 32 so that the stopping force is applied to the carrier. As a result, the engine power can be prevented from being reduced as compared with the construction in which the hydraulic pump 32 is driven by making use of the engine power so that the stopping force for the carrier is obtained. Further, since the rotation of the sun gear 17 is transmitted to the ring gear 21 at the maximum efficiency while the vehicle is running, the fuel consumption of the engine 14 can be improved to a large degree as compared with the construction in which the torque converter is employed.

The brake plate 33 and the hydraulic brake 34 are provided outside the housing 12. Consequently, the maintenance, inspection and replacement of parts can easily be carried out for the clutch means. Further, when the drive wheel is slipped, the reduction ratio of the planetary gear 16 is rapidly reduced with reduction in the load applied to the drive wheel. As a result, since the driving force of the drive wheel is rapidly reduced, a gripping force of the drive wheel is recovered such that the drive wheel is expected to be automatically released from the slipped state. Further, since the reduction ratio of the planetary gear 16 is smoothly increased when the engine brake is effected in the vehicle, it can safely be decelerated even on a slippery road such as a snow-covered road.

When creeping is desired as obtained from the torque converter, the hydraulic brake 34 may apply a slight stopping force to the brake plate 33 while the engine 14 is running idle. Further, a magnet or generator may be provided for applying the stopping force to the brake plate 33 other than the hydraulic brake 34. When provided as the means for applying the stopping force to the brake plate 33, the generator is used to charge the battery, whereby the battery can be restrained from discharge. Further, when the load of the generator is controlled so that the stopping force to be applied to the brake plate 33 is controlled, the running speed of the vehicle can be adjusted while the clutch means is accomplished. The aforesaid construction is effective for hybrid cars, and the generator can be utilized as an auxiliary power source.

The above-described automatic transmission is effective for a vehicle provided with the engine 14 as the rotating source, which vehicle including ordinary cars, motorcycles, motor scooters, diesel locomotives, electric railcars, buses, large vehicles such as trucks, and tanks which has such a large weight that load becomes large at the time of starting. Additionally, a plurality of means for applying a stopping force to the carrier 18 may be provided when load is large at the time of starting.

A drum brake may be used as the means for applying the stopping force to the carrier 18, instead of the hydraulic brake 34. Further, a torque converter or fluid coupling may be provided as the clutch means. In this regard, means needs to be provided for preventing the carrier 18 from being rotated in the direction opposed to the sun gear 17, for example, a one-way clutch, since the automatic transmission 11 does not require clutch means. Further, the torque converter can usually be locked up during running of the vehicle when used. Consequently, the fuel consumption can be improved. Additionally, a well-known mechanism which is used in conventional automatic transmission and comprises a planetary gear and a multiple disc clutch may be used, instead of the switching mechanism 22.

A coupling device may be provided for coupling the ring gear 21 to the switching mechanism 22 when the shift lever assumes the driving position. The coupling device transmits rotation of the ring gear 21 via a one-way clutch to the switching mechanism 22. For example, the rotation of the ring gear 21 is transmitted via the one-way clutch to the switching mechanism 22 when the driving number of revolution of the vehicle is below 20 km/h or at or above 80 km/h. The rotation of the ring gear 21 is directly transmitted to the switching mechanism 22 when the driving speed of the vehicle is at or above 20 km/h and below 80 km/h. In a case where the reduction ratio is large while the vehicle is running at a low speed, a braking force due to a large engine brake is applied upon return of the accelerator, whereupon the vehicle cannot smoothly be run. Further, when the accelerator is returned during driving of the vehicle at a high speed, a braking force due to the engine brake is applied such that the driving speed of the vehicle is reduced, whereupon the fuel consumption is reduced. The aforesaid coupling device may be actuated by a switch operated by the driver.

The output of the automatic transmission 11 may be delivered via a well-known overdrive mechanism. The overdrive mechanism may be actuated by a switch operated by the driver. Further, the stopping force the hydraulic brake 34 applies to the brake plate 33 may be increased with increase in the number of revolution of the sun gear 17. That is, the stopping force required to stop the sun gear 17 becomes larger as the number of revolution thereof is large. Accordingly, the stopping force need not be increased to such a level that the brake plate 33 is completely stopped, although the stopping force is increased. Thus, the stopping force applying mechanism can function as clutch means.

It is noted that the planetary gear 16 functions as a mere clutch means when the reduction ratio thereof is adapted to be normally 1 irrespective of the rotational condition of the carrier 18. More specifically, when R0=1 in the equation for obtaining the number of revolution of the ring gear 21, N2=N3+(N1−N3)/R0, N2=N1, namely, the number of revolution of the ring gear 21 is equal to that of the sun gear 17 irrespective of the number of revolution of the carrier 18. This means that clutch means can be realized by brake means.

A second embodiment of the invention will be described with reference to FIG. 12. The invention is also applied to an automatic transmission for vehicles in the second embodiment. The identical or similar parts in the second embodiment are labeled by the same reference symbols as those in the first embodiment and the description of these parts is eliminated. In brief, the automatic transmission of the second embodiment is provided with an additional function of controlling the number of revolution of the carrier.

Figure 12:
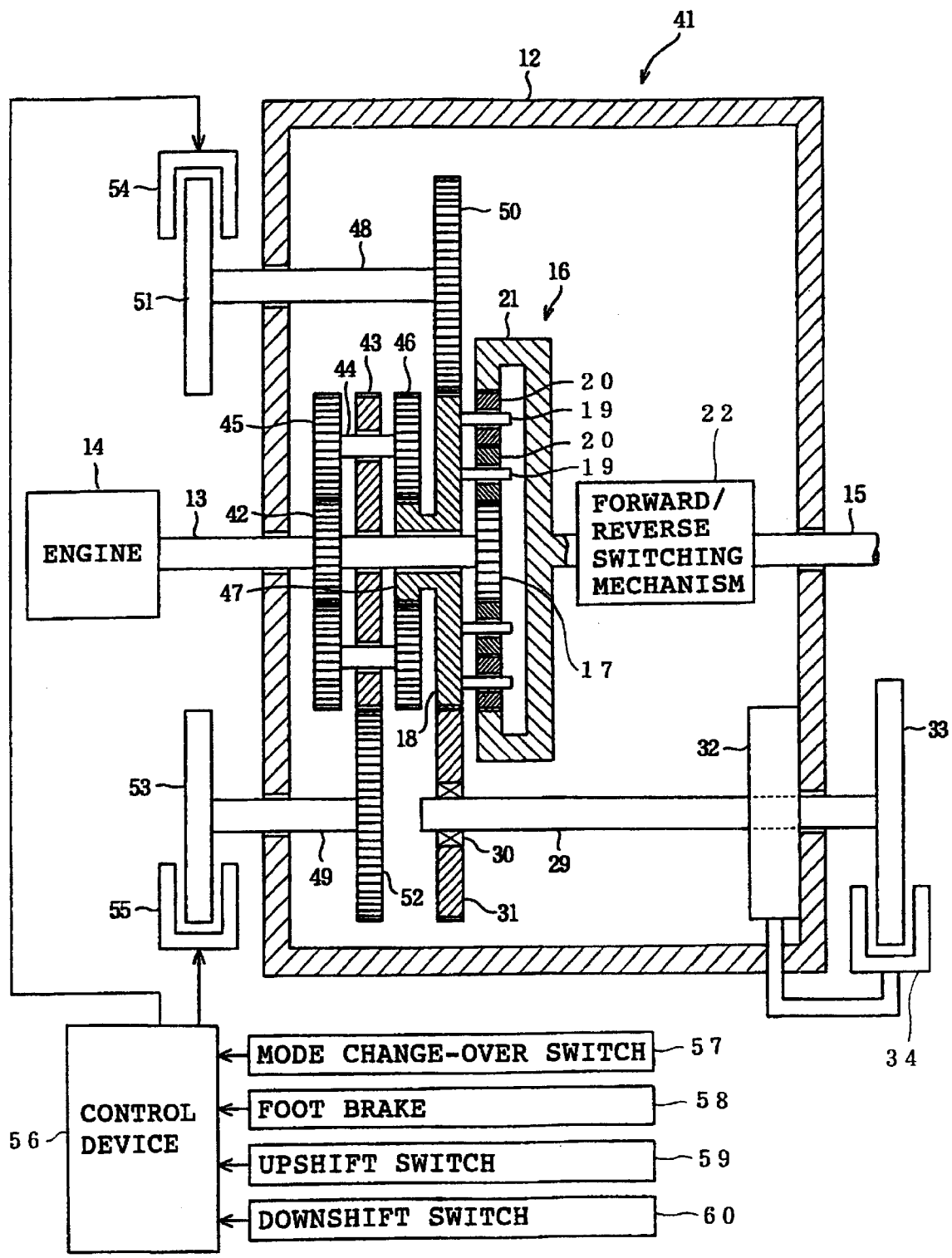
FIG. 12 is a view similar to FIG. 11, showing the automatic transmission of a second embodiment in accordance with the invention.

Referring to FIG. 12, the automatic transmission 41 is provided with means for applying a stopping force to the carrier 18 and means for applying a force integrating the carrier 18 with the sun gear 17. Either one of the two means is operated so that the number of revolution of the carrier 18 is controlled. More specifically, an auxiliary sun gear 42 is provided integrally with the input shaft 13 on which the sun gear 17 is mounted. A gear 43 is rotatably mounted on the input shaft 13 so as to be disposed between the sun gear 17 and the auxiliary sun gear 42. A plurality of shafts 44 are rotatably mounted on the gear 43. Two gears 45 and 46 are mounted on both ends of each shaft 44 respectively. The gears 45 are in mesh engagement with the auxiliary sun gear 42, whereas the gears 46 are in mesh engagement with a gear 47 integral with the carrier 18. The auxiliary sun gear 42 and gears 45, 46 and 47 have the same number of teeth.

First and second brake shafts 48 and 49 are rotatably mounted on the housing 12 so as to be parallel with the input shaft 13. The first brake shaft 48 has one end located in the housing 12 and provided with an integral gear 50 which is in engagement with the carrier 18. The first brake shaft 48 has the other end located outside the housing 12 and provided with an integral brake plate 51. The second brake shaft 49 has one end located in the housing 12 and provided with an integral gear 52 which is in mesh engagement with the gear 43. The second brake shaft 49 has the other end located outside the housing 12 and provided with an integral brake plate 53. The hydraulic brakes 54 and 55 apply stopping forces to the brake plates 51 and 53 respectively. The hydraulic brakes 54 and 55 are driven by a control device 56. The control device 56 has a mode change-over switch 57 operated to set a normal mode, sports mode, economy mode, manual mode, and snow mode, so that drive of the hydraulic brakes 54 and 55 are controlled according to each mode.

More specifically, when the control device 56 is set at the normal mode by the mode change-over switch 57, the hydraulic brakes 54 and 55 are not driven, whereupon the stopping forces are not applied to the gear 43 and the carrier 18. The gear 43 is rotated in a free state although the auxiliary sun gear 42 is coupled via the gears 45, 46 and 47 to the carrier 18. Accordingly, even though the auxiliary sun gear 42 is rotated with rotation of the engine 14, the rotation of the auxiliary sun gear 42 is not transmitted to the carrier 18. Thus, since the carrier 18 is rotated in a free state, the same operation as in the first embodiment is achieved when the normal mode is set. Consequently, the rotation of the engine 14 can be transmitted by the planetary gear 16 to the drive wheels at the maximum efficiency.

When the control device 56 is set at the sport mode by the mode change-over switch 57, the hydraulic brake 54 is driven so that a predetermined stopping force is applied to the brake plate 51 and accordingly the carrier 18. The stopping force is determined so as not to completely stop the carrier 18, but the number of revolution thereof is controlled so as to be lower than that in the aforesaid normal mode. As a result, since the reduction ratio of the planetary gear 16 is increased as compared with the normal mode, the driving force of the drive wheels are increased so that a large accelerating force can be obtained.

When the control device 56 is set at the economy mode by the mode change-over switch 57, the hydraulic brake 55 is driven so that a predetermined stopping force is applied to the brake plate 53 and accordingly the gear 43. When the stopping force is applied to the gear 43, the rotation of the auxiliary sun gear 42 is transmitted via the gears 45 to 47 to the carrier 18. As a result, the carrier 18 is subjected to a force integrating it with the sun gear 17. Consequently, the number of revolution of the carrier 18 becomes larger than in its rotation in the free state. The stopping force applied to the gear 43 is determined so as not to completely integrate the carrier 18 with the sun gear 17, but the number of revolution thereof is controlled so as to be larger than that in the aforesaid normal mode. As a result, since the reduction ratio of the planetary gear 16 is reduced as compared with the normal mode, the driving force of the drive wheels are reduced so that an accelerating force is reduced. However, the driving speed of the vehicle can be increased with the engine 14 being maintained at small numbers of revolution. Consequently, the fuel consumption of the engine 14 can be improved. The above-described sports mode and economy mode are used when the vehicle is accelerated. The control device 56 is set at the normal mode when the vehicle is run at a constant number of revolution. The planetary gear 16 provides a highest conversion efficiency when the normal mode is set in the drive at a constant number of revolution.

When the control device 56 is set at the manual mode by the mode change-over switch 57, the current reduction ratio of the planetary gear 16 is obtained on the basis of the current difference between the numbers of revolution of the sun gear 17 and the carrier 18. The number of revolution of the carrier 18 is controlled on the basis of the current number of revolution of the sun gear 17 so that the obtained reduction ratio of the planetary gear 16 is maintained. Alternatively, the number of revolution of the carrier 18 is controlled on the basis of the current number of revolution of the sun gear 17 so that one of a plurality of previously set reduction ratios, which one is most approximate to the current one, is set. In other words, the control device 56 controls the number of revolution of the carrier 18 so that the current number of revolution of the sun gear 17 is substituted for the equation used to obtain the reduction ratio R, $R=N1 \cdot R0/((R0-1) \cdot N3+N1)$, so that the obtained reduction ratio takes a predetermined value.

When an upshift switch 58 is operated, the number of revolution of the carrier 18 is controlled so that the current reduction ratio of the planetary gear 16 is decreased one step. Further, when a downshift switch 59 is operated, the number of revolution of the carrier 18 is controlled so that the current reduction ratio of the planetary gear 16 is increased one step. Accordingly, the driver can enjoy a sport driving by operating the upshift and downshift switches 58 and 59 in the manual mode. The hydraulic brake 54 or 55 may continuously be driven during operation of the upshift or downshift switch 58 or 59 so that the stopping force is applied to the brake plate 51 or 53, whereby the number of revolution of the carrier 18 is continuously increased or reduced so that the reduction ratio of the planetary gear 16 is continuously varied.

When the control device 56 is set at the snow mode by the mode change-over switch 57, the hydraulic brake 55 applies a predetermined stopping force to the brake plate 53 and accordingly the gear 43 when the vehicle is started. As a result, the carrier 18 is subjected to a force integrating it with the sun gear 17. Consequently, since the reduction ratio of the planetary gear 16 is reduced as compared with the normal mode, the driving force of the drive wheels is rendered smaller than usual, whereupon the vehicle can be started without slippage of the drive wheels.

When a foot brake is operated, the control device 56 increases the stopping force the hydraulic brake 54 applies to the brake plate 51 and accordingly the carrier 18, in proportion to an amount of operation of the foot brake. As a result, since the carrier 18 is subjected to a larger stopping force than the one due to a normal engine brake, the reduction ratio of the planetary gear 16 is rapidly increased, whereby a braking force due to a large engine brake is applied to the vehicle. This construction is effective in a vehicle having such a large weight that the braking force due to the engine brake is small, such as buses and trucks. When the engine brake is so large that the number of revolution of the engine 14 is excessively increased, resulting in over rev, the stopping force applied to the carrier needs to be reduced so that the engine 14 does not exceed the allowed number of revolution.

According to the second embodiment, when the manual mode is set, the upshift switch 58 and the downshift switch 59 are operated so that the reduction ratio is optional. Consequently, the driver can enjoy the sport driving by the manual operation. Further, the hydraulic brakes 54 and 55 are driven so that the number of revolution of the carrier 18 is controlled. Consequently, the number of revolution control of the carrier 18 can be performed by a simple construction of the brake means. Further, the brake means controlling the number of revolution of the carrier 18 is located outside the housing 12. Consequently, the brake means can easily be inspected and replaced by a new one as compared with the case where the brake means is provided in the housing 12.

A wet multiple disc clutch or belt brake may be used as the construction for applying a stopping force to the carrier 18 and for applying a force integrating the carrier with the sun gear 17, as in the conventional automatic transmission.

Since the number of revolution of the carrier 18 can be detected, the magnitude of load is determined on the basis of a number of revolution obtained by subtracting the number of revolution of the carrier from the number of revolution of the sun gear 17 (the number of revolution of the engine 14). It should be noted that various control manners can be performed according to the determined magnitude of load. For example, the lean-burn control in lean-burn engines or cylinder direct injection engines can optimally be performed, whereupon the fuel consumption can be improved.

When actuation of a brake pedal causes the drive wheels to lock, the carrier 18 is rotated in the direction opposed to the sun gear 17 upon stop of the ring gear 21. Accordingly, when the carrier 18 is rotated in the direction opposed to the sun gear 17 during traveling of the vehicle, the drive wheels are released from brake such that an antilock brake system (ABS) is accomplished. Further, the running resistance is rapidly reduced when the drive wheels slip, whereupon the number of revolution of the carrier 18 rotated in the same direction as the sun gear 17 is rapidly increased. The braking force is applied to the drive wheels on the basis of the rapid increase in the number of revolution of the carrier 18, whereby an antislip function can be accomplished.

A third embodiment of the invention will be described with reference to FIG. 13. In brief, the same function as of the double pinion planetary gear is accomplished by combination of gears in the third embodiment.

Figure 13:
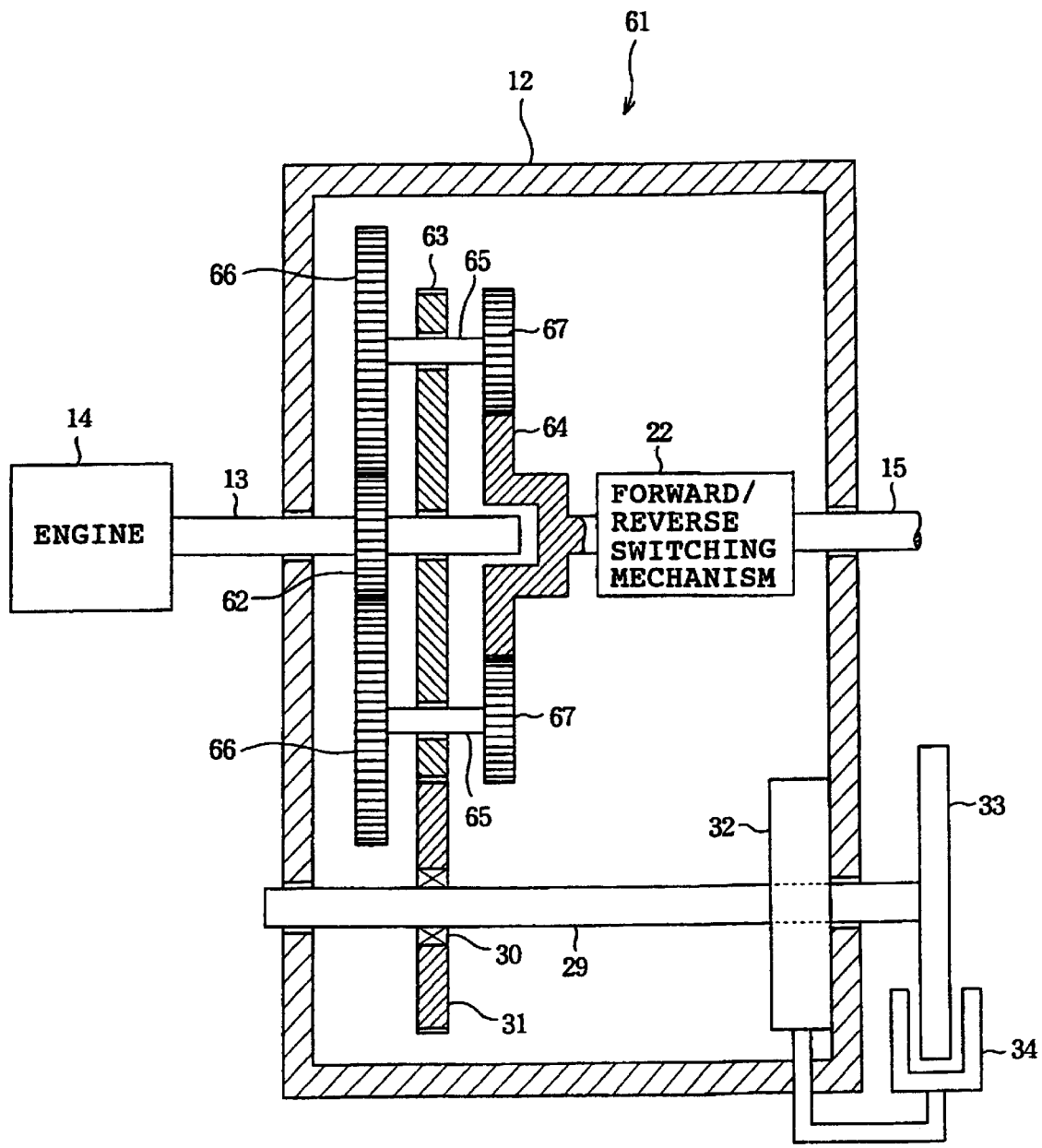
FIG. 13 is a view similar to FIG. 11, showing the automatic transmission of a third embodiment in accordance with the invention.

Referring to FIG. 13, the automatic transmission 61 comprises the housing 12 on which the input shaft 13 is supported. An input gear 62 is mounted integrally on the input shaft 13. A gear 63 and an output gear 64 are rotatably mounted on the input shaft 13. A plurality of shafts 65 are rotatably mounted on the gear 63. Gears 66 and 67 are rotatably mounted on both ends of each shaft 65 respectively. The gears 66 are in mesh engagement with the input gear 62, whereas the gears 67 are in mesh engagement with the output gear 64. The switching device 22 is connected to the output gear 64. The number of teeth of the input gear 62 is smaller than that of each gear 66. The number of teeth of each gear 67 is smaller than that of the output gear 64.

The output gear 64 is subjected to a static resistance of the vehicle when it is stopped. Accordingly, when the shift lever is shifted to the drive position during rotation of the engine 14, the output gear 64 remains stopped irrespective of rotation of the input gear 62. As a result, since each gear 67 receives a large repulsive force from the output gear 64, the gear 63 is rotated in the direction opposed to the input gear 62, so that the brake gear 31 and accordingly the brake plate 33 are rotated with rotation of the gear 63. When the accelerator is actuated so that the number of revolution of the engine 14 is increased, the hydraulic pressure of the hydraulic pump 32 is increased so that the stopping force the brake 34 applies to the brake plate 33 is increased, whereupon the gear 63 is stopped. As a result, rotation of the input gear 62 is transmitted via the gears 66 and 67 to the output gear 64 so that the vehicle advances. The driving number of revolution of the vehicle is increased and then rendered stable when the driving force of the drive wheels equilibrates the running resistance of the vehicle.

In the above case, the expression, (the number of teeth of each gear 66/the number of teeth of the input gear 62)×(the number of teeth of the output gear 64/the number of teeth of each gear 67), represents the reduction ratio corresponding to that in the stopped state of the carrier 18 of the planetary gear 16 as described in the first embodiment. Accordingly, the input gear 62 corresponds to the sun gear of the double pinion planetary gear, and the gear 63 corresponds to the carrier. Further, the output gear 64 corresponds to the ring gear, and the gears 66 and 67 correspond to the pinion gears respectively.

According to the third embodiment, a larger reduction ratio can be obtained as compared with the planetary gear 16 in addition to the same effect as in the first embodiment. Further, the outer dimensions of the automatic transmission can be rendered smaller than the planetary gear in which a plurality of gears are disposed radially with respect to the input shaft 13.

A fourth embodiment of the invention will be described with reference to FIGS. 14 and 15. In brief, the control device controls the rotation of the carrier, thereby accomplishing the clutch.

Figure 14:
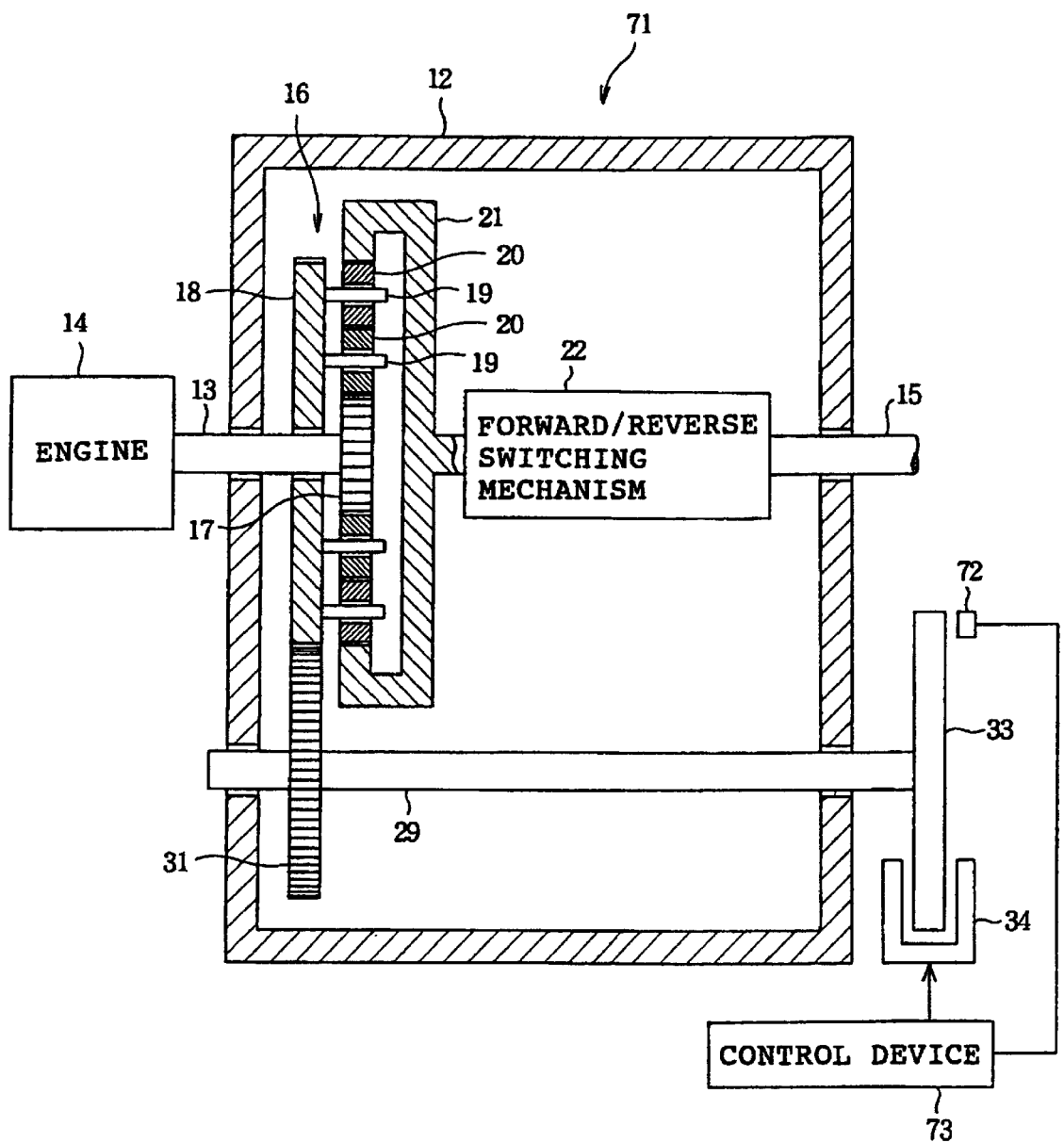
FIG. 14 is a view similar to FIG. 11, showing the automatic transmission of a fourth embodiment in accordance with the invention.

Referring to FIG. 14, the automatic transmission 71 basically comprises the double pinion planetary gear 16. The brake gear 31 is mounted integrally on the brake shaft 29, so that the brake plate 33 is rotated upon rotation of the carrier 18 irrespective of the direction in which the carrier is rotated. Further, a rotation sensor 72 is provided for detecting rotation of the brake plate 33 and accordingly rotation of the carrier 18. A control device 73 is provided for controlling the stopping force applied to the brake plate 33 by the hydraulic brake 34.

Figure 15:
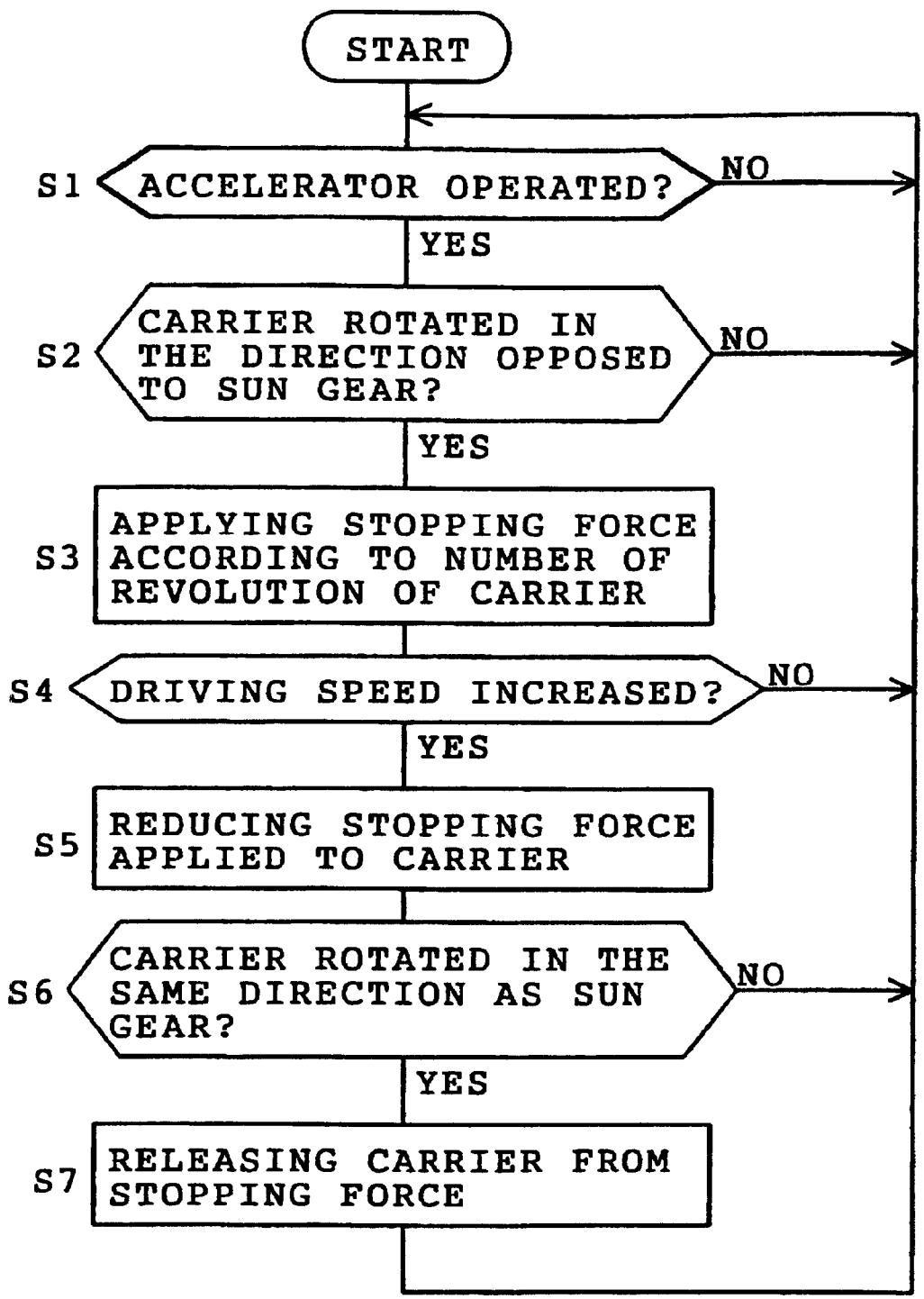
FIG. 15 is a flowchart showing the control manner of a control device.

FIG. 15 is a flowchart showing the operation of the control device 73. In FIG. 15, the control device 73 determines whether the accelerator has been operated during rotation of the engine 14 (step S1). When the driver operates the accelerator (YES at step S1), the control device 73 determines whether the carrier 18 is being rotated in the direction opposed to the sun gear 17, based on the result of detection (step S2). At this time, the carrier 18 is being rotated in the direction opposed to the sun gear 17 (YES at step S2) since the vehicle is stopped and accordingly the ring gear 21 is also stopped. Accordingly, the control device 73 controls the hydraulic brake 34 so that a stopping force according to the number of revolution of the carrier 18 is applied to the brake plate 33 and accordingly to the carrier (step S3). Thus, upon increase in the number of revolution of the engine 14 with operation of the accelerator, the control device 73 increases the stopping force applied to the carrier 18, whereupon the rotation of the engine 14 is transmitted to the drive wheels so that the vehicle is driven forward. In this case, the control device 73 reduces the stopping force when the stopping force applied to the carrier 18 reduces the number of revolution thereof. Consequently, the carrier 18 is not completely stopped. This means that the control device 73 functions as an incompletely or half engageable clutch.

The control device 73 then reduces the stopping force applied to the carrier 18 (step S5) when the driving speed of the vehicle is increased (YES at step S4). When determining that the carrier 18 is being rotated in the same direction as the sun gear 17 (YES at step S6), the control device 73 releases the carrier from the stopping force (step S7). Consequently, the driving speed of the vehicle is increased with increase in the number of revolution of the carrier 18 and is rendered stable when the driving force of the drive wheels equilibrates the running resistance of the vehicle.

When the vehicle comes to a steep upward slope, the driving speed thereof is reduced and at last, the carrier 18 is rotated in the direction opposed to the sun gear 17, whereupon the rotation of the engine 14 cannot effectively be transmitted to the drive wheels. In this case, when the carrier 18 is rotated in the direction opposed to the sun gear 17 (YES at step S2) with the accelerator being pressed on (YES at step S1), the control device 73 controls the hydraulic brake 34 so that the stopping force according to the number of revolution of the carrier 18 is applied to the brake plate 33 and accordingly to the carrier (step S3). As a result, the rotation of the engine 14 can effectively be transmitted to the drive wheels so that the driving number of revolution of the vehicle is increased. Further, the control device 73 applies the stopping force to the carrier 18 to reduce the number of revolution thereof when the downshift operation is performed or the foot-brake is actuated. Consequently, the reduction ratio is increased so that the braking force due to the engine brake is increased.

According to the fourth embodiment, the control device 73 controls the rotation of the carrier 18. Consequently, the clutch can be accomplished and the reduction ratio can be adjusted by the control device 73.

Figure 16:
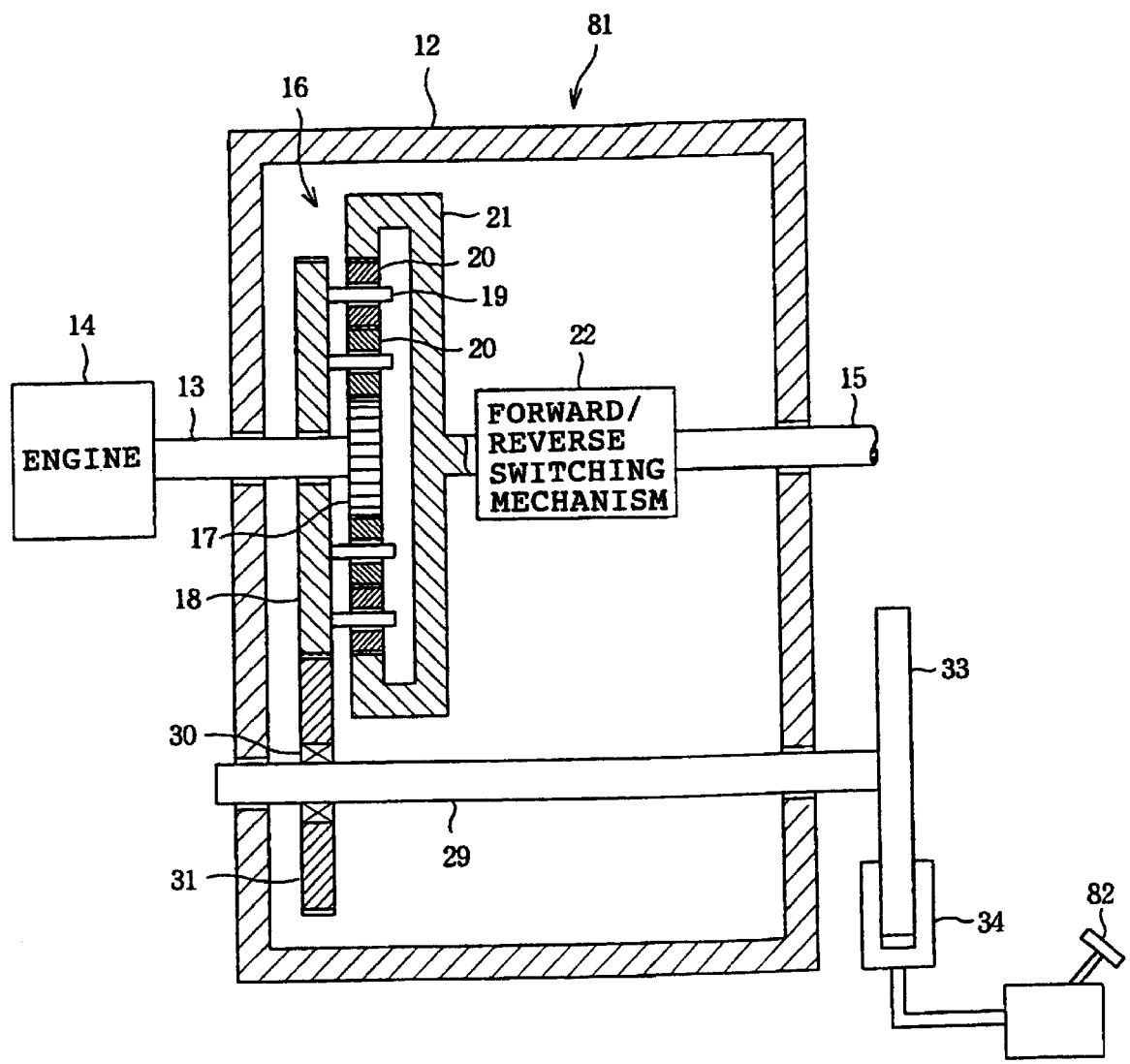
FIG. 16 is a view similar to FIG. 11, showing the automatic transmission of a fifth embodiment in accordance with the invention.

A fifth embodiment of the invention will be described with reference to FIG. 16. The invention is applied to a vehicle automatic transmission with a clutch pedal in the fifth embodiment. Referring to FIG. 16, the automatic transmission 81 basically comprises the double pinion planetary gear 16. In the embodiment, the brake plate 33 is stopped by the hydraulic brake 34 when a clutch pedal 82 is non-operated. The stopping force the hydraulic brake 34 applies to the brake plate 33 is released when the clutch pedal 82 is pressed on.

The shift lever is operated to assume the neutral position or the engine 14 is started with the clutch pedal 82 being pressed on. Further, the shift lever is operated with the clutch pedal 82 being pressed on so as to be switched from the neutral position to the drive position. In this case, since the vehicle is stopped and the load applied to the ring gear 21 is large, the carrier 18 is rotated in the direction opposed to the sun gear 17. Accordingly, the brake gear 31 and accordingly the brake plate 33 are rotated. When the clutch pedal 82 is gradually released from the pressed state, the hydraulic brake 34 applies the stopping force to the brake plate 33. Accordingly, the rotation of the engine 14 is transmitted to the drive wheels so that the vehicle is run forward. The driving speed of the vehicle is rendered stable when the driving force of the drive wheels equilibrates the running resistance of the vehicle. Further, the clutch pedal 82 is pressed on and the shift lever is switched to the reverse position. In this state, the clutch pedal 82 is released from the pressed state so that the vehicle can be reversed.

According to the fifth embodiment, the vehicle can be driven forward and backward by the operation of the clutch. Accordingly, the driver can enjoy driving the vehicle by the operation of the clutch and the rotation of the engine 14 can be transmitted to the drive wheels at the maximum efficiency during traveling.

A sixth embodiment of the invention will be described with reference to FIG. 17. In brief, rotation of a plurality of engines is composed in the sixth embodiment. For example, when rotation of two engines is composed with the same reduction ratio to be transmitted to the output shaft, the numbers of revolution of the engines need to completely agree with each other. When the numbers of revolution of the engines differ from each other, the engine with a smaller number of revolution serves as a resistance against the engine with a larger number of revolution, whereupon the rotation of the engines cannot effectively be transmitted to the drive wheels.

Figure 17:
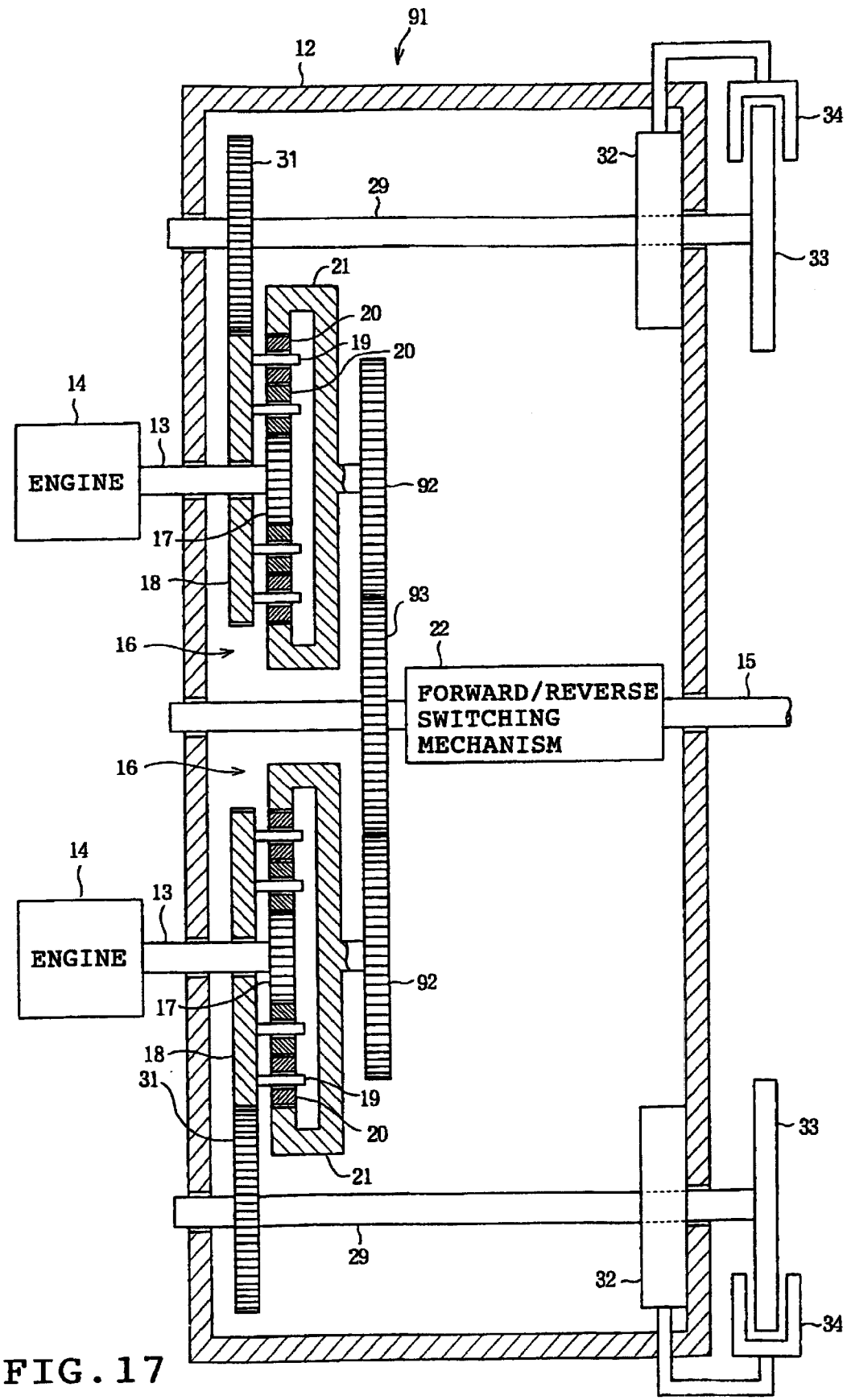
FIG. 17 is a view similar to FIG. 11, showing the automatic transmission of a sixth embodiment in accordance with the invention.

Referring to FIG. 17, the automatic transmission 91 basically comprises two sets of the double pinion planetary gears 16. The planetary gears 16 are disposed in parallel with each other in the embodiment. Further, gears 92 are provided integrally on the ring gears 21 of the planetary gears respectively. Rotation of the gears 92 is composed by a gear 93 to be transmitted via the switching mechanism 22 to the output shaft 15 and accordingly to the drive wheels.

According to the sixth embodiment, each planetary gear 16 is automatically adjusted independently to an optimum reduction ratio at which rotation of the engine 14 is transmitted to the drive wheels at the maximum efficiency. As a result, even when the numbers of revolution of the engines 14 differ from each other, the engine with a lower number of revolution does not act as the resistance against the engine with a larger number of revolution. Consequently, the rotation of the engines 14 can be composed at a maximum efficiency to be transmitted to the drive wheels. Accordingly, for example, rotation of two 4-cylindered engines is composed so that an 8-cylindered engine is obtained. Further, rotation of two 6-cylindered engines is composed so that a 12-cylindered engine is obtained. Additionally, rotation of three 4-cylindered engines is composed so that a 12-cylindered engine is obtained. The above description means that existing engines are combined together into a multiple cylinder engine. As a result, a multiple cylinder engine requiring high-level mechanical precision and high-level ignition control can easily be realized, and the developing cost or manufacturing cost can be reduced to a large extent. Further, when only the output rotation of the automatic transmission provided for a starting one of the engines is transmitted to the drive wheels, the vehicle can be run with only the starting engine without influence of the stopped engine. Further, the above-described construction realizes combination of automatic transmissions of different reduction ratios or combination of engines with different torque characteristics. Moreover, a hybrid car provided with combination of an engine and a motor can be realized, and an electric car and electrically driven train in each of which a plurality of motors are combined can be realized. Further, the above-described construction is effective for motor-assisted bicycles wherein human power and an electric motor are combined together, and for composition of rotation of various rotational sources.

In the construction that rotation of a main rotational source and rotation of an auxiliary rotational source are composed to be transmitted to the drive wheels, rotation of the ring gear 21 of the planetary gear 16 corresponding to rotation of the auxiliary rotational source is transmitted via a one-way clutch to the drive wheels so that the rotation of the main rotational source is not adversely affected even when the number of revolution of the auxiliary rotational source is smaller than that of the main rotational source. In this regard, when the auxiliary rotational source is an electric motor, the brake shaft 29, brake gear 31, hydraulic pump 32, brake plate 33 and hydraulic brake 34 need not be provided. However, a one-way clutch needs to be provided for preventing the carrier 18 from being rotated in the direction opposed to the sun gear 17. Further, when rotation of the ring gears 21 of a plurality of planetary gears 16 is transmitted via the one-way clutch to the drive wheels to thereby be composed, the rotation can easily be composed without influence of each rotation upon the other although the braking force cannot be obtained from the rotational source, for example, engine brake. Additionally, the rotation of the ring gears of a plurality of planetary gears is transmitted to a common output shaft in the above-described construction. However, the output shaft may be connected to the ring gear of a specific planetary gear so that rotation of the ring gear of the other planetary gear is transmitted to the output shaft.

Figure 18:
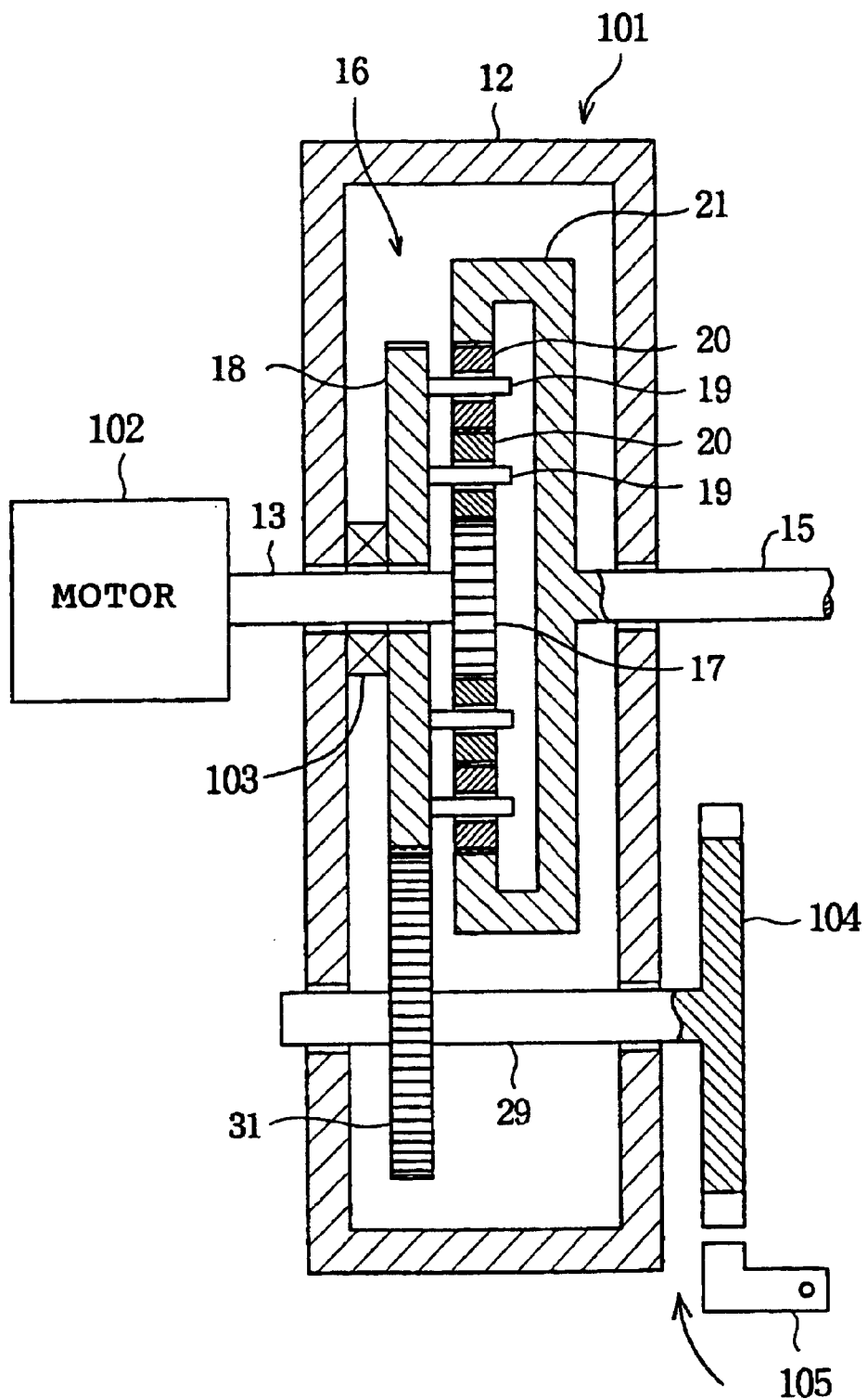
FIG. 18 is a view similar to FIG. 11, showing the automatic transmission of a seventh embodiment in accordance with the invention.

A seventh embodiment of the invention will be described with reference to FIG. 18. The invention is applied to an automatic transmission for electric railcars. Referring to FIG. 18, the automatic transmission 101 basically comprises the double pinion planetary gear 16 as in the first embodiment. The sun gear 17 is connected via the input shaft 13 to a motor 102. The ring gear 21 is connected via the output shaft 15 to wheels of the electric railcar. The carrier 18 is mounted on the input shaft 13, and a one-way clutch 103 is also mounted on the input shaft 13 to prevent the carrier 18 from being rotated in the direction opposed to the normal rotational direction of the motor 102.

The brake gear 31 is provided integrally on the brake shaft 29. A lock gear 104 is provided integrally on one end of the brake shaft 29 located outside the housing 12. A lock arm 105 is provided for locking the lock gear 104. The lock arm 105 is spaced from the lock gear 104. When the railcar is run forward, the motor 102 is normally rotated with the lock arm 105 remaining spaced from the lock gear 104. An actuator (not shown) is driven so that the lock arm 105 locks the lock gear 104. When the railcar is run backward, the motor 102 is reversed with the lock arm 105 locking the lock gear 104. The switching mechanism 22 employed in the automatic transmission of the first embodiment is not provided in the seventh embodiment.

When the motor 102 is normally rotated so that the railcar is run forward, the load applied to the ring gear 21 is large since the railcar is stopped. Accordingly, each pinion gear 20 receives a large repulsive force from the ring gear 21. The carrier 18 then tends to be rotated in the direction opposed to the rotational direction of the motor 102. However, since the one-way clutch 103 prevents the carrier 18 from rotation in the direction opposed to the normal rotation of the motor 102, the carrier 18 remains stopped. Consequently, rotation of the motor 102 is transmitted via the pinion gears 20 to the ring gear 21 so that the ring gear and accordingly the wheels of the railcar are rotated, whereby the railcar is run forward.

When the railcar starts to run forward, the load applied to the ring gear 21 is reduced such that the repulsive force each pinion gear 20 receives from the ring gear 21 is reduced, whereupon the carrier 18 is rotated in the same direction as the sun gear 17. As a result, the number of revolution of the railcar is increased since the reduction ratio of the planetary gear 16 is reduced. The number of revolution of the railcar is stabilized when the driving force of the wheels equilibrates the running resistance of the railcar.

When the railcar is to be run backward, the actuator (not shown) is driven so that the lock arm 105 locks the lock gear 104. When the motor 102 is reversed in this condition, the carrier 18 tends to be rotated in the direction opposed to the reverse direction of the motor or in the direction in which the one-way clutch 103 is rotatable. However, since the lock arm 105 locks the lock gear 104 to thereby prevent the carrier 18 from rotation in the direction opposed to the reverse direction of the motor, the reverse rotation of the motor 102 is transmitted via the sun gear 17 and pinion gears 20 to the ring gear 21, whereupon the railcar is run backward. Since the carrier 18 is stopped in this case, the reduction ratio of the planetary gear 16 is constant.

According to the seventh embodiment, the railcar can smoothly be accelerated and decelerated without a complicated rotation control such as vector control when the motor is just rotated in the normal direction. Further, the electric consumption can be reduced since the rotation of the motor 102 is transmitted to the wheels at a maximum efficiency. Further, a large load is not applied to the motor 102 by the action of the planetary gear 16. Consequently, the size of the motor 102 can be reduced and the motor can be prevented from being overloaded. Additionally, the lock gear 104 is locked by the lock arm 105 so that the carrier 18 is stopped. Thus, the railcar can be run backward by a simple construction. The foregoing embodiment can be applied to an electric car requiring no clutch.

Figure 19:
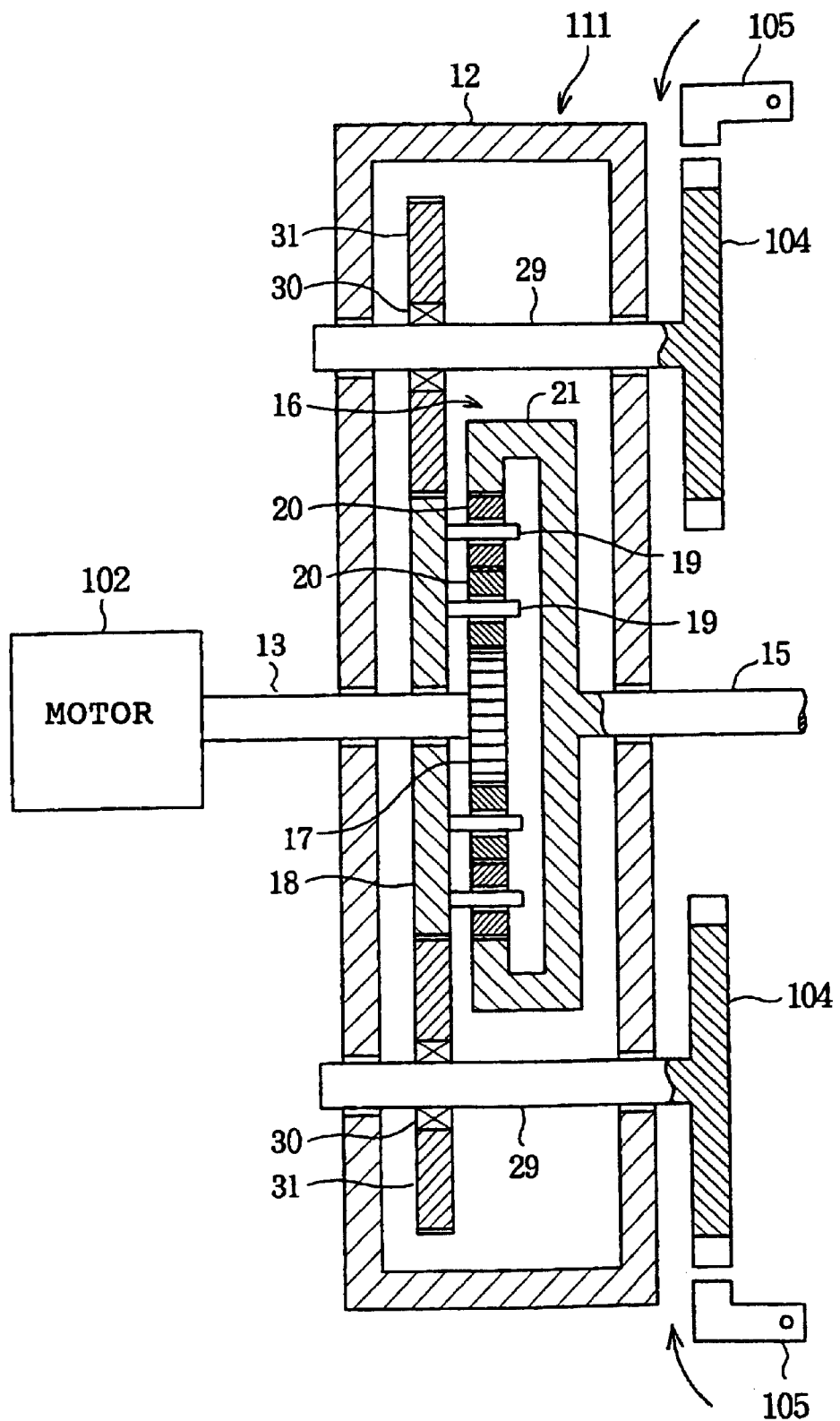
FIG. 19 is a view similar to FIG. 11, showing the automatic transmission of an eighth embodiment in accordance with the invention.

An eighth embodiment of the invention will be described with reference to FIG. 19. In brief, an automatic non-stage transmission is realized which can be effected irrespective of the direction in which the railcar is run. Referring to FIG. 19, the automatic transmission 111 basically comprises the double pinion planetary gear 16 as in the first embodiment. A pair of brake gears 31 are in mesh engagement with the carrier 18 and are connected via the respective one-way clutches 30 to the brake shaft 29. One of the one-way clutches 30 prevents the carrier 18 from rotation in the direction opposed to the normal direction of the motor 102 while the corresponding brake shaft 29 is stopped. Further, the other one-way clutch 30 prevents the carrier 18 from rotation in the direction opposed to the reverse direction of the motor 102 while the corresponding brake shaft 29 is stopped.

The lock gears 104 are provided integrally on the respective brake shafts 29 so as to be located outside the housing 12. The lock gears 104 are adapted to be locked by the corresponding lock arms 105 respectively. When the railcar is to be run forward, the motor 102 is rotated in the normal direction while the lock gear 104 of one of the brake shafts 29 is locked by the corresponding lock arm 105. Further, when the railcar is to be run backward, the motor 102 is rotated in the reverse direction while the lock gear 104 of the other brake shaft 29 is locked by the corresponding lock arm 105.

When the railcar is to be run forward, the motor 102 is normally rotated with one of the lock gears 104 being locked by the corresponding lock arm 105. At this time, the load applied to the ring gear 21 is large such that each pinion gear 20 receives a large repulsive force from the ring gear 21. The carrier 18 then tends to be rotated in the direction opposed to the normal direction of the motor 102. However, the brake shaft 29 is locked and the one-way clutch 30 of said brake shaft prevents the carrier 18 from rotation in the direction opposed to the sun gear 17. Consequently, since the rotation of the motor 102 is transmitted via the sun gear 17 and pinion gears 20 to the ring gear 21, the wheels are rotated so that the railcar is run forward.

When the railcar starts to run forward, the load applied to the ring gear 21 is reduced such that the repulsive force each pinion gear 20 receives from the ring gear 21 is reduced, whereupon the carrier 18 is rotated in the same direction as the normal direction of the sun gear 17. As a result, the number of revolution of the railcar is increased since the reduction ratio of the planetary gear 16 is reduced. The speed of the railcar is stabilized when the driving force of the wheels equilibrates the running resistance of the railcar.

When the railcar is to be run backward, the motor 102 is rotated in the reverse direction while the other lock gear 104 is locked by the corresponding lock arm 105. Consequently, the rotation of the motor 102 is transmitted to the wheels at the maximum efficiency, whereupon the railcar is run backward.

According to the eighth embodiment, one of the lock gears 104 to be locked by the lock arm 105 is selected such that an automatic non-stage transmission is achieved both in the forward and backward travel. Consequently, the railcar can smoothly be accelerated and decelerated, and the rotation of the motor 102 can be transmitted to the wheels at the maximum efficiency. When the above-described embodiment is applied to an electric car, the automatic non-stage transmission is achieved both in the forward and backward travel.

Figure 20:
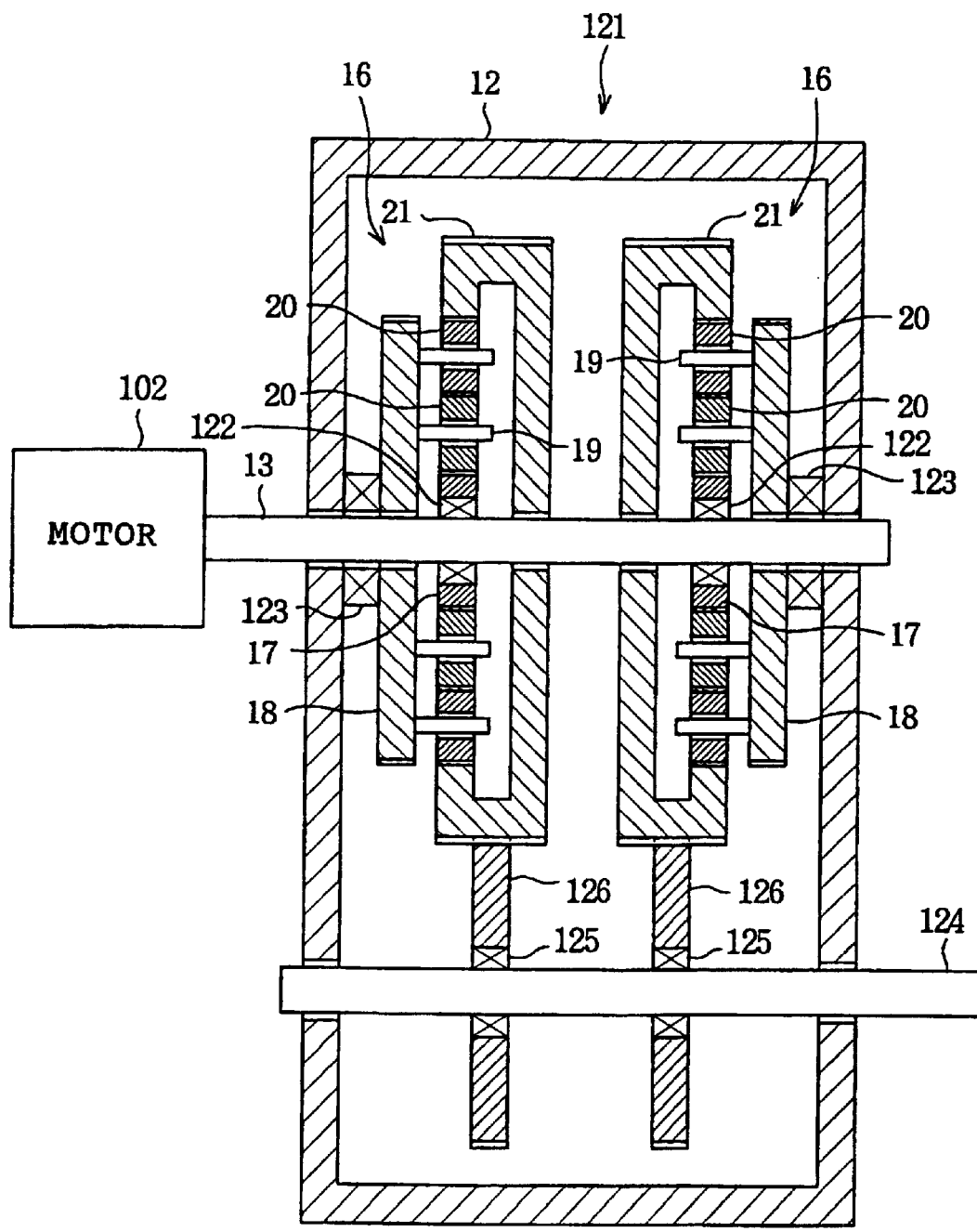
FIG. 20 is a view similar to FIG. 11, showing the automatic transmission of a ninth embodiment in accordance with the invention.

A ninth embodiment of the invention will be described with reference to FIG. 20. In brief, an automatic non-stage transmission is realized with no control required irrespective of the direction in which the railcar is run. Referring to FIG. 20, the automatic transmission 121 basically comprises the double pinion planetary gear 16 as in the first embodiment. A pair of planetary gears 16 include the sun gears 17 mounted on one-way clutches 122 further mounted on the input shafts 13, respectively. Each one-way clutch 122 serves as an input rotation transmitting element. One of the one-way clutches 122 transmits rotation of the motor 102 to the sun gear 17 when the motor is rotated in the normal direction, whereas the other one-way clutch 122 transmits rotation of the motor 102 to the sun gear 17 when the motor is rotated in the reverse direction. The carriers 18 are supported on the one-way clutches 123 further supported on the housing 12 respectively. One of the one-way clutches 123 prevents the corresponding carrier 18 from rotation in the direction opposed to the normal rotation of the motor 102, whereas the other clutch 123 prevents the corresponding carrier 18 from rotation in the direction opposed to the reverse rotation of the motor 102.

An output shaft 124 is provided in the housing 12 so as to be parallel with the input shaft 13. A pair of output gears 126 are mounted on the one-way clutches 125 further mounted on the output shaft 124 respectively. Each one-way clutch 125 serves as the output rotation transmitting element. The output gears 126 are in mesh engagement with ring gears 21 of the planetary gears 16 respectively. One of the one-way clutches 125 transmits to the output shaft 124 rotation of the output gear 126 rotated with rotation of one of the ring gears 21 when said ring gear is rotated in the same direction as the motor 102. The other one-way clutch 125 transmits to the output shaft 124 rotation of the output gear 126 rotated with rotation of the other ring gear 21 when said ring gear is rotated in the same direction opposed to the motor 102.

When the motor 102 is rotated in the normal direction so that the railcar is run forward, rotation of the motor 102 is transmitted to only one of the sun gears 17 by the one-way clutch 122. Accordingly, one of the planetary gears 16 is effectively operated so that the ring gear 21 is rotated in the same direction as the normal rotation of the motor 102. As a result, since the rotation of the ring gear 21 is transmitted from the output gear 126 via the one-way clutch 125 to the output shaft 124, the railcar is run forward. The number of revolution of the railcar is stabilized when the driving force of the wheels equilibrates the running resistance of the railcar.

When the motor 102 is rotated in the reverse direction so that the railcar is run backward, the input rotation is transmitted only to the other planetary gear 16 by the action of the one-way clutches 122 and 125, and output rotation of the effectively operated planetary gear 16 is transmitted to the output shaft 124. As a result, the rotation of the motor 102 is transmitted to the wheels at the maximum efficiency as in the forward travel of the railcar, whereby the railcar is run backward.

According to the ninth embodiment, the automatic non-stage transmission is provided both in the forward and backward travel with no control required. Consequently, the railcar can smoothly be accelerated and decelerated, and the rotation of the motor 102 can be transmitted to the wheels at the maximum efficiency. When the above-described embodiment is applied to an electric car, the automatic non-stage transmission is achieved both in the forward and backward travel. The above-described construction is effective in the case where the rotational direction of the rotating source can be reversed.

A tenth embodiment of the invention will be described with reference to FIG. 21. The invention is also applied to an automatic transmission for electric railcars in the second embodiment. The identical or similar parts in the tenth embodiment are labeled by the same reference symbols as those in the first and seventh embodiments and the description of these parts is eliminated. In brief, a brake functions as the one-way clutch preventing the carrier from rotation in the direction opposed to the sun gear.

Figure 21:
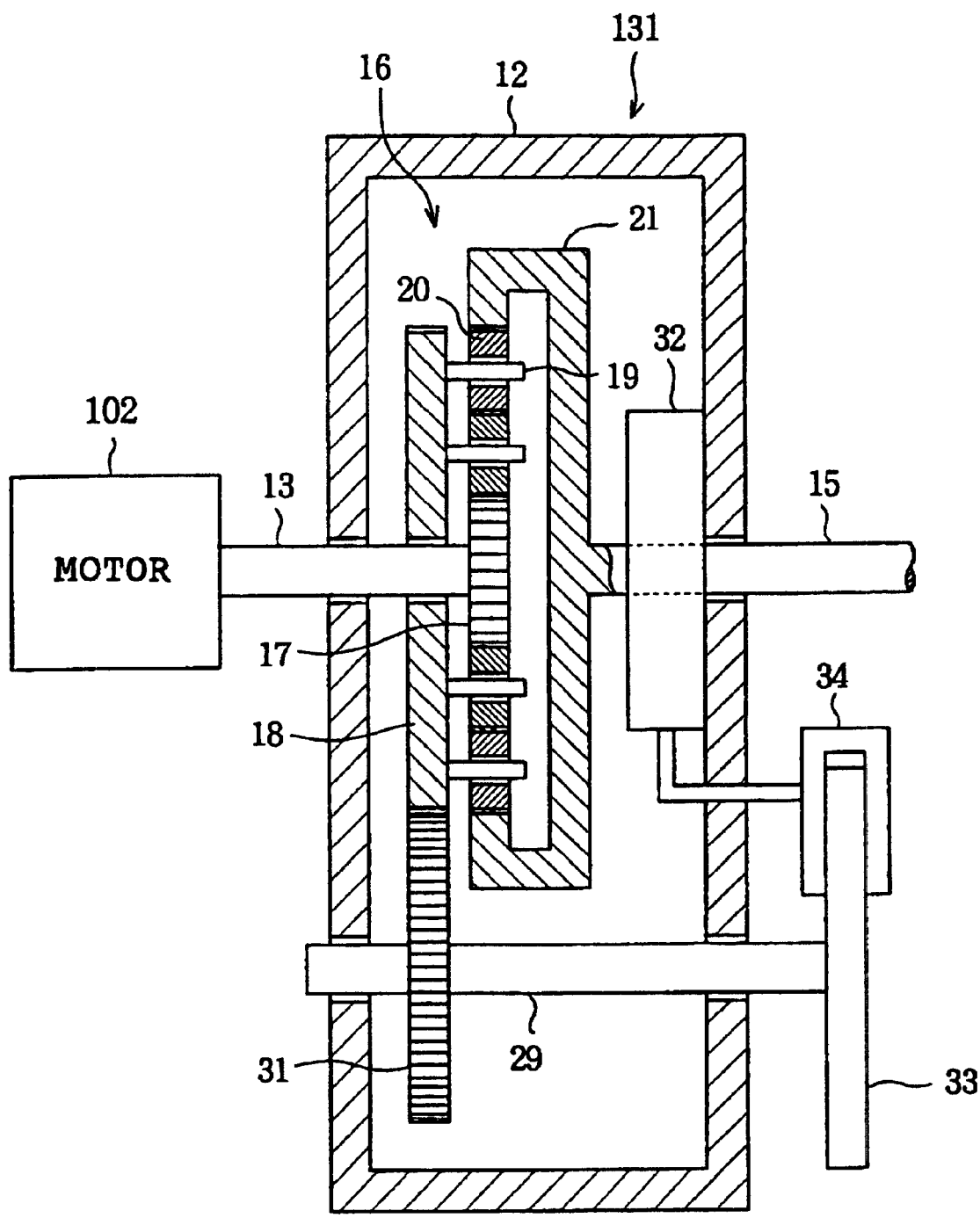
FIG. 21 is a view similar to FIG. 11, showing the automatic transmission of a tenth embodiment in accordance with the invention.

Referring to FIG. 21, the automatic transmission 131 basically comprises the double pinion planetary gear 16 as in the first embodiment. The sun gear 17 is rotated by the motor 102 and the wheels are rotated by the ring gear 21. The carrier 18 is rotated to rotate the brake plate 33. The brake plate 33 is provided integrally on the brake shaft 29 and usually stopped by the hydraulic brake 34 serving as a stop holding element. The hydraulic brake 34 releases the brake plate 33 from the stopping force when supplied with oil pressure by the hydraulic pump 32 provided on the output shaft 15.

When the motor 102 is rotated in the normal direction so that the railcar is run forward, rotation of the sun gear 17 is transmitted via the pinion gears 20 to the ring gear 21 since the carrier 18 is stopped by the hydraulic brake 34, whereupon the wheels of the railcar are rotated so that the railcar is run forward. Consequently, the number of revolution of the ring gear 21 is increased and the hydraulic brake 34 releases the brake plate 33 from the stopping force, whereby the carrier 18 is rotated in the same direction as the sun gear 17. As a result, the reduction ratio of the planetary gear 16 is reduced such that the running speed of the railcar is increased. The running speed of the railcar is stabilized when the driving force of the wheels equilibrates the running resistance of the railcar.

The increase in the running resistance of the railcar increases the repulsive force each pinion gear 20 receives from the ring gear 21. Further, the decrease in the number of revolution of the motor 102 decreases the number of revolution of the carrier 18, whereupon the number of revolution of the ring gear 21 and accordingly that of the drive wheels are decreased. In each of these cases, the hydraulic pressure the brake 34 applies to the brake plate 33 is reduced such that the stopping force the brake 34 applies to the brake plate and accordingly to the carrier 18 is increased. As a result, since the carrier 18 is stopped when the railcar is stopped, the rotation of the motor 102 can reliably be transmitted to the wheels. Furthermore, in a case where the motor 102 is reversed so that the railcar is run backward, the carrier 18 is stopped when the railcar is stopped. Consequently, the rotation of the motor 102 can be transmitted to wheels so that the railcar is run backward in the same manner as in the case where the railcar is run forward.

According to the tenth embodiment, the carrier 18 is released from the stopping force with increase in the running speed of the railcar. Consequently, the rotation of the motor 102 can be transmitted to the wheels without using a one-way clutch irrespective of the direction in which the railcar is run. The aforesaid construction can be applied to electric cars.

The carrier 18 may be released from the stopping force when the running speed of the railcar has reached a predetermined value (10 km/h, for example), namely, when the number of revolution of the ring gear 21 is at or above a predetermined value. Further, the brake plate 33 may be released from the stopping force of the brake 34 with increase in the number of revolution of the sun gear 17.

An eleventh embodiment of the invention will be described with reference to FIG. 22. The identical or similar parts in the eleventh embodiment are labeled by the same reference symbols as those in the fourth embodiment and the description of these parts is eliminated. In brief, a control device is provided for controlling rotation of the carrier in the eleventh embodiment.

Figure 22:
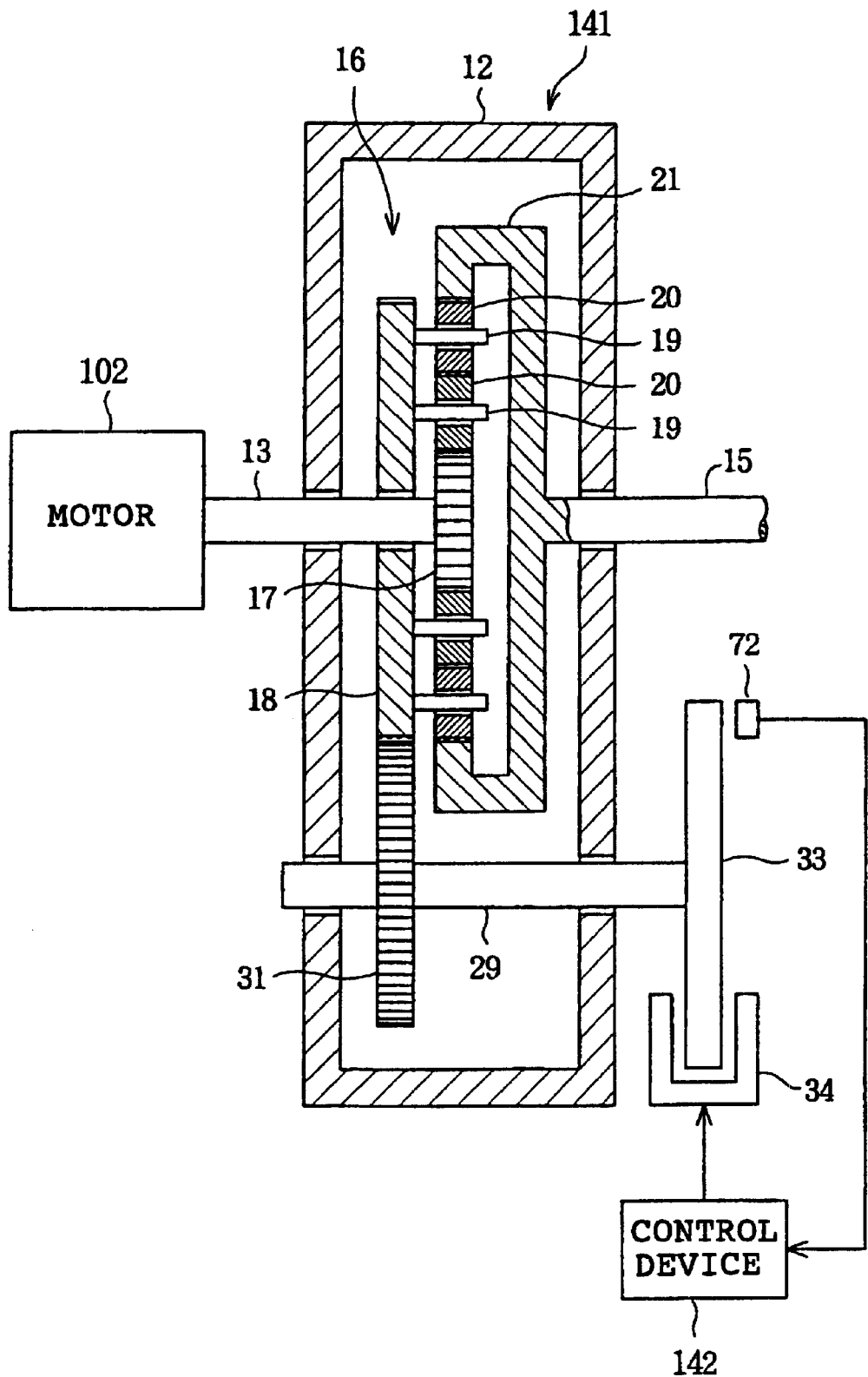
FIG. 22 is a view similar to FIG. 11, showing the automatic transmission of an eleventh embodiment in accordance with the invention.

Referring to FIG. 22, the automatic transmission 141 basically comprises the double-pinion type planetary gears as in the first embodiment. The sun gear 17 is rotated by the motor 102. The ring gear 21 is rotated to thereby rotate the wheels. The carrier 18 is rotated to thereby rotate the brake plate 33. The control device 142 serving as a detecting element and a stop holding element includes a rotation sensor 72 detecting the direction of rotation of the brake plate 33. The control device 142 controls the hydraulic brake 34 on the basis of the result of detection by the rotation sensor 72. More specifically, the control device 142 controls the brake 34 so that the brake 34 intermittently applies a stopping force to the brake plate 33 when the carrier 18 is rotated in the direction opposed to the sun gear 17 during rotation of the motor 102. In this case, the stopping force is gradually increased. The rotation direction of the brake plate 33 and accordingly that of the carrier 18 are detected by the rotation sensor 72 when the brake plate 33 is released from the stopping force. In this case, when the carrier 18 is rotated in the direction opposed to the sun gear 17 under the condition where the brake plate 33 is released from the stopping force of the brake 34, the control device 142 controls the brake 34 so that the intermittent stopping force is applied to the brake plate 33. The control device 142 further controls the brake 34 so that the brake plate 33 is released from the stopping force of the brake 34 when the carrier 18 is rotated in the same direction as the sun gear 17.

When the motor 102 is normally rotated so that the railcar is run forward, an amount of load the ring gear 21 receives is large such that the repulsive force each pinion gear 20 receives from the ring gear 21 is large. Accordingly, the carrier 18 is rotated in the direction opposed to the sun gear 17. The control device 142 then controls the brake 34 so that the intermittent stopping force is applied to the brake plate 33 and accordingly to the carrier 18. Consequently, the rotation of the sun gear 17 is intermittently transmitted via the pinion gears 20 to the ring gear 21, whereby the wheels are rotated so that the railcar is run forward. In this case, since the ring gear 21 is subjected to a large load when the railcar starts to run, each pinion gear 20 receives a large repulsive force from the ring gear 21. Accordingly, the carrier 18 is rotated in the direction opposed to the sun gear 17 when released from the stopping force of the brake 34. Thus, the control device 142 controls the brake 34 so that the intermittent stopping force is continuously applied to the brake plate 33.

An amount of load applied to the ring gear 21 is decreased when the railcar starts to run forward. Accordingly, since the repulsive force each pinion gear 20 receives from the ring gear 21 is decreased, the carrier 18 is rotated in the same direction as the sun gear 17 when released from the stopping force of the brake 34. The control device 142 then controls the brake 34 so that the brake plate 33 is completely released from the stopping force. Consequently, since the carrier 18 is rotated in the same direction as the sun gear 17, the running speed of the railcar is increased and rendered stable when the driving force of the wheels equilibrates the running resistance of the railcar.

The carrier 18 is rotated in the direction opposed to the sun gear 17 when the railcar comes to an ascent such that the running resistance is increased or when the railcar is stopped with decrease in the number of revolution of the motor 102. As a result, the rotation of the motor 102 cannot be transmitted to the wheels. In this case, since the control device 142 controls the brake 34 so that the intermittent stopping force is applied to the carrier 18, the rotation of the motor can be transmitted to the wheels.

Further, when the motor 102 is reversed so that the railcar is run backward, the rotation of the motor is transmitted to the wheels in the same manner as the case where the railcar is run forward, whereupon the railcar is run backward. Further, when the railcar is to be stopped, the intermittent stopping force is applied to the carrier 18, so that the rotation of the motor can be transmitted to the wheels.

A twelfth embodiment of the invention will be described with reference to FIG. 23. The identical or similar parts in the twelfth embodiment are labeled by the same reference symbols as those in each of the first and ninth embodiments and the description of these parts is eliminated. In brief, the automatic transmission serves as a non-slip differential gear in the twelfth embodiment.

Figure 23:
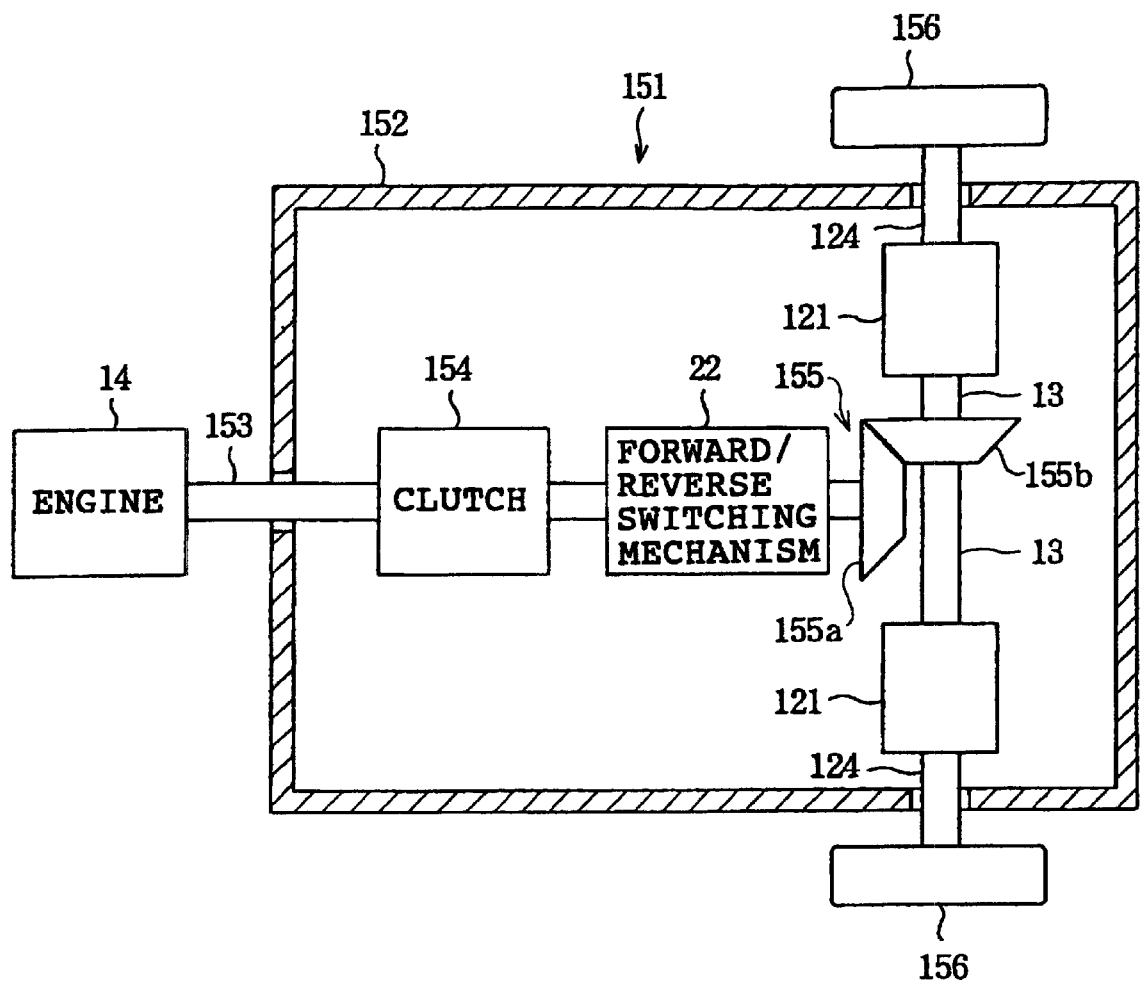
FIG. 23 is a transverse section of the automatic transmission of a twelfth embodiment in accordance with the invention.

Referring to FIG. 23, the basic construction of the automatic transmission 151 is the same as that of the automatic transmission 121 of the ninth embodiment. More specifically, rotation of the engine 14 is transmitted from the input shaft 153 supported on the housing 152 via the clutch 154 and the F/R switch 22 to an input gear 155a of an orthogonal gear 155 such as a bevel gear. The input shafts 13 of the automatic transmissions 121 are connected to an output gear 155b of the orthogonal gear 155. Two drive wheels 156 are connected to the output shafts 124 of the automatic transmissions 121 respectively. Thus, the two automatic transmissions 121 are provided so as to correspond to the drive wheels 156 of the vehicle respectively.

Rotation of the engine 14 is transmitted from the input shaft 153 via the F/R switch 22 and the orthogonal gear 155 to the automatic transmissions 121 when F/R switch 22 is switched to the FORWARD during rotation of the engine 14 and the clutch 154 is actuated. Since each automatic transmission 121 automatically adjusts the number of revolution of the corresponding drive wheel 156 so that the driving force of the drive wheel equilibrates the running resistance. Consequently, the rotation of the engine 14 can be transmitted to the drive wheels 156 at a maximum efficiency so that the drive wheels are rotated to run the vehicle forward. On the other hand, each automatic transmission 121 serves as a non-stage transmission when the F/R switch 22 is switched to the BACKWARD. Accordingly, the vehicle can be run backward in the same manner as the case where it is run forward. In this case, each automatic transmission 121 serves as a differential gear. More specifically, the drive wheels 156 can be rotated independent from each other by the respective automatic transmissions 121, the number of revolution of the inner drive wheel 156 can smoothly be rendered smaller than that of the outer drive wheel when the vehicle is turned. Thus, each automatic transmission 121 serves as a differential gear. In other words, each automatic transmission 121 serves as the differential gear while functioning as the automatic transmission. As a result, no differential gear is required. Since the numbers of revolution of the sun gears 17 of the respective automatic transmissions 121 are the same, the driving force of the inner drive wheel is increased although the number of revolution thereof is rendered smaller than that of the outer drive wheel.

It should be noted that since both automatic transmissions 121 are connected to the engine 14 during running of the vehicle, the driving force of one of the drive wheels 156 is not lost even when the other drive wheel 156 is slipped. Thus, each automatic transmission 121 serves as the non-slip differential gear. Further, the running resistance of the slipped drive wheel is rapidly reduced. The number of revolution of the drive wheel 156 is increased with the rapid reduction in the running resistance and the driving force thereof is simultaneously be decreased. Consequently, the vehicle can be released from the slippage.

In this case, a large reduction ratio can be obtained from the combination of the reduction ratios of the automatic transmissions 11 and 121. Further, when constructed so that the reduction ratio becomes 1 when the carrier 18 is stopped, the reduction ratio of the planetary gear 16 is 1 and accordingly serves as a complete clutch. In order that the reduction ratio of the planetary gear may be 1, the number of teeth of the gears 62, 66, 67 and 64 need to be the same in the third embodiment wherein the construction of the planetary gear comprises a plurality of teeth.

According to the twelfth embodiment, the automatic transmission can serve as the non-slip differential gear while accomplishing the automatic non-stage transmission. Consequently, an added value of the automatic transmission can be improved. The above-described construction can be applied to hybrid cars and electric cars. Further, two automatic transmissions 121 may be provided for the front drive wheels respectively, whereas two automatic transmissions 121 may also be provided for rear drive wheels respectively. As a result, the rotation of the engine 14 is transmitted via the automatic transmissions 121 to the drive wheels respectively. Thus, a-four-wheel-drive car can be realized without using means for distributing the driving force to the front and rear wheels and a differential gear. Additionally, when the automatic transmissions 121 are provided for front drive wheels of a front engine front drive car respectively, torque variations are absorbed by the rotation of the carrier 18. Consequently, the torque variations in the drive wheels can be prevented without using constant velocity universal joints.

The automatic transmission 111 of the eighth embodiment may be employed as those provided so as to correspond to the respective drive wheels. In this case, however, the lock arm 105 needs to be controlled.

Figure 24:
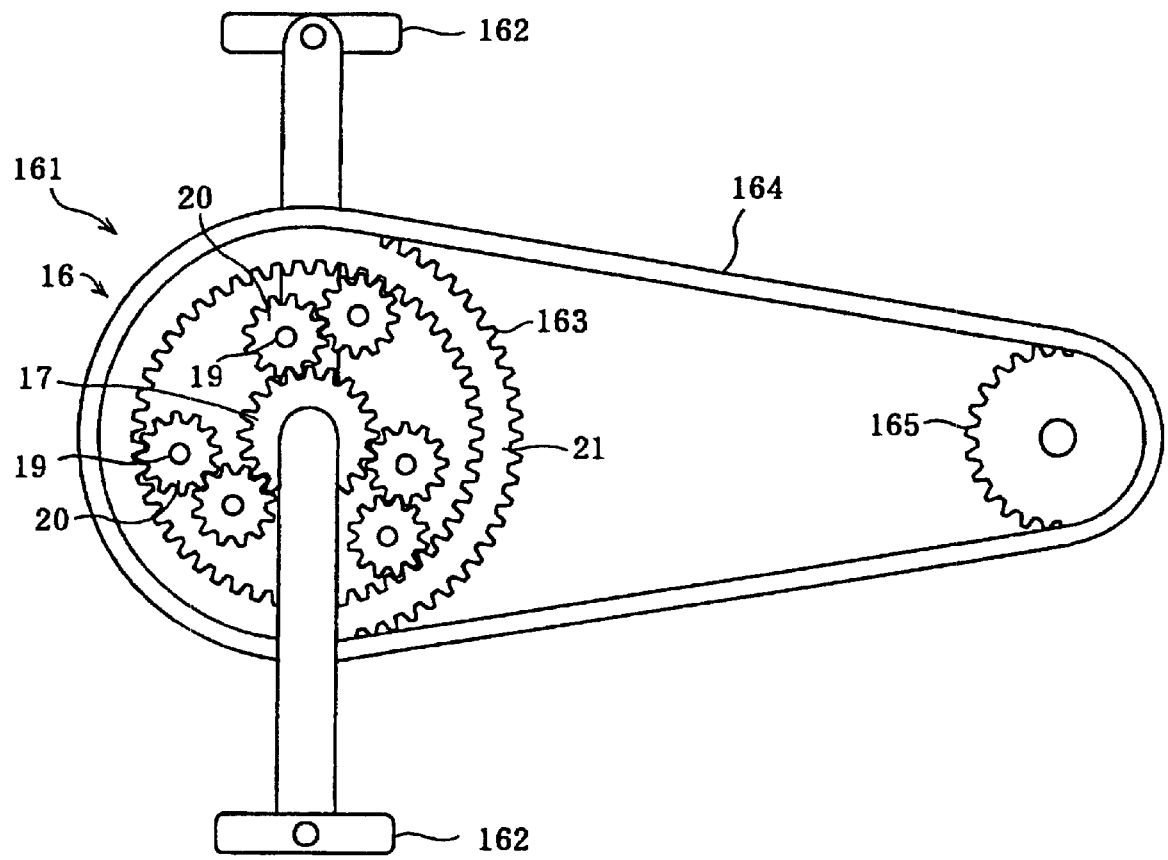
FIG. 24 is a side view of the automatic transmission of a thirteenth embodiment in accordance with the invention.

A thirteenth embodiment of the invention will be described with reference to FIG. 24. The invention is applied to an automatic transmission for a bicycle in the thirteenth embodiment. Referring to FIG. 24, the automatic transmission 161 basically comprises the double pinion planetary gear 16. The sun gear 17 is rotated by pedals 162, and the carrier (not shown) is mounted on the one-way clutch further mounted on a frame of the bicycle. A sprocket wheel 163 is formed on the outer circumference of the ring gear 21. Rotation of the ring gear 21 is transmitted from the sprocket wheel 163 via a chain 164 to a rear wheel gear 165 so that a rear wheel (not shown) is rotated.

When the pedals 162 are worked so that the bicycle is run forward, an amount of load applied to the ring gear 21 is large and the repulsive force each pinion gear 20 receives from the ring gear 21 is large. Accordingly, the carrier tends to be rotated in the direction opposed to the sun gear 17. In this case, the one-way clutch (not shown) prevents the carrier from being rotated in the direction opposed to the sun gear 17. The sun gear remains stopped. As a result, since the rotation of the pedals 162 is transmitted from the sun gear 17 via the pinion gears 20 to the ring gear 21, the ring gear is rotated in the same direction as the sun gear 17. Thus, the rotation of the ring gear 21 is transmitted from the sprocket 21 via the chain to the rear wheel gear 165 and accordingly to the rear wheel, whereby the bicycle is run forward.

When the bicycle starts to run forward, the repulsive force each pinion gear 20 receives from the ring gear 21 is decreased. Accordingly, the carrier tends to be rotated in the same direction as the sun gear 17. As a result, since the reduction ratio of the planetary gear 16 is reduced, the running speed of the bicycle is increased and rendered stable when the driving force of the rear wheel equilibrates the running resistance of the bicycle.

According to the thirteenth embodiment, the reduction ratio of the automatic transmission 161 is rendered large when the amount of force applied to each pedal 162 is large as in the case where the bicycle starts to run or when the running resistance is large as in the case where the bicycle is run along an ascent. The reduction ratio is rendered small when the amount of force applied to each pedal 162 is small or when the running resistance is small as in the case where the bicycle is run along a flat road or a descent. Thus, the reduction ratio can automatically be adjusted according to a force applied to each pedal 162 or the magnitude of the running resistance. Accordingly, a gear-changing operation required in the conventional manually operated transmission is not required in the above-described automatic transmission. Further, even elderly persons who apply a small force to each pedal 162 or youngers can stably ride on a bicycle. Additionally, rotation of each pedal 162 can be transmitted to the rear wheel at a maximum efficiency.

The above-described construction is effective in a case where input rotation has a single rotation direction. Accordingly, the construction may be applied to wind power generation, hydraulic power generation, thermal power generation, generators for vehicles, pneumatic pumps, hydraulic pumps, vacuum pumps, turbo-chargers and super chargers for vehicles, a propeller revolving mechanism for airplanes, turbofan engines for airplanes, propellers of airplanes or helicopters, screw propellers for ships, snowmobiles, fishing reels, long linear reels, flywheels, etc. More specifically, no transmission is provided in the wind power generator, for example. Accordingly, when a revolving force of a windmill is smaller than a static resistance of the generator, the generator is not revolved such that electricity cannot be generated. When the revolving force of the windmill is larger than that required for maintaining rotation of the generator, rotation of the windmill cannot efficiently be transmitted to the generator. However, in a case where the automatic transmission of the thirteenth embodiment is applied to the wind power generator, rotation of the windmill is transmitted via the planetary gear 16 to the generator so that the generator can be rotated even when the number of revolution of the windmill is low. Further, when the revolving force of the windmill is larger than that (load) required for maintaining rotation of the generator, the number of revolution of the generator is increased with decrease in the reduction ratio of the planetary gear 16. The rotation of the generator is rendered stable when the revolving force of the windmill equilibrates that required for maintaining rotation of the generator. Consequently, the generating efficiency of the generator can be improved to a large extent. Additionally, when the stopping force is applied to the carrier of the planetary gear 16 with increase in the number of revolution of the generator, an excessive increase in the number of revolution of the generator can be prevented and accordingly, the generator can be protected.

The above-described embodiment provides a high responsibility in rotating a rotated member. Accordingly, for example, when a compressor of the vehicle turbocharger or supercharger is rotated via the automatic transmission, the number of revolution of the compressor and accordingly the output power of the engine can be increased in a short period of time. In other words, when the rotated member is rotated in a single direction, there is a possibility of applicability of the present invention. Thus, the present invention has a broad range of application.

Further, when rotation of a plurality of rotating sources is composed as in the sixth embodiment, composition can be performed efficiently irrespective of the numbers of revolution of the rotating members. Accordingly, when the thirteenth embodiment is applied to the wind power generation, rotation of a plurality of windmills can efficiently be composed.

A fourteenth embodiment of the invention will be described with reference to FIG. 25. The invention is applied to an automatic transmission for a motor-assisted bicycle. The basic construction of the automatic transmission is the same as of the thirteenth embodiment and is not accordingly shown in the drawings.

Figure 25:
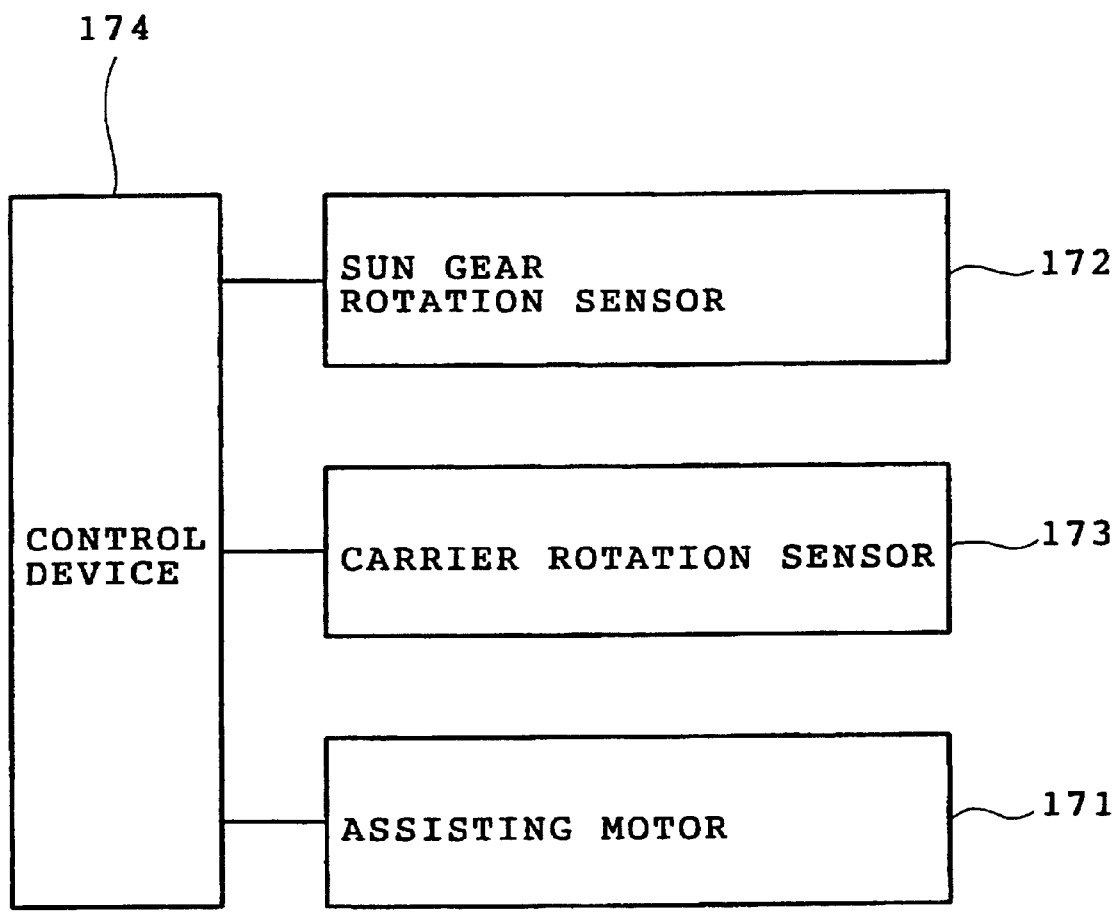
FIG. 25 is a block diagram showing an electrical arrangement of the automatic transmission of a fourteenth embodiment in accordance with the invention.

Referring to FIG. 25, an assisting motor 171 applies a driving force to each rear wheel. A sun gear rotation sensor 172 is provided for detecting a number of revolution of the sun gear 17. A carrier rotation sensor 173 is provided for detecting a number of revolution of the carrier. A control device 174 controls the number of revolution of the assisting motor 171 on the basis of the difference in the numbers of revolution of the sun gear 17 and the carrier. The difference in the numbers of revolution of the sun gear 17 and the carrier designates the magnitude of load. The difference in the numbers of revolution of the sun gear and the carrier is large when the load is large. The difference is small when the load is small. Accordingly, the control device 174 controls the assisting motor 171 so that the number of revolution of the motor is increased as the difference in the numbers of revolution of the sun gear 17 and the carrier becomes large. As a result, since rotation of the assisting motor 171 is applied as an assisting force according to the magnitude of the load, reduction in the running speed of the bicycle can be prevented even when the bicycle comes to an ascent.

According to the fourteenth embodiment, the magnitude of the load is detected on the basis of the difference in the numbers of revolution of the sun gear 17 and the carrier. Consequently, since the magnitude of the load is detected using the construction of the planetary gear 16 without any dedicated means such as a torque sensor, the construction of the automatic transmission can be simplified.

The present invention should not be limited by the above-described embodiments and may be modified as follows. A plurality of double pinion planetary gears 16 may be connected in series to each other or one another. Since a large reduction ratio is obtained from this construction, it is suitable for large-sized vehicles such as buses and trucks.

The automatic transmission comprising the double pinion planetary gears 16 may be employed as one gear in a manual transmission. In this case, when the automatic transmission includes the clutch as described in the first embodiment, the clutch can be functioned as an unnecessary automatic transmission.

The torque characteristic of the engine can be improved when the automatic transmission comprising the double pinion planetary gears 16 is interposed between the engine and the manual transmission. In this case, the carrier needs to be prevented from rotation in the direction opposed to that of the engine.

Rotation of the carrier 18 of each planetary gear 16 may be controlled by an electric motor. Further, the invention may be applied to an automobile provided with two engines driving front and rear wheels respectively and to a hybrid car provided with an engine driving either one of the front and rear wheels and an electric motor driving the other of the front and rear wheels.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

INDUSTRIAL APPLICABILITY

As obvious from the foregoing, the automatic transmission in accordance with the present invention is suitable for use in automobiles including hybrid cars and other vehicles.

What is claimed is:

1. An automatic transmission, comprising:
   an input first rotating member;
   an output second rotating member provided to be coaxial with the first rotating member;
   a third rotating member provided to be coaxial with the first rotating member; and
   a rotation transmitting element provided on the third rotating member to transmit rotation of the first rotating member to the second rotating member so that the second rotating member is rotated at a predetermined reduction ratio exceeding 1 in a direction of rotation of the first rotating member in a stopped state of the third rotating member, wherein the reduction ratio is increased as a difference between numbers of revolution of the first and third rotating members is rendered larger; the third rotating member is bidirectionally rotatable in a free state; and the second rotating member is automatically adjusted to a number of revolution at which an equilibrium is maintained between torque developed by the second rotating member and a load applied to the second rotating member when the third rotating member is in rotation at a number of revolution ranging between zero at which the third rotating member is stationary and a number of revolution at which the third rotating member is in rotation together with the first rotating member in one and the same direction.

2. The automatic transmission according to claim 1, further comprising a reverse rotation preventing element which prevents the third rotating member from rotation in a direction opposite one in which the first rotating member is rotated.

3. A device using the automatic transmission according to claim 2, wherein a pair of the automatic transmissions are provided having effective input rotational directions opposed to each other, further comprising an input rotation transmitting element transmitting input rotation only to the first rotating member of the automatic transmission effectively operating with respect to the input rotational direction, and an output rotation transmitting element transmitting as output rotation only rotation of the second rotating member of the automatic transmission effectively operating with respect to the input rotation.

4. The automatic transmission according to claim 3, which is provided for every one of a plurality of drive wheels.

5. The automatic transmission according to claim 2, wherein the reverse rotation preventing element comprises a one-way clutch.

6. The automatic transmission according to claim 1, further comprising:
   a fourth rotating member;
   a reverse rotation transmitting element which transmits rotation of the third rotating member to the fourth rotating member under a condition where the third rotating member is being rotated in a direction opposite one in which the first rotating member is rotated; and
   a stopping element which applies a stopping force to the fourth rotating member.

7. The automatic transmission according to claim 6, wherein the stopping element increases the stopping force applied to the fourth rotating member with increase in a number of revolution of the fourth rotating member.

8. The automatic transmission according to claim 6, wherein the stopping element increases the stopping force applied to the fourth rotating member with increase in a number of revolution of the first rotating member.

9. The automatic transmission according to claim 6, wherein the stopping element applies the stopping force to the fourth rotating member when externally operated.

10. The automatic transmission according to claim 6, wherein the reverse rotation transmitting element comprises a one-way clutch.

11. The automatic transmission according to claim 1, further comprising a stop holding element which holds the third rotating member in a stopped state.

12. The automatic transmission according to claims 11, wherein the stop holding element reduces a stop holding force with increase in the number of revolution of the second rotating member rotated in a same direction as the first rotating member is rotated.

13. The automatic transmission according to claim 11, wherein the stop holding element releases the third rotating member from a stop holding force applied thereto when the number of revolution of the second rotating member rotated with the first rotating member in a same direction as the first rotating member is rotated has exceeded a predetermined number of revolution.

14. The automatic transmission according to claim 11, further comprising a detecting element which detects torque rotating the third rotating member in a same direction as the first rotating member is rotated, wherein the stop holding element releases the third rotating member from a stop holding force applied thereto when the detecting element detects the torque rotating the third rotating member in the same direction as the first rotating member is rotated.

15. The automatic transmission according to claim 1, further comprising a number-of-revolution controlling element which controls a number of revolution of the third rotating member.

16. The automatic transmission according to claim 15, wherein the number-of-revolution controlling element combines a force stopping the third rotating member and a force integrating the third rotating member with the first rotating member, thereby controlling the number of revolution of the third rotating member.

17. The automatic transmission according to claim 15, further comprising a reverse rotation preventing element which prevents the third rotating member from rotation in a direction opposite one in which the first rotating member is rotated, wherein the number-of-revolution controlling element carries out the operation of the reverse rotation preventing element.

18. The automatic transmission according to claim 15, further comprising a stop holding element which holds the third rotating member in a stopped state, wherein the number-of-revolution controlling element carries out an operation of the stop holding element.

19. The automatic transmission according to claim 1, further comprising a load determining element which determines a magnitude of load based on a difference between numbers of revolution of the first and third rotating members both rotated in a same direction.

20. The automatic transmission according to claim 1, wherein the first rotating member comprises a sun gear of a double pinion planetary gear, the second rotating member comprises a ring gear of the planetary gear, the third rotating member comprises a planetary pinion carrier of the planetary gear, and the rotation transmitting element comprises a pinion gear of the planetary gear.

21. A device using the automatic transmission according to claim 1, wherein a plurality of the automatic transmissions are serially connected to each other or one another.

22. The automatic transmission according to claim 1, which is connected to a step-up gear with a reduction ratio smaller than 1.

23. A device using the automatic transmission according to claim 1, wherein a plurality of the automatic transmissions are provided and rotation of the second rotating members of the automatic transmissions are combined together to be delivered.

24. A device using the automatic transmission according to claim 1, wherein a plurality of the automatic transmissions are provided in a vehicle having a plurality of drive wheels, the first rotating members are rotated by a rotating source and the drive wheels are rotated by the second rotating members respectively.

25. The device using the automatic transmission according to claim 24, further comprising a number-of-revolution controlling element which controls a number of revolution of the third rotating member, wherein the number-of-revolution controlling element reduces the number of revolution of the third rotating member when a braking operation is carried out.

26. The device using the automatic transmission according to claim 25, wherein the number-of-revolution controlling element controls the number of revolution of the third rotating member so that a number of revolution of the rotating source is reduced to or below an allowed number of revolution.

27. The device using the automatic transmission according to claim 24, further comprising a load determining element which determines a magnitude of load based on a difference between numbers of revolution of the first and third rotating members both rotated in a same direction, and an auxiliary rotating source for rotating the second rotating member in a same direction as the first rotating member is rotated, the auxiliary rotating source being operated on the basis of the magnitude of load determined by the load determining element.

28. The device using the automatic transmission according to claim 27, wherein a rotating force the auxiliary rotating source applied to the second rotating member is increased with an increase in the load determined by the load determining element.

29. An automatic transmission comprising:

an input first rotating member;

an output second rotating member provided to be coaxial with the first rotating member;

a third rotating member provided to be coaxial with the first rotating member; and rotation transmitting means provided on the third rotating member to transmit rotation of the first rotating member to the second rotating member so that the second rotating member is rotated at a number of revolution and a reduction ratio shown by following equations respectively in a direction of rotation of the first rotating member:

$$N2=N3+(N1-N3)/R0$$

$$R=N1 \cdot R0/((R0-1) \cdot N3+N1)$$

where N1 is a number of revolution of the first rotating member, N2 is a number of revolution of the second rotating member, N3 is a number of revolution of the third rotating member, R is a reduction ratio of the automatic transmission, and R0 is a reduction ratio of the automatic transmission in a stopped state of the third rotating member and larger than 1, wherein the third rotating member is bidirectionally rotatable in a free state; and the second rotating member is automatically adjusted to a number of revolution at which an equilibrium is maintained between torque developed by the second rotating member and a load applied to the second rotating member when the third rotating member is in rotation at a number of revolution ranging between zero at which the third rotating member is stationary and a number of revolution at which the third rotating member is in rotation together with the first rotating member in one and the same direction.

* * * * *

UNITED STATES PATENT AND TRADEMARK OFFICE
CERTIFICATE OF CORRECTION

PATENT NO. : 6,537,169 B1
DATED : March 25, 2003
INVENTOR(S) : Masaru Morii

It is certified that error appears in the above-identified patent and that said Letters Patent is hereby corrected as shown below:

<u>Title page,</u>
Item [76], should read:
-- [76] Inventor: Masaru Morii, 255 Mirokujihigashi
2-chome, Nishiharu-cho
Nishikasugai-gun, Aichi 481-0031 (JP) --

Signed and Sealed this

Twenty-sixth Day of August, 2003

JAMES E. ROGAN
*Director of the United States Patent and Trademark Office*